(12) United States Patent  (10) Patent No.: US 7,583,336 B2
Ahn                         (45) Date of Patent: Sep. 1, 2009

(54) LIQUID CRYSTAL DISPLAY DEVICE AND FABRICATING METHOD THEREOF

(75) Inventor: Byung Chul Ahn, Anyang-si (KR)

(73) Assignee: LG Display Co., Ltd., Seoul (KR)

( * ) Notice: Subject to any disclaimer, the term of this patent is extended or adjusted under 35 U.S.C. 154(b) by 520 days.

(21) Appl. No.: 11/142,314

(22) Filed: Jun. 2, 2005

(65) Prior Publication Data

US 2005/0270451 A1    Dec. 8, 2005

(30) Foreign Application Priority Data

Jun. 5, 2004    (KR) .................... 10-2004-0041142

(51) Int. Cl.
 *G02F 1/1335*    (2006.01)
(52) U.S. Cl. .................................... 349/114
(58) Field of Classification Search ............... 349/106, 349/113–115, 40, 54–55, 192; 324/770
 See application file for complete search history.

(56) References Cited

U.S. PATENT DOCUMENTS

| | | |
|---|---|---|
| 5,162,933 A | 11/1992 | Kakuda et al. |
| 5,317,433 A | 5/1994 | Miyawaki et al. |
| 5,339,181 A | 8/1994 | Kim et al. |
| 5,462,887 A | 10/1995 | Gluck |
| 5,561,440 A * | 10/1996 | Kitajima et al. ............ 345/87 |
| 5,668,379 A | 9/1997 | Ono et al. |
| 5,731,856 A | 3/1998 | Kim et al. |
| 5,771,083 A | 6/1998 | Fujihara et al. |
| 5,793,460 A | 8/1998 | Yang |
| 5,847,781 A | 12/1998 | Ono et al. |

(Continued)

FOREIGN PATENT DOCUMENTS

JP    H02-019840    1/1990

(Continued)

OTHER PUBLICATIONS

Office Action issued by the Japanese Patent Office on Jul. 5, 2006, (w/ English Translation).

*Primary Examiner*—Timothy Rude
(74) *Attorney, Agent, or Firm*—McKenna Long & Aldridge

(57) ABSTRACT

A liquid crystal display device is provided that includes: first and second substrates; a gate line of a double layer having a first transparent conductive layer and a second opaque conductive layer on the first substrate; a first insulation film on the gate line; a data line crossing the gate line to define a pixel region, the pixel region having a transmissive area and a reflective area; a thin film transistor connected to the gate and data lines; a pixel electrode having the first conductive layer in the pixel region and a second conductive layer along the boundary of the first conductive layer; a storage upper electrode to form a storage capacitor by overlapping with the gate line the first insulation film there between; a transmission hole to expose the side of the storage upper electrode and a drain electrode of the thin film transistor by passing through the first insulation film and a second insulation film on the thin film transistor; a reflective electrode connected the second conductive layer of the pixel electrode with the drain electrode and the storage upper electrode through an edge portion of the transmission hole; and a liquid crystal layer between the first and second substrates.

35 Claims, 49 Drawing Sheets

U.S. PATENT DOCUMENTS

| | | | |
|---|---|---|---|
| 6,897,925 B2 * | 5/2005 | Kim et al. | 349/114 |
| 6,914,643 B1 * | 7/2005 | Nagase et al. | 349/40 |
| 7,453,537 B2 * | 11/2008 | Kim et al. | 349/114 |
| 7,480,020 B2 * | 1/2009 | Wen et al. | 349/114 |
| 7,528,909 B2 * | 5/2009 | Ahn et al. | 349/114 |
| 2004/0021813 A1 * | 2/2004 | Kim et al. | 349/113 |
| 2004/0075793 A1 * | 4/2004 | Itoh et al. | 349/114 |

FOREIGN PATENT DOCUMENTS

| | | |
|---|---|---|
| JP | 2002-182239 | 2/2002 |
| JP | 2002-141512 | 5/2002 |
| JP | 2004-046223 | 2/2004 |
| JP | 2004-101792 | 4/2004 |
| WO | WO 03/107434 | 12/2003 |

* cited by examiner

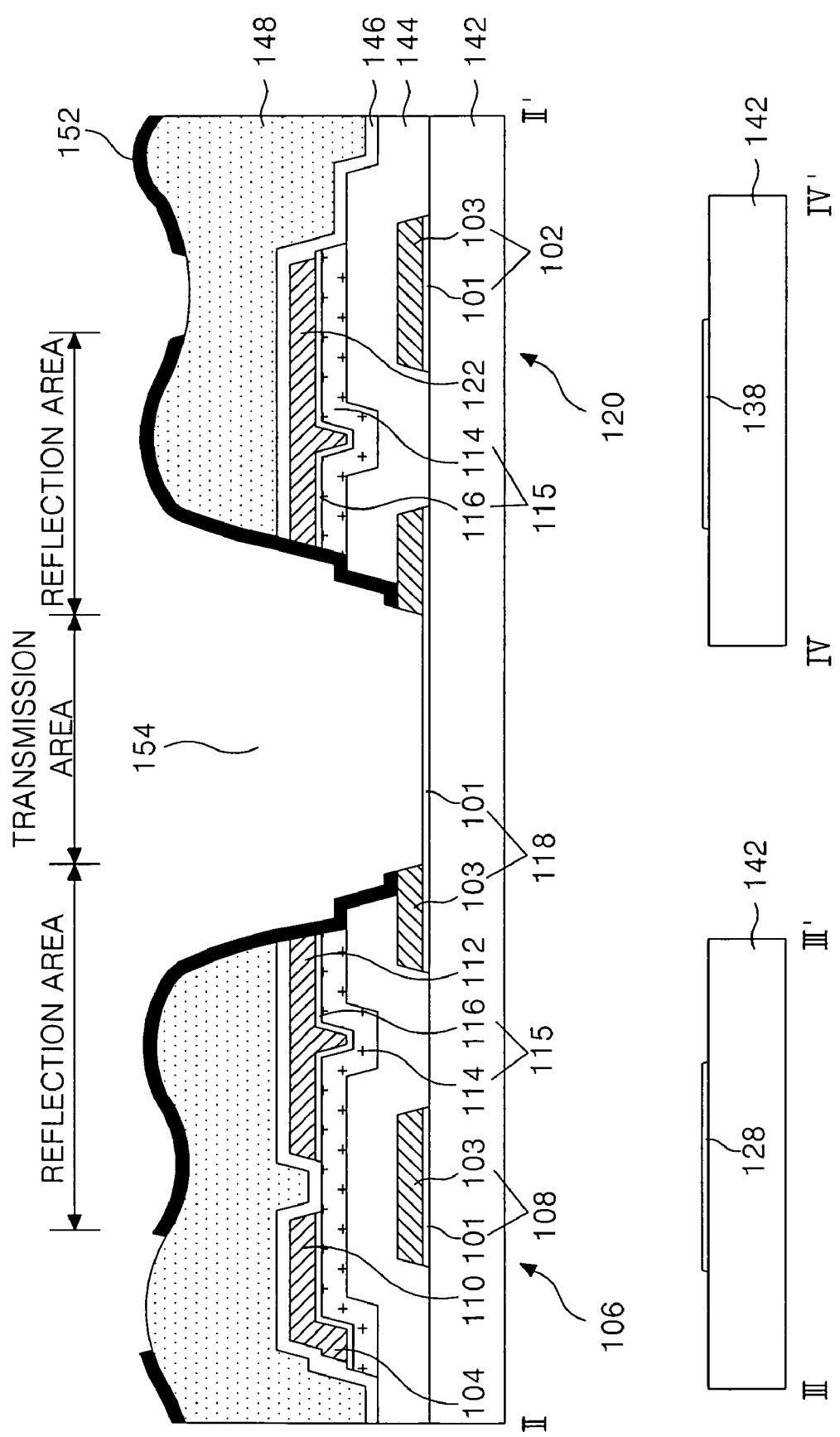

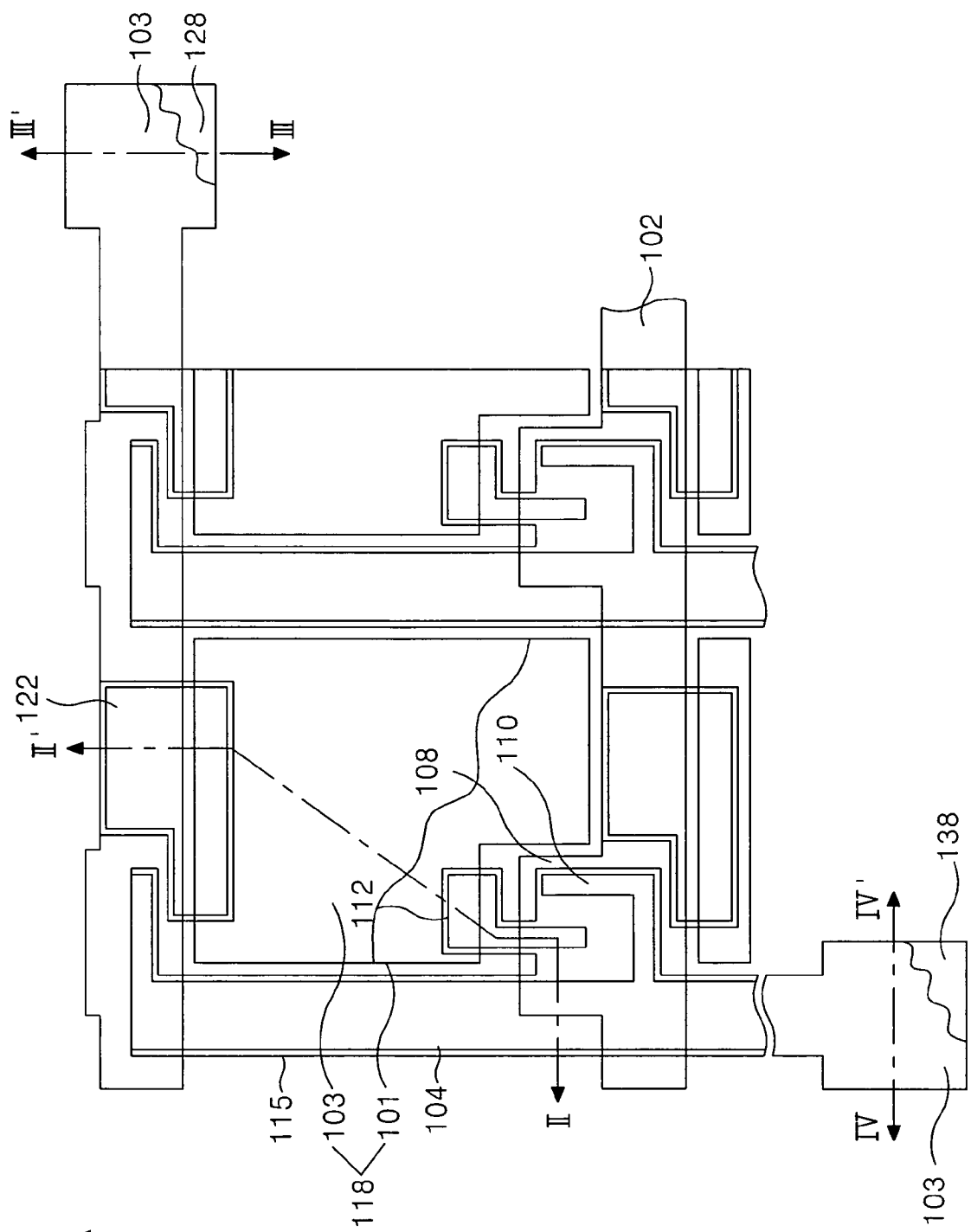

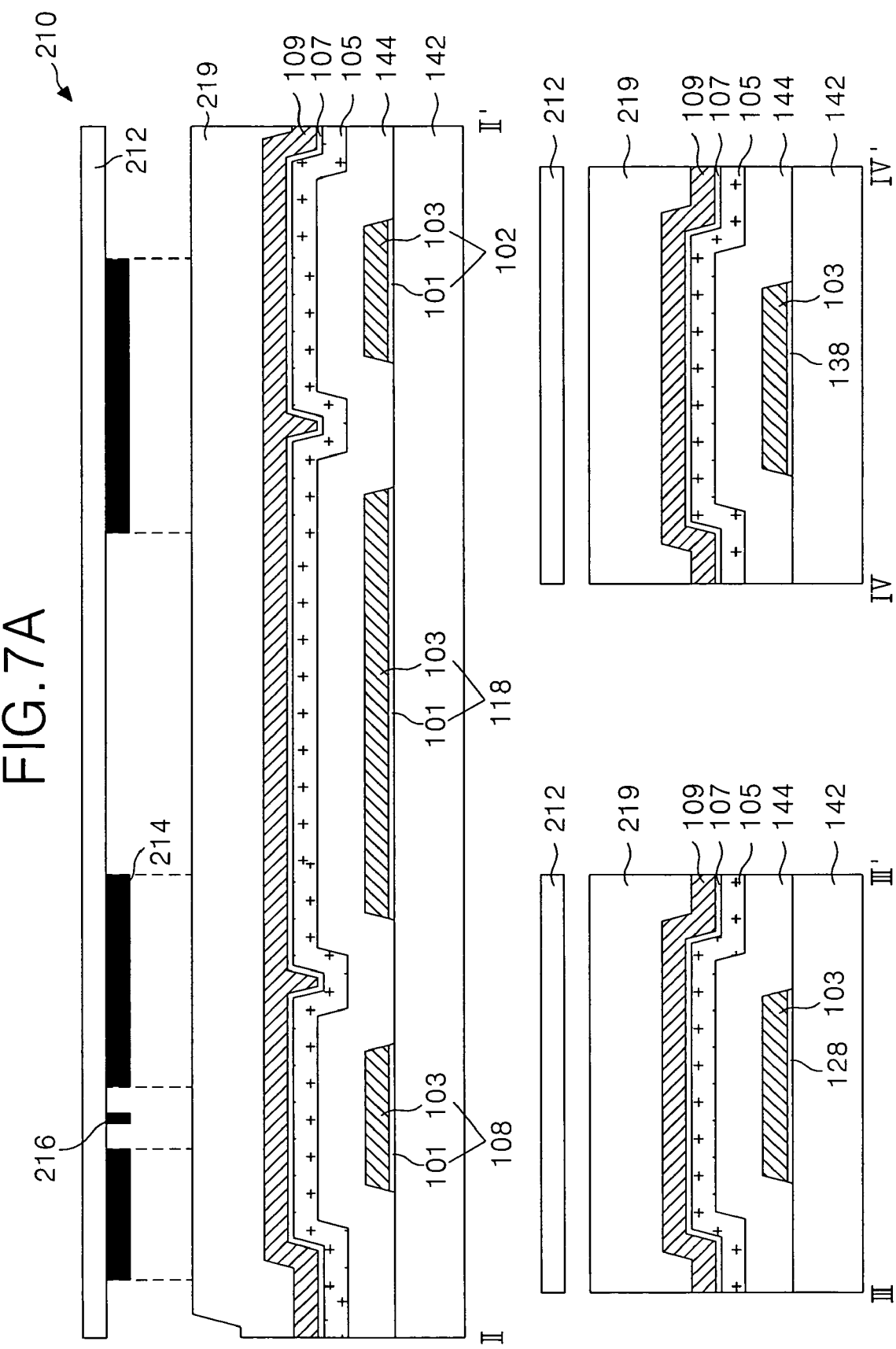

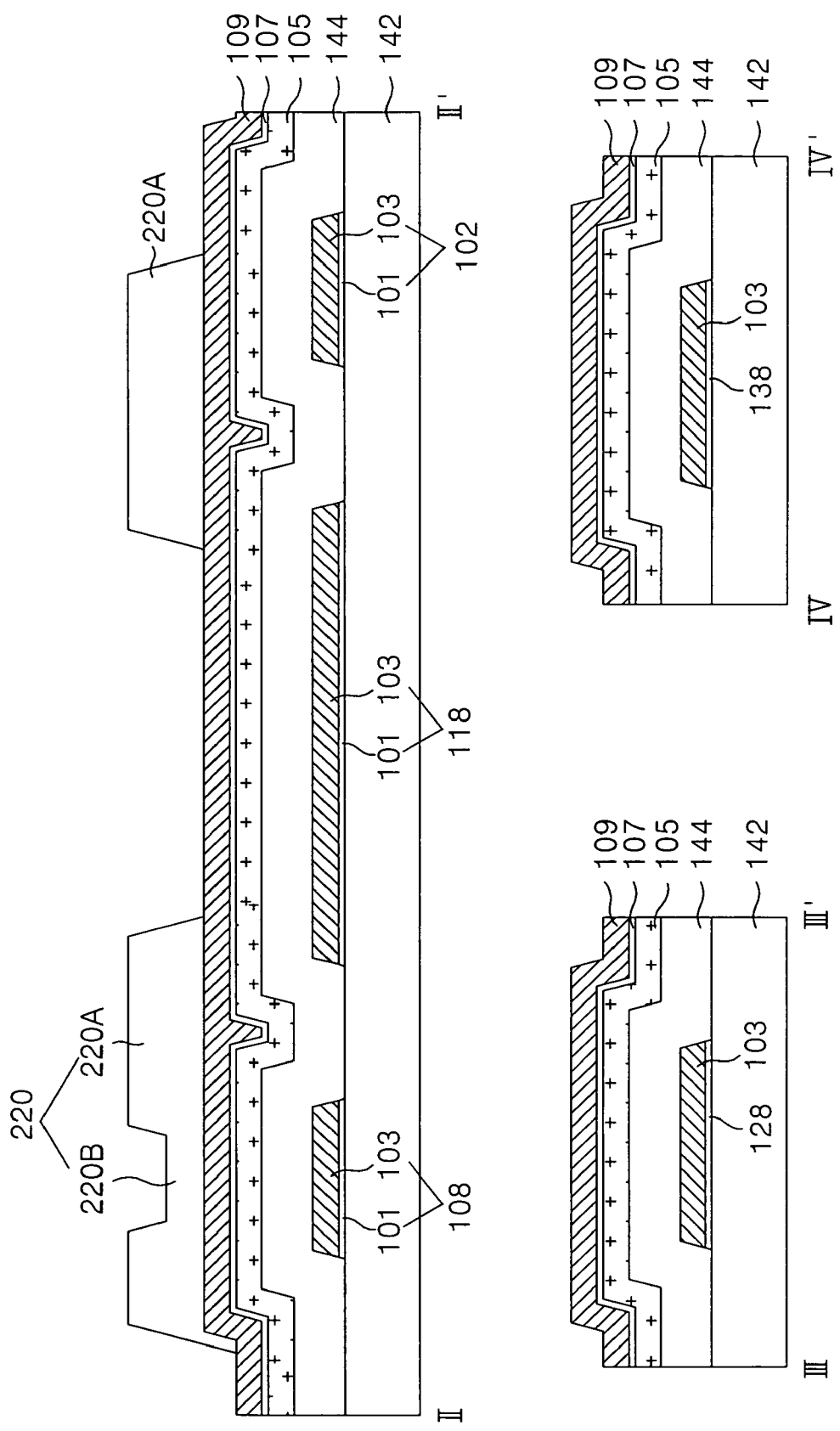

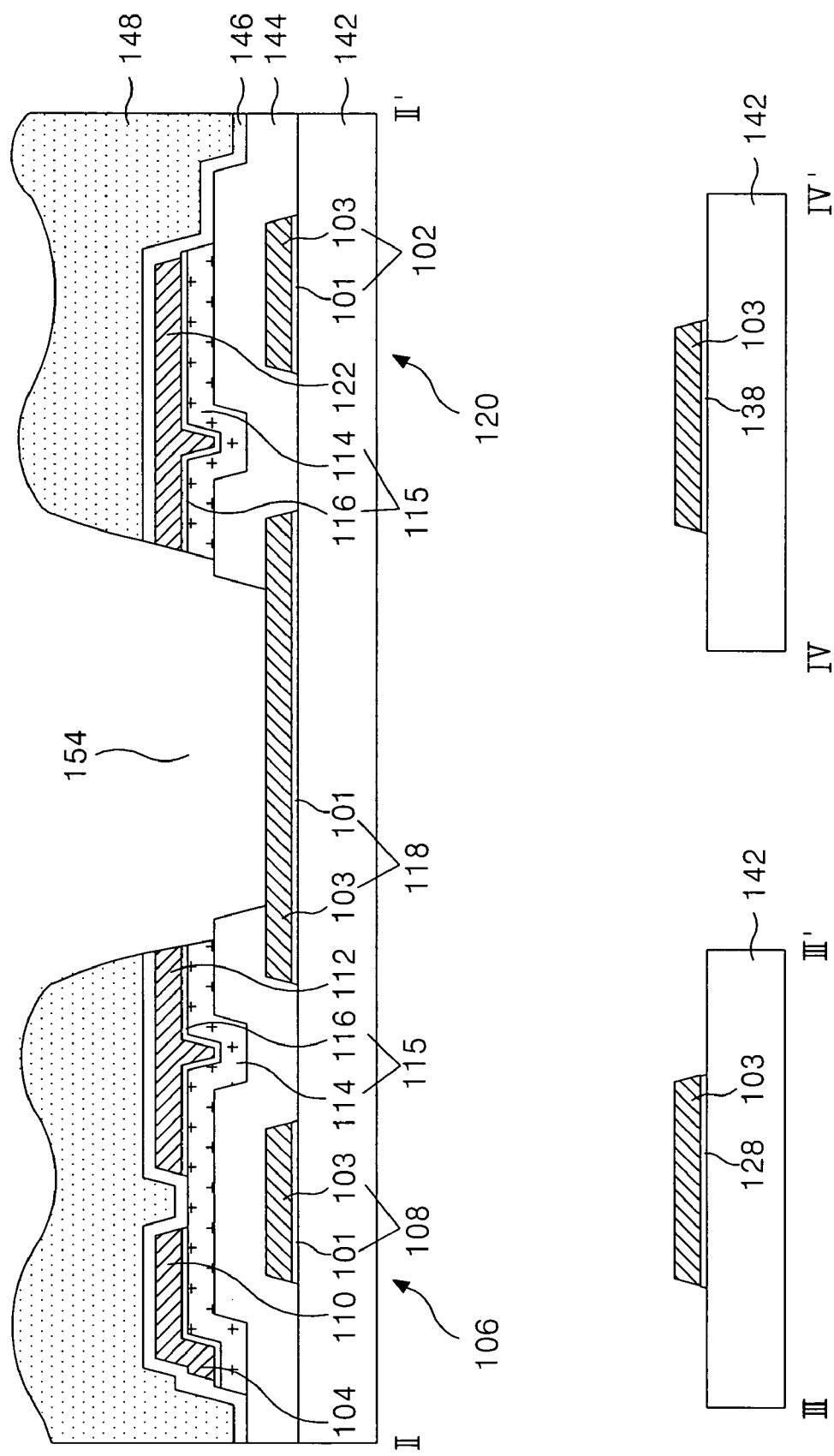

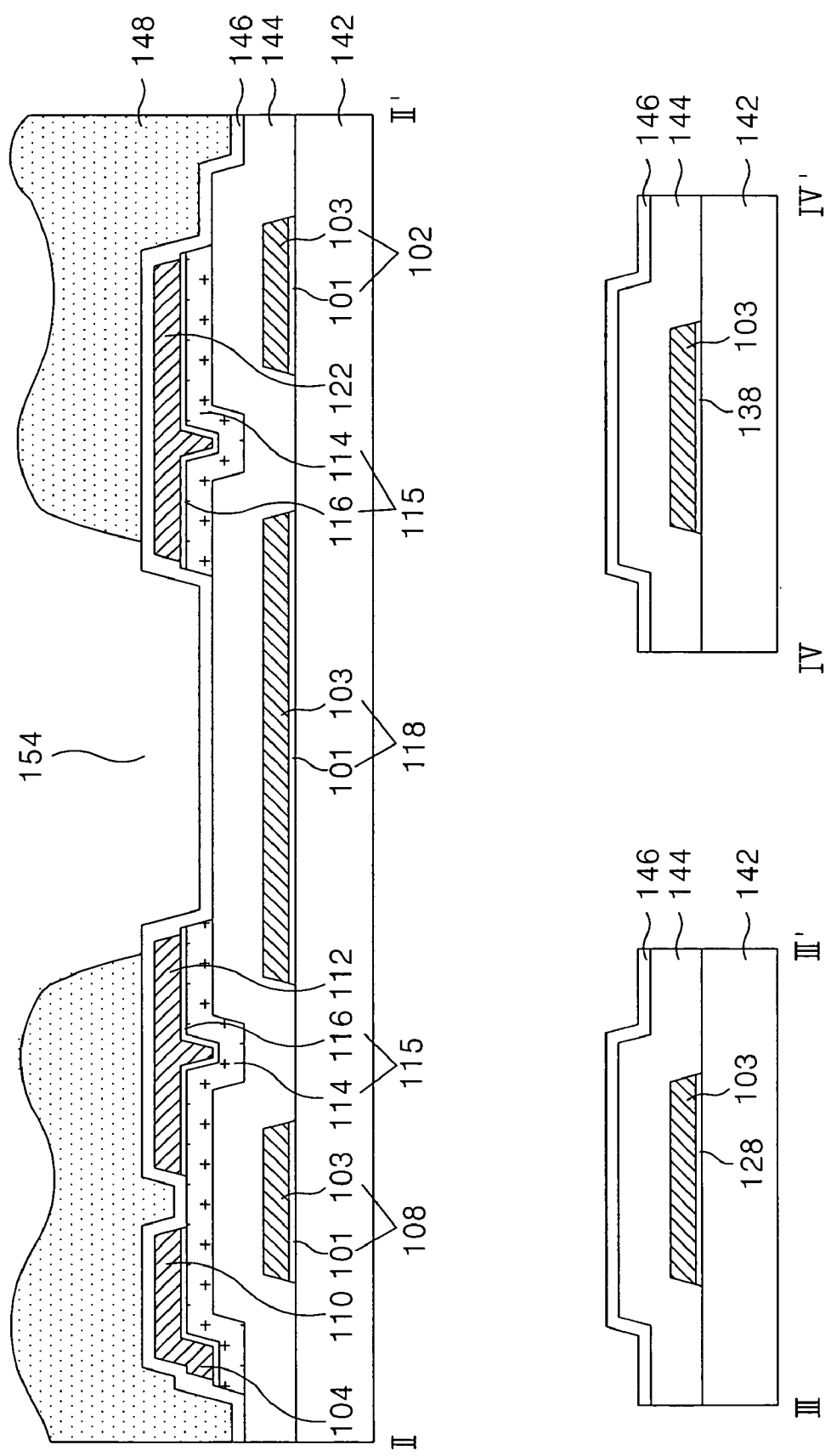

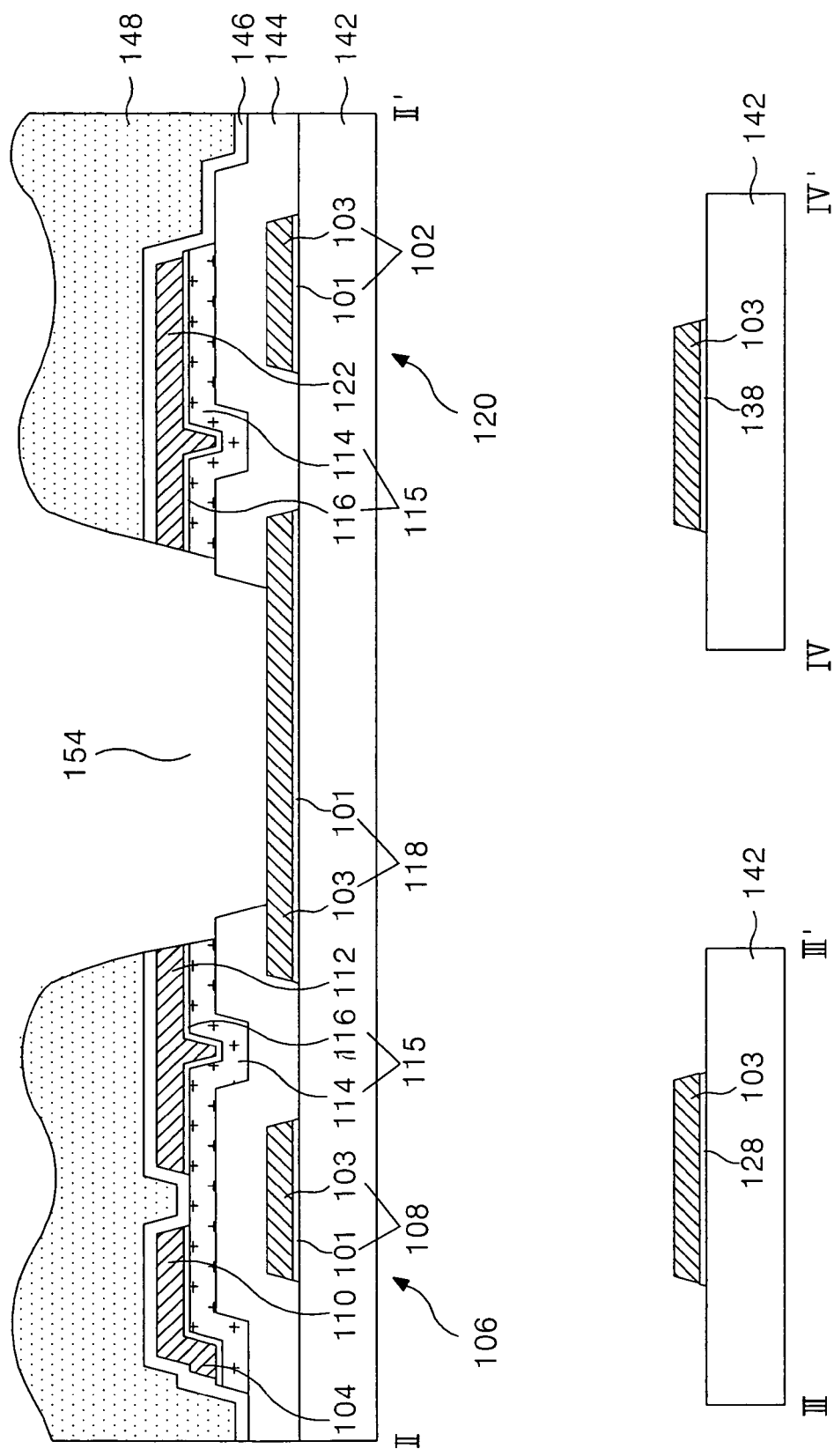

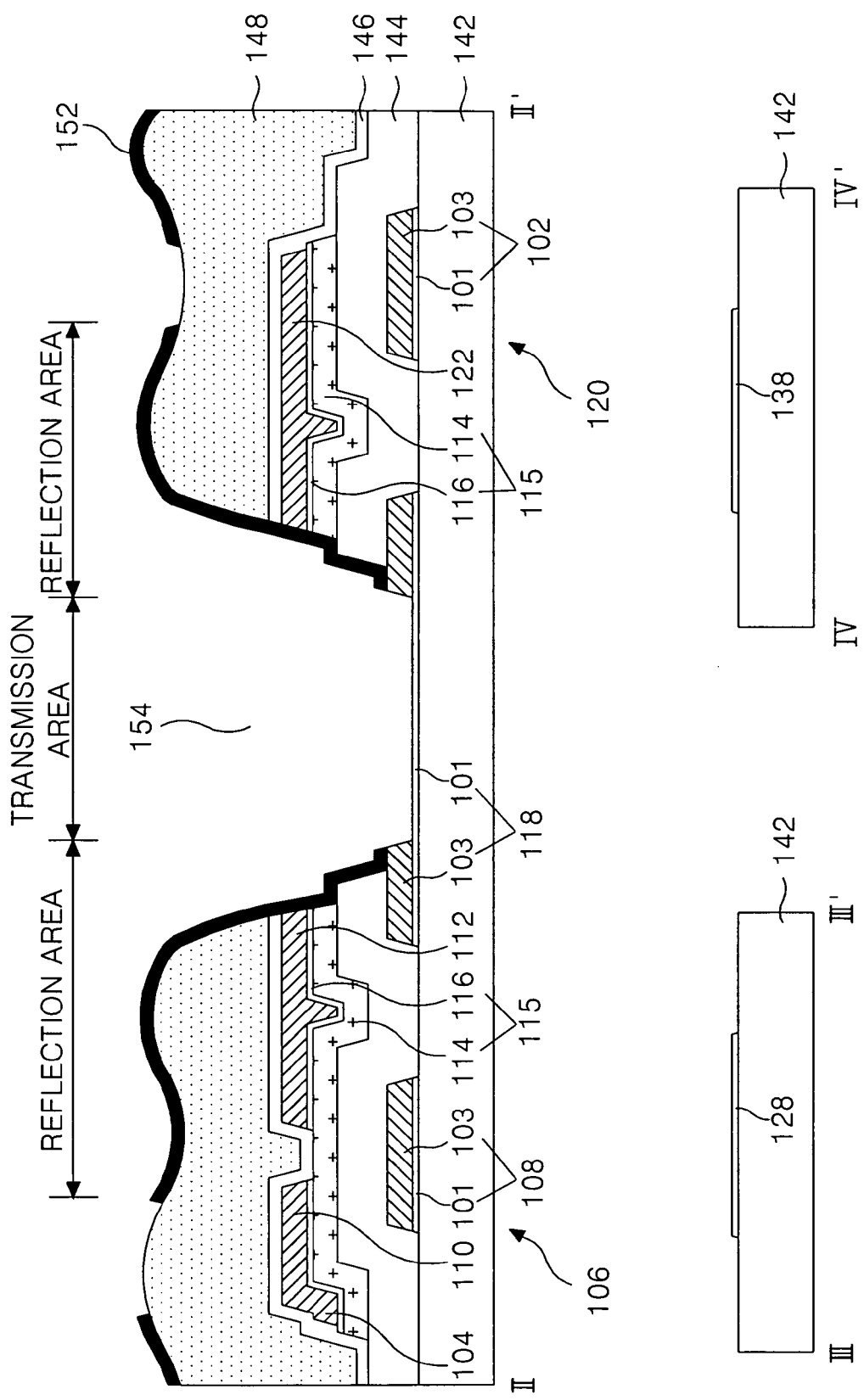

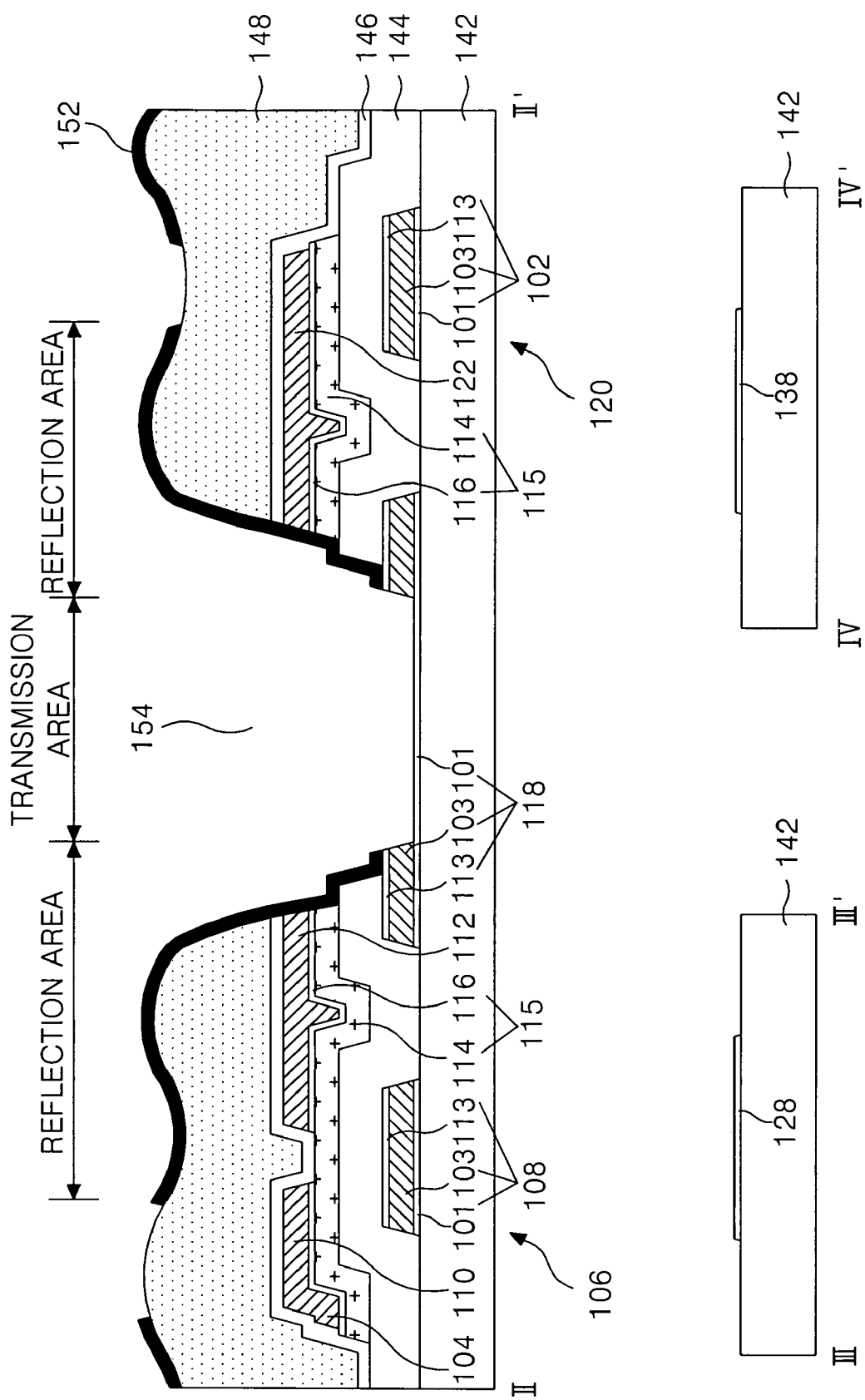

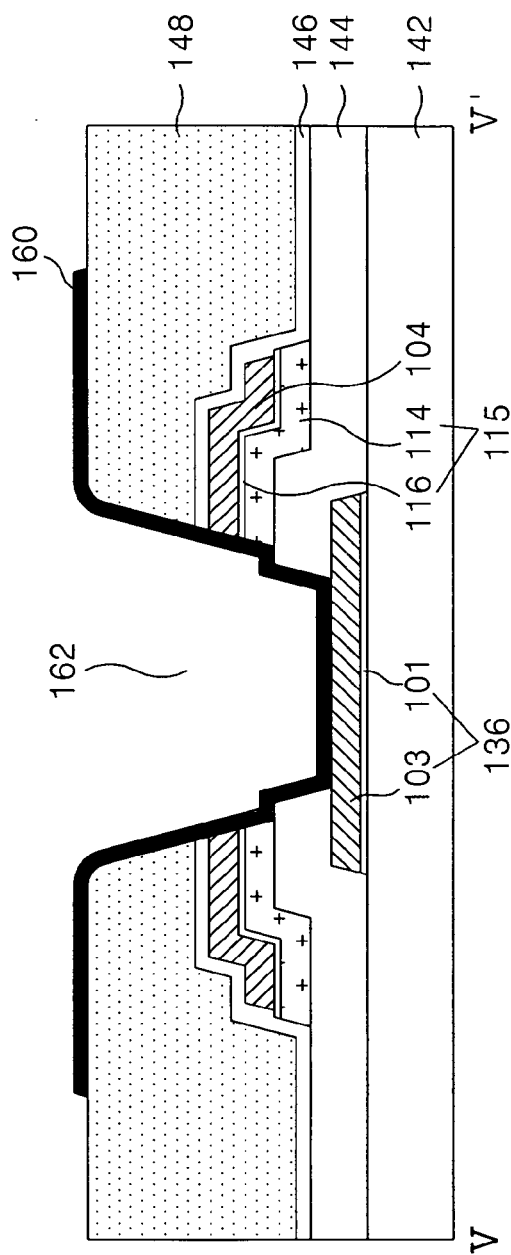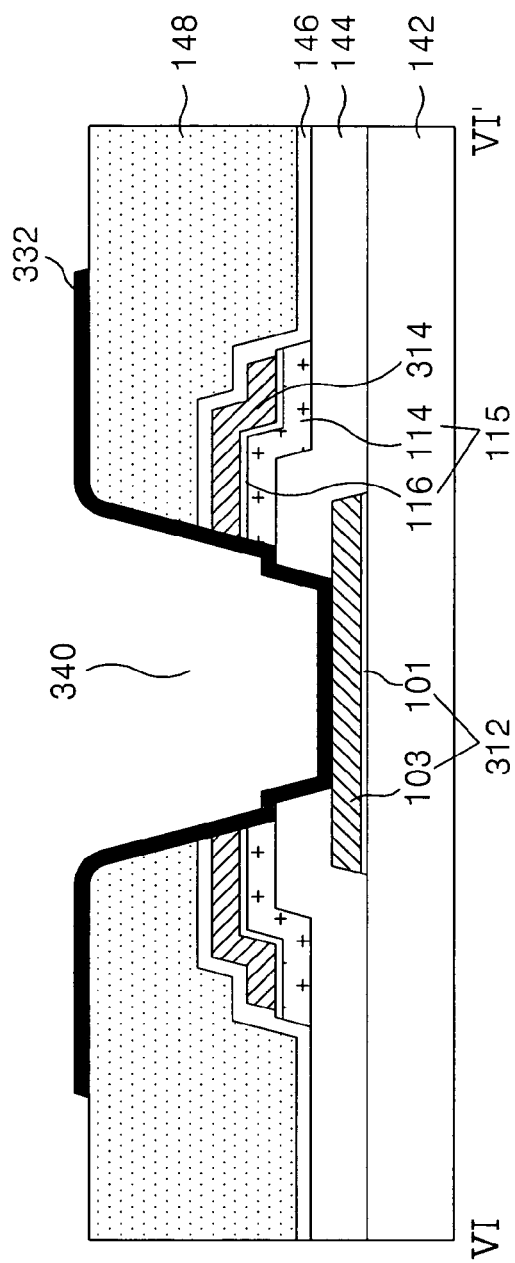
FIG.15

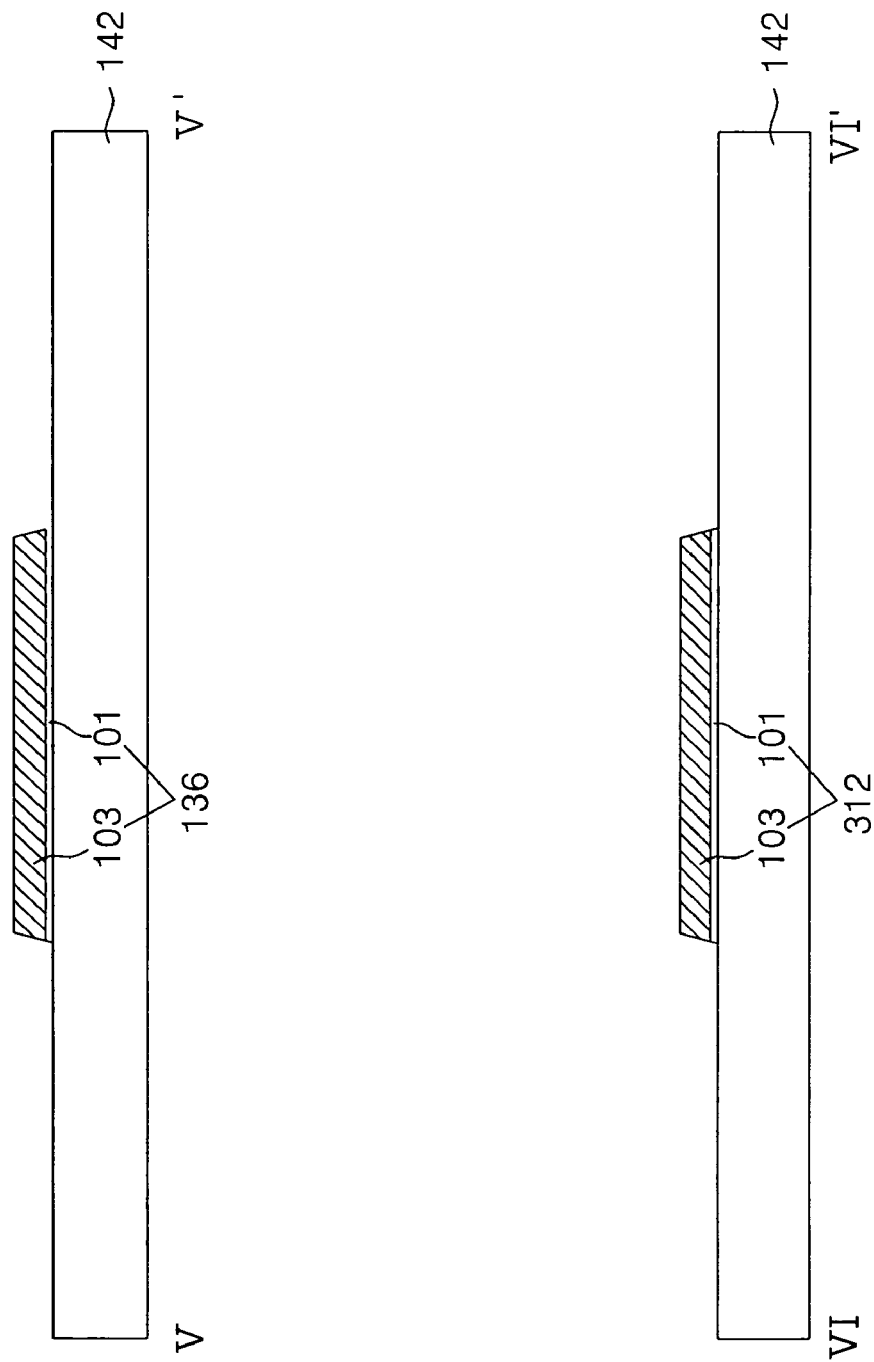

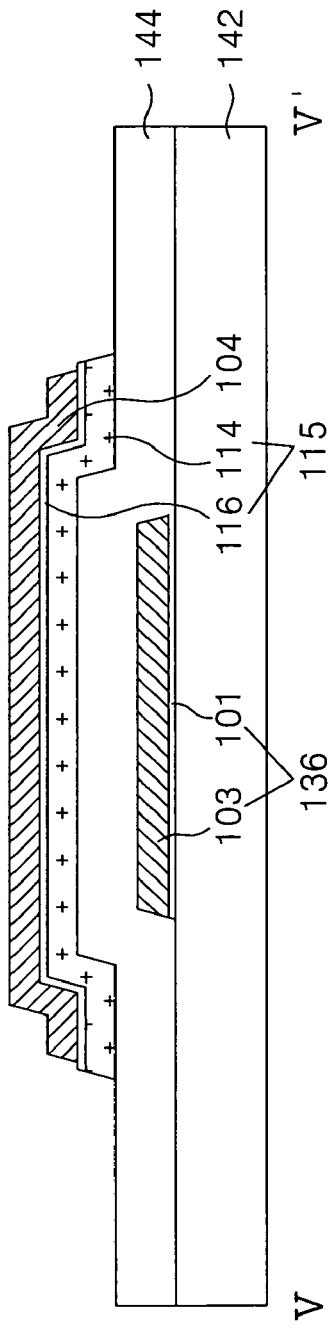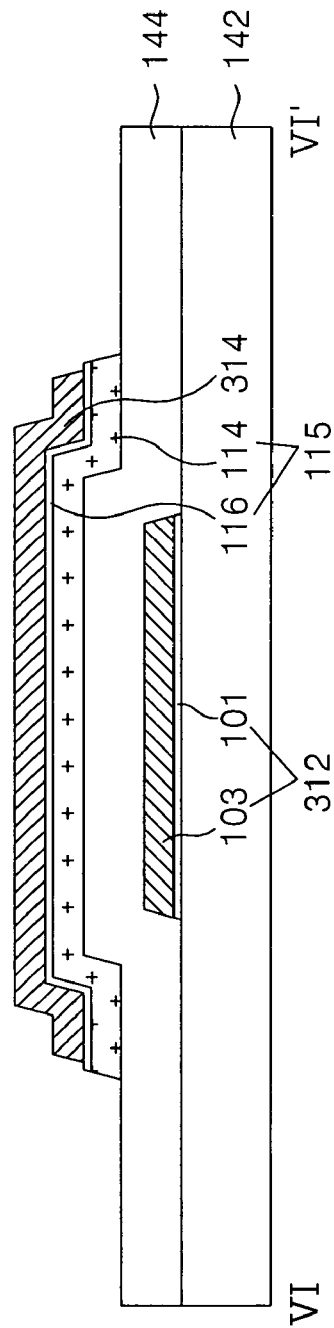
FIG.17B

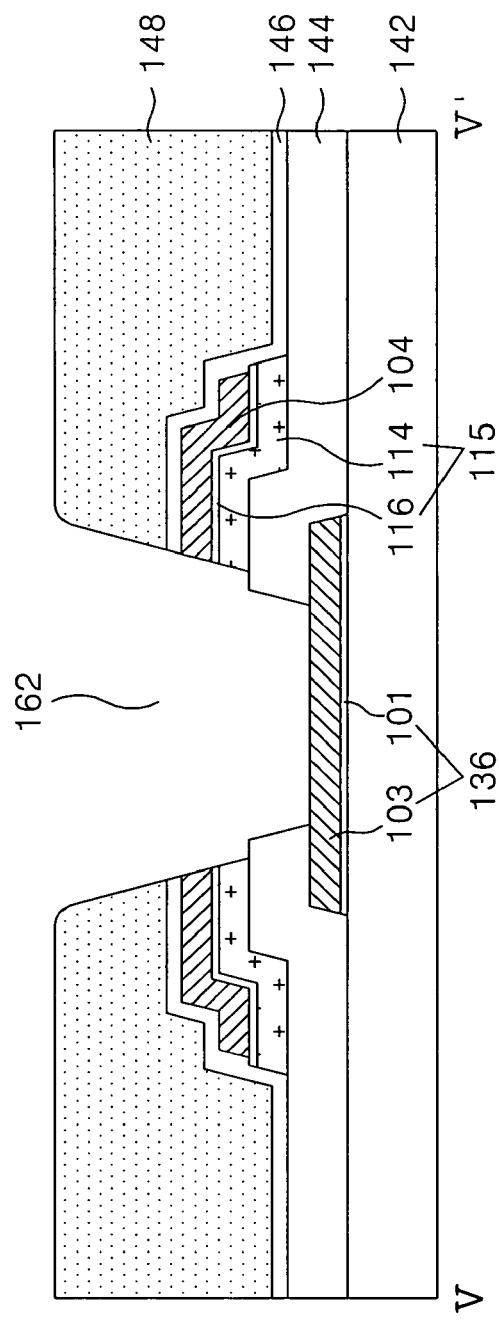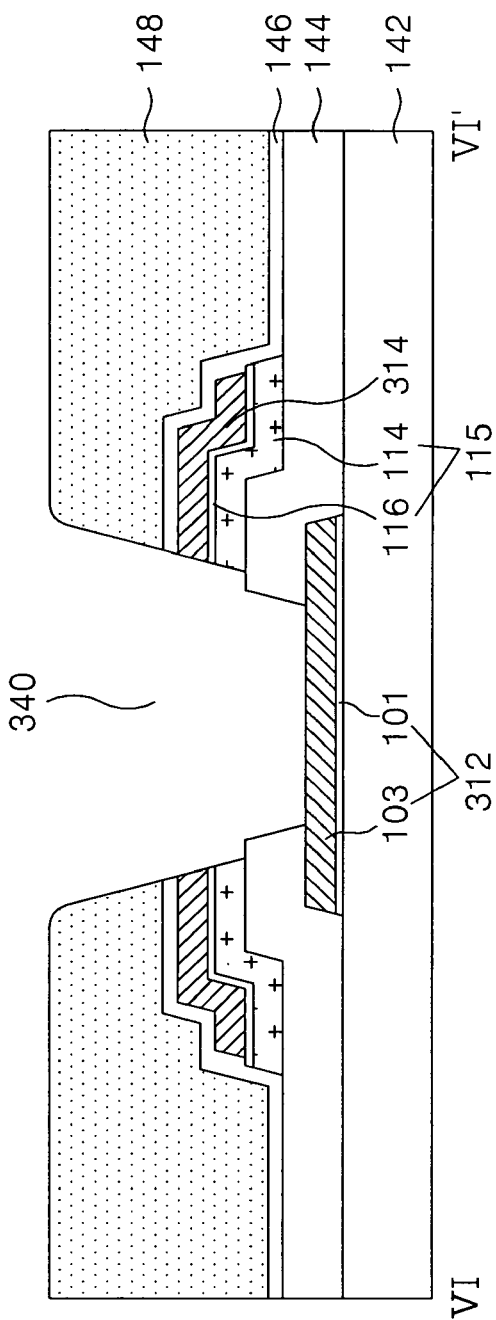
FIG.18B

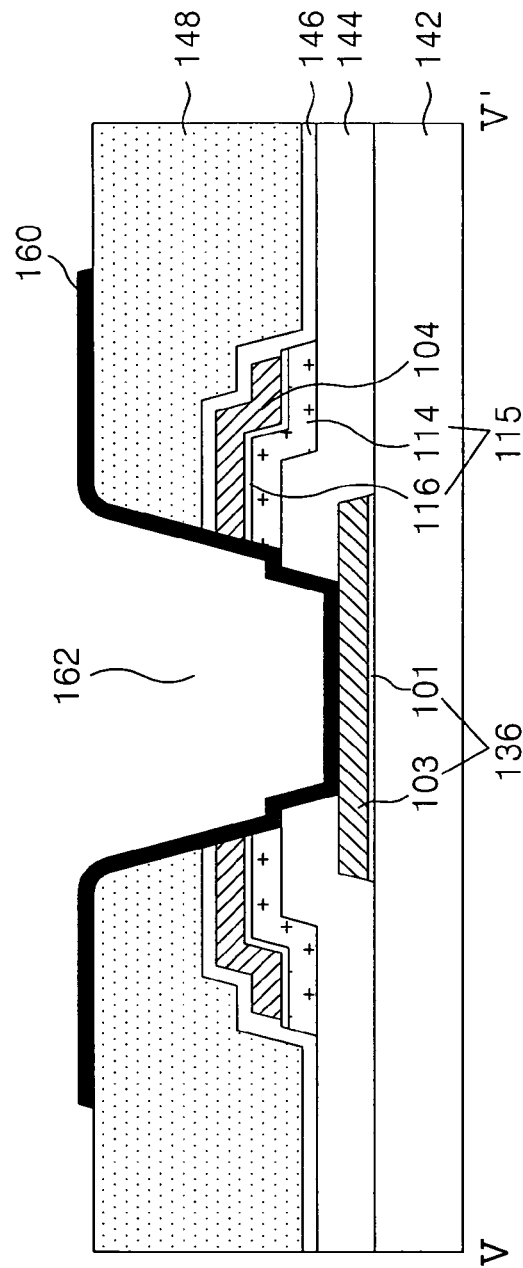
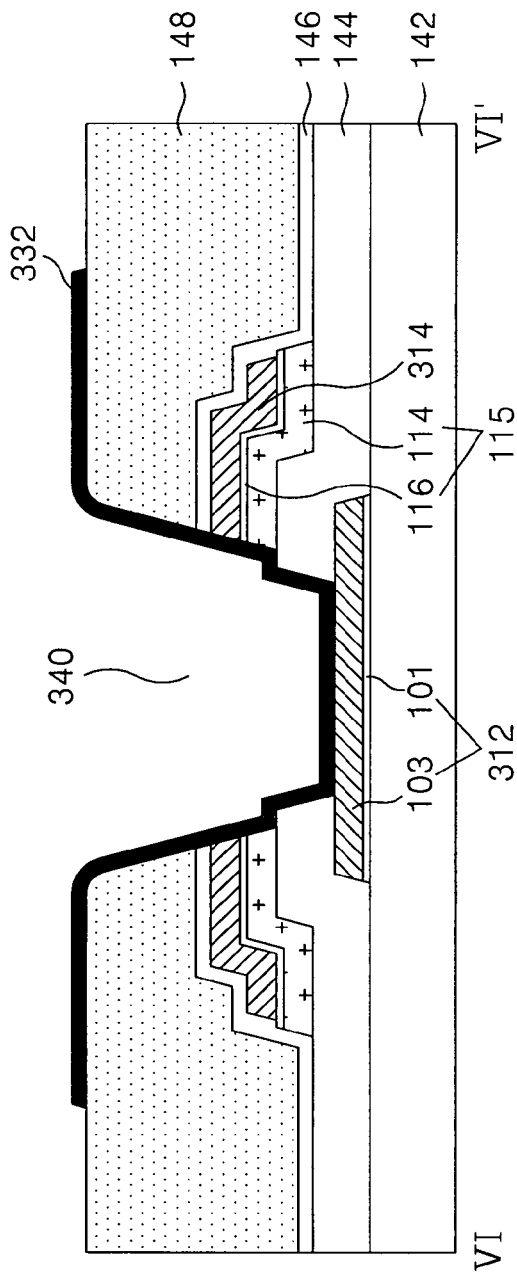
FIG.19B

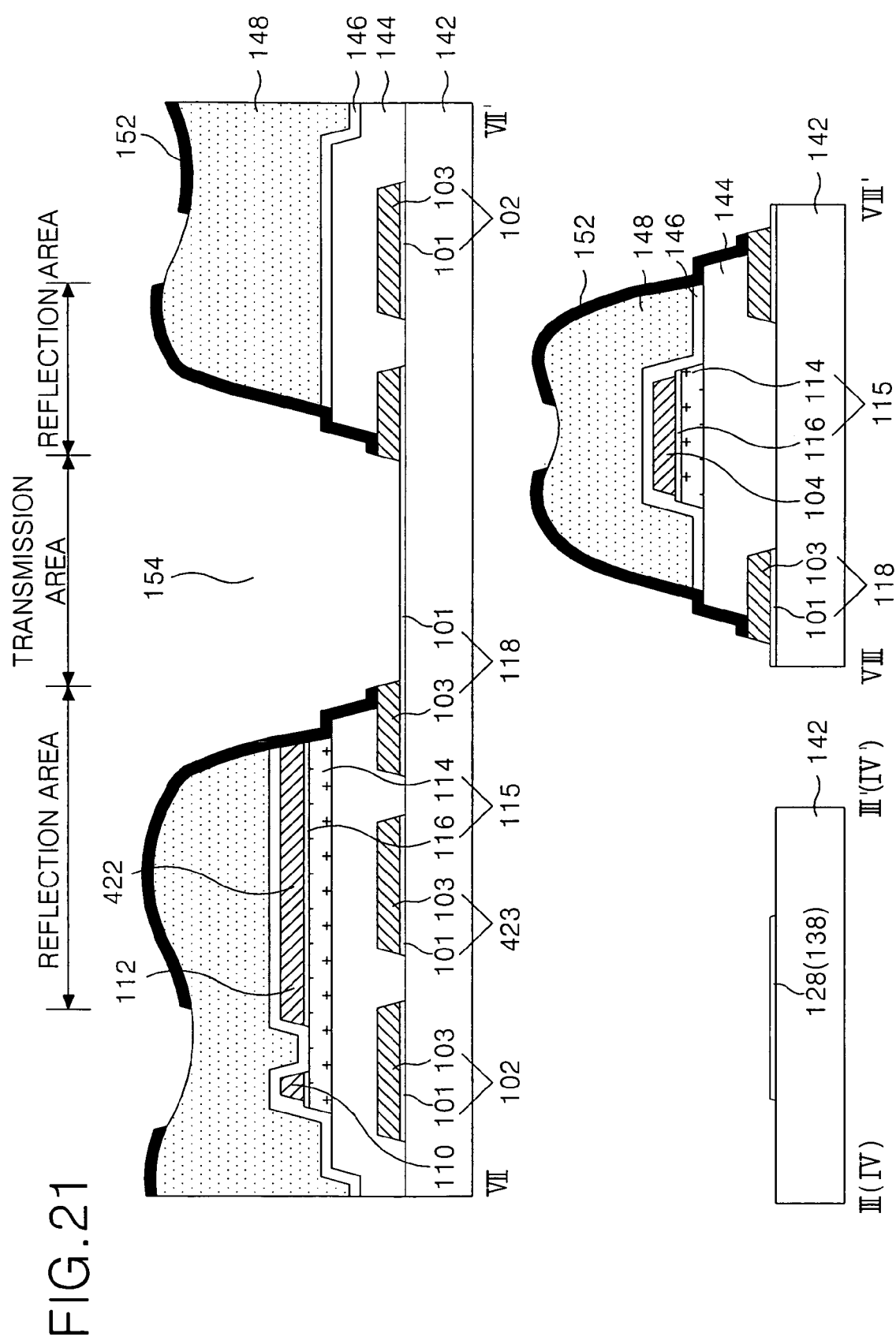

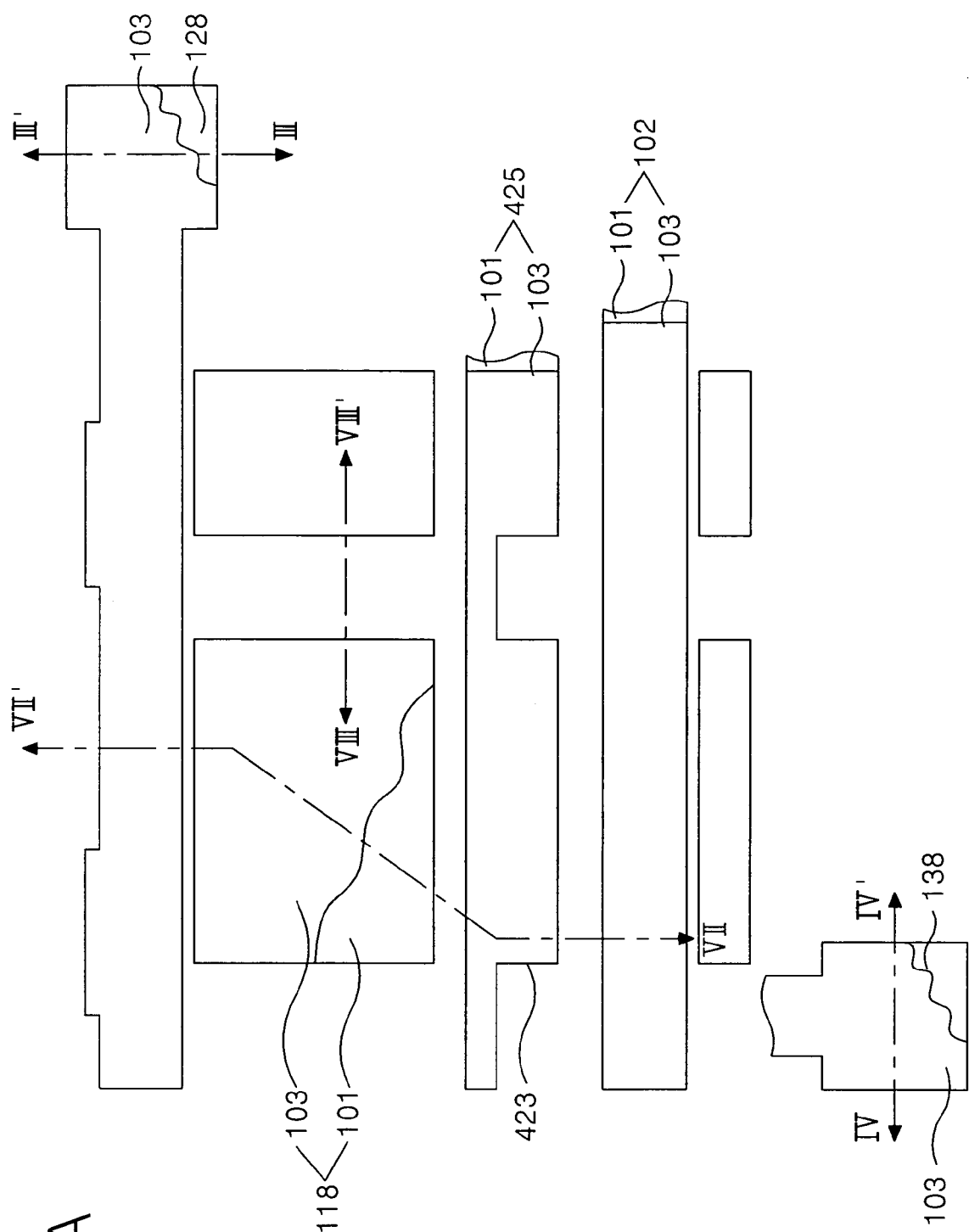

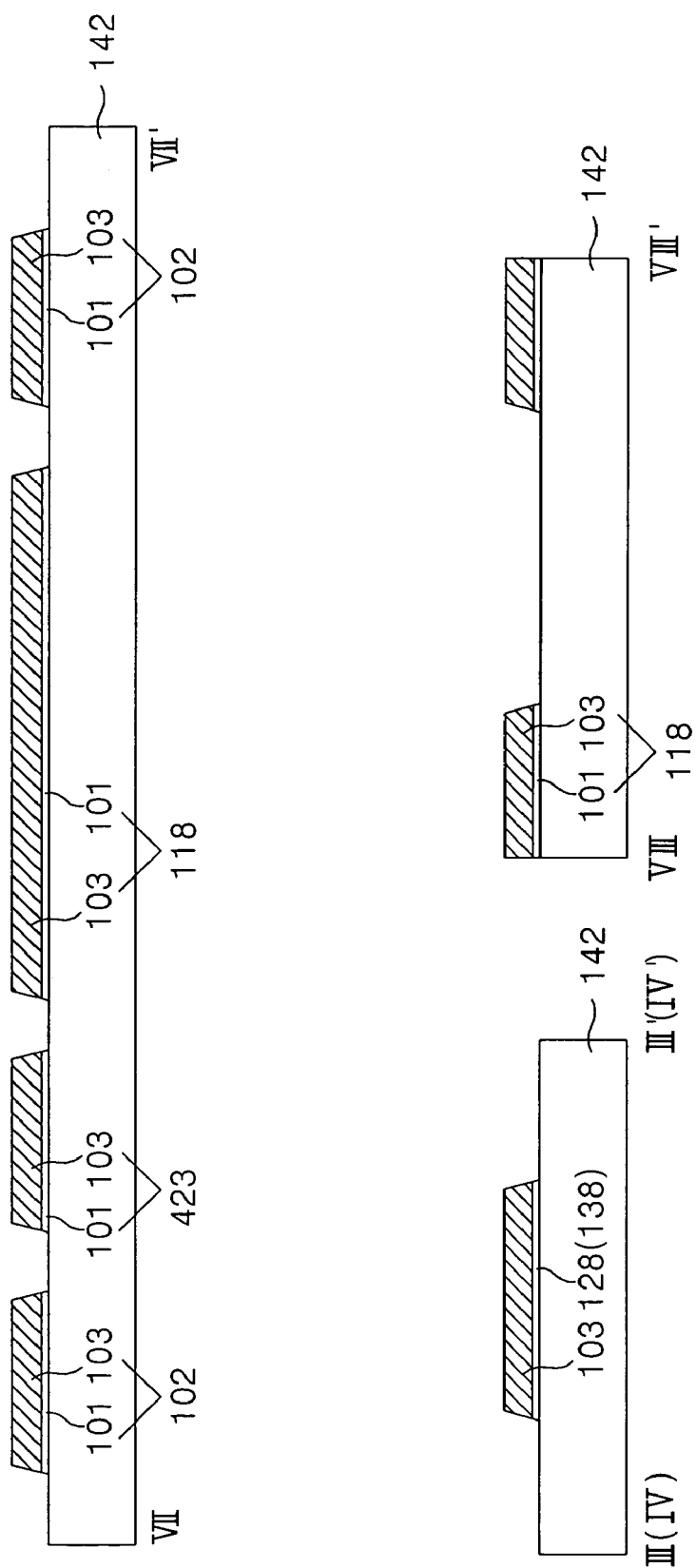

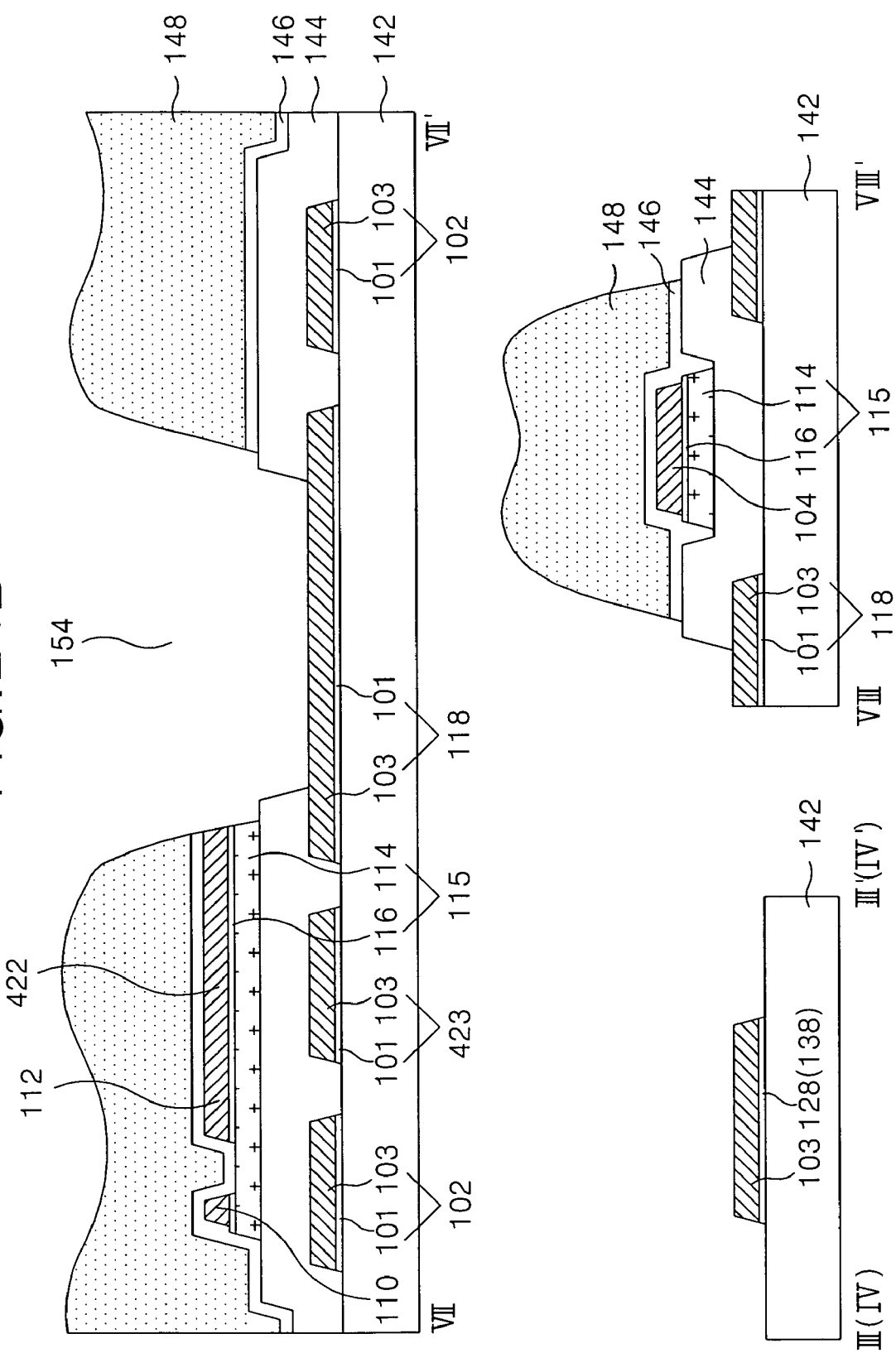

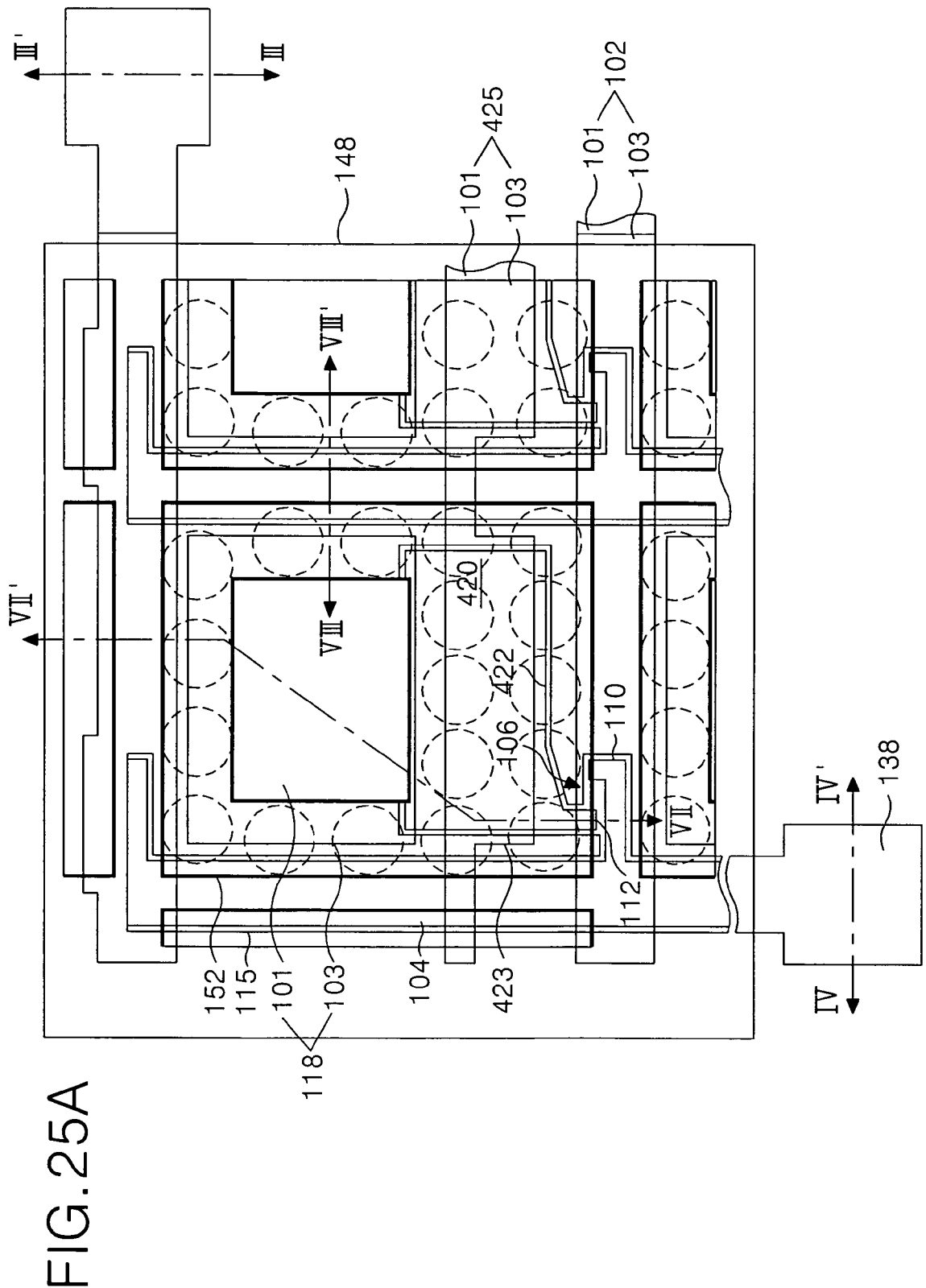

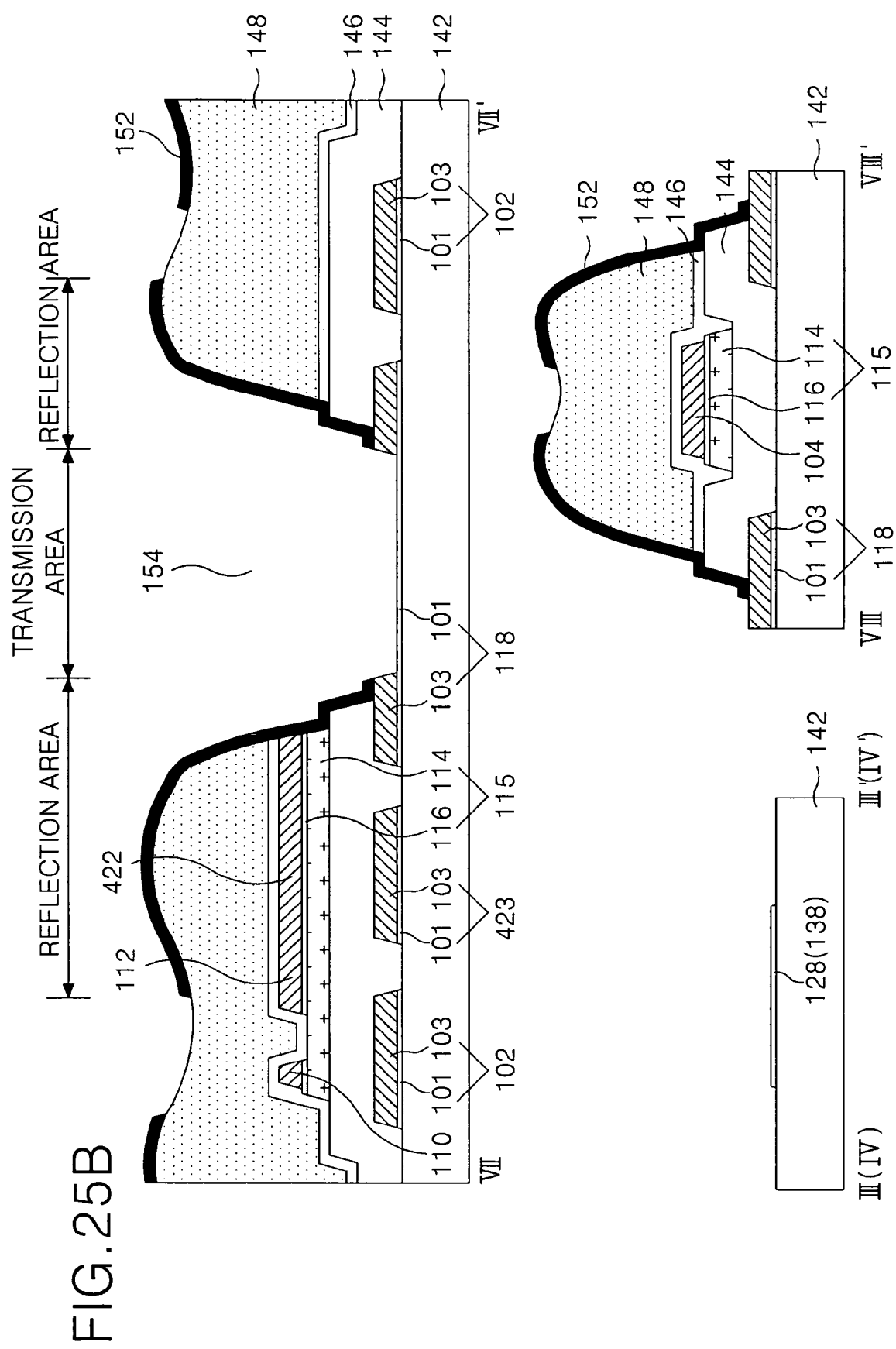

LIQUID CRYSTAL DISPLAY DEVICE AND FABRICATING METHOD THEREOF

This application claims the benefit of Korean Patent Application No. P2004-41142, filed on Jun. 5, 2004, which is hereby incorporated by reference for all purposes as if fully set forth herein.

BACKGROUND OF THE INVENTION

1. Field of the Invention

The present invention relates to a thin film transistor (TFT) substrate of a transflective liquid crystal display device and more particularly to simplified process for fabricating a transflective TFT transistor substrate.

2. Description of the Related Art

Liquid crystal display devices are generally classified into two types: the transmissive type in which pictures are displayed using light supplied from a backlight unit, and the reflective type in which pictures are displayed using light reflected from an external source, such as natural light. There is a problem that the power consumption of a backlight unit is high in the transmissive type and the reflective type depends on the external light so as not to be able to display the picture in a dark environment In order to resolve such a problem, a transflective liquid crystal display device is on the rise, wherein the transflective liquid crystal can be selected to be in a transmissive mode where the backlight unit is used or in a reflective mode where the external light is used. The transflective liquid crystal display device operates in the reflective mode if the external light is sufficient and in the transmissive mode if the external light is not sufficient, thus it might be able to reduce the power consumption more than the transmissive liquid crystal display device and it is not restricted by the external light, which is different from the reflective liquid crystal display device.

Generally, a transflective liquid crystal display panel, as shown in FIG. 1, includes a color filter substrate and a thin film transistor substrate which are bonded together with a liquid crystal layer (not shown) between them, and a backlight unit arranged behind the thin film transistor substrate. Each pixel of the transflective liquid crystal display panel is divided into a reflective area where a reflective electrode 28 is formed, and a transmissive area where the reflective electrode 28 is not formed.

The color filter substrate includes a black matrix (not shown) and a color filter 54 formed on an upper substrate 52, and a common electrode 56 and an alignment film (not shown) formed there over.

The thin film transistor substrate includes a gate line 4 and a data line (not shown) formed on a lower substrate 2 that define each pixel area; a thin film transistor connected to the gate line 4 and the data line; a pixel electrode 32 formed at the pixel area and connected to the thin film transistor; and a reflective electrode 28 formed at a reflective area of each pixel to overlap the pixel electrode.

The thin film transistor includes a gate electrode 6 connected to the gate line 4; a source electrode 16 connected to the data line; a drain electrode 18 facing the source electrode 16; an active layer that overlaps the gate electrode 6 with a gate insulating film 8 there between to form a channel between the source and drain electrodes 16, 18; and an ohmic contact layer 12 to cause the active layer 10 to be in ohmic-contact with the source and drain electrodes 16 and 18. The thin film transistor responds to a scan signal of the gate line 4 to cause a video signal on the data line to be charged and maintained in the pixel electrode 32.

The reflective electrode 28 reflects an external light that is incident through a color filter substrate, toward the color filter substrate. The surface of the organic film 24 formed under the reflective electrode 28 has an embossed or raised shape, therefore the reflective electrode 28, which is formed on top of the organic film, also has an embossed shape. As a result, the reflective efficiency of the reflective electrode 28 increases due to the dispersion effect of the embossed surface.

When a pixel signal is applied to the pixel electrode 32 through the thin film transistor, a potential difference between a common electrode 56 and the pixel electrode 28 is generated. The potential difference causes a liquid crystal having dielectric anisotropy to rotate, thereby controlling the transmissivity of the light that runs through the liquid crystal layer in both the reflective and transmissive areas, thus its brightness is changed in accordance with the video signal.

In this case, a transmission hole 36 is formed in a relatively thick organic film 24 at a transmissive area so that the length of the light path going through the liquid crystal layer is the same in the reflective area as in the transmissive area. As a result, the length of the path RL that ambient light incident to the reflective area travels is the same as the length of the path TL that transmitted light from the backlight unit 60, thus the transmissive efficiency is the same in both the reflective and transmissive modes.

The thin film transistor substrate further includes a storage capacitor connected to the pixel electrode 32 in order to stably maintain the video signal supplied to the pixel electrode 32. The storage capacitor is formed by having a storage upper electrode 20 overlap the gate line 4 with a gate insulating film there between, wherein the storage upper electrode 20 is connected to the pixel electrode 32. The ohmic contact layer 12 and the active layer 10 further overlap under the storage upper electrode 20 in the process.

The thin film transistor substrate further includes a first passivation film 22 between the thin film transistor and the organic film 24; a second passivation film between the organic film 24 and the reflective electrode 28; and a third passivation film 30 between the reflective electrode 28 and the pixel electrode 32. Accordingly, the pixel electrode 32 is connected to the drain electrode 18 and the storage upper electrode 20 through each of the first and second contact holes 34, 38 that penetrate the first to third passivation films 22, 26, 30, an organic film 24 and the reflective electrode 28.

In such a transflective liquid crystal display panel, the thin film transistor substrate includes the semiconductor process and requires a plurality of mask processes, thus its manufacturing process is complicated so that it becomes a material cause for the increase of the liquid crystal display panel manufacturing cost. Hereinafter, a fabricating method of the transflective thin film transistor substrate will be described in reference with FIGS. 2A to 2F.

Referring to FIG. 2A, a gate metal layer is formed on the lower substrate 2 using a deposition method such as sputtering. Subsequently, the gate metal layer is patterned with a first mask using a photolithography process and an etching process, thereby forming the gate pattern including the gate line 4 and the gate electrode 8. The gate metal layer is a single layered or double layered metal such as Al, Mo, Cr.

Next, the gate insulating film 8 is formed on the substrate 2 where the gate pattern is formed, and a source/drain pattern is formed on top thereof using a second mask process as illustrated in FIG. 2B The source/drain pattern includes the data line, the source electrode 16, the drain electrode 18 and the storage upper electrode 20.

The gate insulating film 8, an amorphous silicon layer 10, an amorphous silicon layer with impurities doped thereto 12, and the source/drain metal layer are sequentially formed on the lower substrate 2 where the gate pattern is formed. The gate insulating film 8 is an inorganic insulating material such as silicon oxide SiOx or silicon nitride SiNx, and the source/drain metal layer is a single or double layered metal structure such as Al, Mo and the like.

A photo resist pattern is formed on top of the source/drain metal layer using a second mask and a photolithography process. During this process, a diffractive exposure mask with a diffractive exposure part at a channel part of the thin film transistor is used as the second mask, thus the photo resist pattern of the channel part is made to have a lower height than the source/drain pattern part.

There after, the source/drain metal layer is patterned by wet etching using the photo resist pattern to form the source/drain pattern that includes the data line, the source electrode 16, the drain electrode 18 integrated with the source electrode 16, and the storage upper electrode 20.

Next, an amorphous silicon layer doped with the impurities and an amorphous silicon layer are simultaneously patterned by a dry etching using the same photo resist pattern, thereby forming the ohmic contact layer 12 and the active layer 10.

After removing the photo resist pattern having relatively low height at the channel part by ashing, the source/drain pattern and the ohmic contact layer 12 of the channel part are dry etched. Accordingly, the active part 10 of the channel part is exposed to separate the source electrode 16 from the drain electrode 18. There after, the photo resist pattern remaining on the source/drain pattern is removed using a strip process.

Referring to FIG. 2C, a first passivation film 22 is formed on the gate insulating film 8 where the source/drain pattern is formed, and an organic film 24 is formed on top thereof using a third mask process, such that the organic film 24 has first and second initial contact holes 34, 38 and a transmission hole 36 with an embossed shaped surface.

The first passivation film 22 and the organic film 24 are sequentially formed on the gate insulating film 8 where the source/drain pattern is formed. The first passivation film 22 is of the same inorganic insulating material as the gate insulating film 8, and the organic film 24 is of a photosensitive organic material such as acrylic resin.

Then, the organic film 24 is patterned using the third mask, thereby forming first and second open holes 35, 37 and the transmission hole 36 which penetrate the organic film 24 in correspondence to the transmissive part of the third mask. The third mask has a structure where a shielding part and a diffractive exposure part repeat at the rest area except for the transmissive part. The organic film 24 remaining in correspondence thereto is patterned to have a structure that a shielding area (projected part) and a diffractive exposure area (groove part) having a stepped difference are repeated. Subsequently, the organic film 24 where the projected part and the groove part are repeated is cured so that the surface of the organic film 24 has the embossed shape.

Referring to FIG. 2D, a second passivation film 26 is formed on the organic film 24, and the reflective electrode 28 is formed on top thereof using a fourth mask process. The second passivation film 26 and the reflective metal layer are deposited to maintain their embossed shape on top of the organic film 24 that has the same embossed surface. The second passivation film 26 is an inorganic insulating material such as the first passivation film 22, and the reflective metal layer is a metal with high reflectivity such as AlNd.

Subsequently, the reflective metal layer is patterned using a fourth mask and etching process, thus the reflective electrode 28 is formed, wherein the reflective electrode is independent every pixel and is opened at the transmission hole 36 and the first and second open holes 35, 37 of the organic film 24.

Referring to FIG. 2E, a third passivation film 30 covering the reflective electrode 28 is formed using a fifth mask process, and first and second contact holes 34, 38 penetrating the first to third passivation films 22, 26, 30 are formed. The third passivation film 30 the reflective electrode 28 and the first and second contact holes 34, 38 are formed with the fifth mask using photolithography and etching processes, such that the first and second contact holes 34, 38 penetrate the first to third passivation films 22, 26, 30 at the first and second open holes 35, 37 of the organic film 24. The first and second contact holes 34, 38 each expose the drain electrode 18 and the storage upper electrode 20. The third passivation film is of the same inorganic insulating material as the second passivation film.

Referring to FIG. 2F, a pixel electrode 32 is formed on the third passivation film 30 by use of a sixth mask process. More specifically, a transparent conductive layer is formed on the third passivation film 30 using a deposition method such as sputtering, and the transparent conductive layer is patterned by the photolithography process using a sixth mask and the etching process to form the pixel electrode at each pixel area. The pixel electrode 32 is connected to the drain electrode 18 and the storage upper electrode 20 through the first and second contact holes 34 and 38. The transparent conductive layer is of indium tin oxide ITO.

Accordingly, the related art transflective thin film transistor substrate is formed using six 6 different mask processes, thus there is a disadvantage that its manufacturing process is complicated. Further, the margin of the first and second contact holes 34, 38 should be secured sufficiently in order for the pixel electrode 32 to be connected to the drain electrode 18 and the storage upper electrode 20 in the related art transflective thin film transistor substrate. Because of this, there is a disadvantage that the aperture ratio of the transmissive area is reduced.

SUMMARY OF THE INVENTION

Accordingly, the present invention is directed to a liquid crystal display device and method of fabricating same that substantially obviates one or more of the problems due to limitations and disadvantages of the related art.

Accordingly, an advantage of the present invention is to provide a transflective thin film transistor substrate with increased aperture ratio in a transmissive area, and a simplified method of fabricating same.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages an in accordance with the purpose of the present invention, as embodied and broadly described, a liquid crystal display device is provided, comprising: first and second substrates; a gate line having a double layer including a first transparent conductive layer and a second opaque conductive layer on the first substrate; a first insulation film on the gate line; a data line crossing the gate line to define a pixel region, the pixel region having a transmissive area and a reflective area; a thin film transistor connected to the gate and data lines; a pixel electrode having the first conductive layer in the pixel region and the second conductive layer along a boundary of the first conductive layer; a storage upper electrode forming a storage capacitor by overlapping the gate line with the first insulation film there between; a transmission hole exposing a side of the storage upper electrode and a side of a drain electrode of the thin film transistor by passing through the first insulation film and a second insulation film on the thin film transistor; a reflective electrode connecting the second conductive layer of the pixel electrode with the drain electrode and the storage upper electrode through an edge portion of the transmission hole; and a liquid crystal layer between the first and second substrates.

In another aspect of the present invention, In another aspect of the present invention, a liquid crystal display device, comprising: first and second substrates; a gate line having a double layer structure including a first transparent conductive layer and a second opaque conductive layer; a first insulation film on the gate line; a data line crossing the gate line to define a pixel region, the pixel region having a transmissive area and a reflective area; a thin film transistor connected to the gate and data lines; a pixel electrode having the first conductive layer and the second conductive layer along the boundary of the first conductive layer; a storage line having a double layer and a storage lower electrode integrated with the storage line; a storage upper electrode integrated with a drain electrode of the thin film transistor and overlapping the storage lower electrode with the first insulation film there between to form a storage capacitor; a transmission hole exposing a side surface of the storage upper electrode by passing through the first insulation film from a second insulation film on the thin film transistor; a reflective electrode connecting the second conductive layer of the pixel electrode with the drain electrode and the storage upper electrode through an edge portion of the transmission hole; and a liquid crystal layer between the first and second substrates.

In still another aspect of the invention, a method of fabricating a liquid crystal display device is provided, comprising: providing first and second substrates; forming a gate pattern having a double layer structure including a first transparent conductive layer and a second opaque conductive layer on the first substrate using a first mask, the gate pattern including a pixel electrode, a gate electrode, and a gate line; forming a first insulation film on the gate pattern; forming a semiconductor pattern and a source/drain pattern on the first insulation film using a second mask, the source/drain pattern including a storage upper electrode, a drain electrode, a source electrode, and a data line, the gate and data lines defining a pixel region; forming a second insulation film covering the source/drain pattern; forming a transmission hole passing through the second insulation film to the first insulation film using a third mask; forming a reflective electrode connecting the second conductive layer of the pixel electrode with the drain electrode and the storage electrode through the transmission hole and removing a portion of the second conductive layer of the pixel electrode using a fourth mask; and forming a liquid crystal layer between the first and second substrates.

In still another aspect of the present invention, a method of fabricating a liquid crystal display device is provided, comprising: providing first and second substrates; forming a gate pattern having a double layer of a first transparent conductive layer and a second opaque conductive layer on the first substrate using a first mask, the gate pattern including a storage electrode integrated with a storage line, a pixel electrode, a gate electrode and a gate line; forming a first insulation film on the gate pattern; forming a semiconductor pattern and a source/drain pattern on the first insulation film using a second mask, the source/drain pattern including a storage upper electrode integrated with a drain electrode, a source electrode, a data line, the data and gate lines defining a pixel region; forming a second insulation film on the source/drain pattern; forming a transmission hole passing through the second insulation film to the first insulation film using a third mask; forming a reflective electrode connecting the second conductive layer of the pixel electrode with the storage electrode through the transmission hole and removing the second conductive layer of the pixel electrode using a fourth mask; and forming a liquid crystal layer between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention.

In the drawings:

FIG. 4 is a sectional diagram illustrating the transflective thin film transistor substrate shown in FIG. 3, taken along the line II-II', III-III, IV-IV';

FIGS. 6A and 6B illustrate a plane view and a sectional diagram, respectively, of a second mask process for the transflective thin film transistor substrate according to an embodiment of the present invention;

FIGS. 7A to 7E are sectional diagrams further illustrating a second mask process of the present invention;

FIGS. 8A and 8B illustrate a plane view and a sectional diagram, respectively, of a third mask process for the transflective thin film transistor substrate according to an embodiment of the present invention;

FIGS. 9A to 9C are sectional diagrams further illustrating the third mask process according to the present invention;

FIGS. 10A and 10B illustrate a plane view and a sectional diagram, respectively, of a fourth mask process for the transflective thin film transistor substrate according to an embodiment of the present invention;

FIG. 11 is a sectional diagram illustrating a transflective thin film transistor substrate according to another embodiment of the present invention;

FIG. 15 is sectional diagram illustrating the transflective thin film transistor substrate illustrated in FIG. 14, taken along the line V-V' and VI-VI';

FIGS. 16A and 16B illustrate a plane view and a sectional diagram, respectfully, of a first mask process for the transflective thin film transistor substrate illustrated in FIG. 15;

FIGS. 17A and 17B illustrate a plane view and a sectional diagram, respectfully, of a second mask process for the transflective thin film transistor substrate in FIG. 15;

FIGS. 18A and 18B illustrate a plane view and a sectional diagram, respectively, of a third mask process for the transflective thin film transistor substrate in FIG. 15;

FIGS. 19A and 19B illustrate a plane view and a sectional diagram, respectively, of a fourth mask process for the transflective thin film transistor substrate in FIG. 15;

FIG. 21 is a sectional diagram illustrating the thin film transistor substrate illustrated in FIG. 20, taken along the lines VII-VII', VIII-VIII', III-III', IV-IV';

FIGS. 22A and 22B illustrate a plane view and a sectional diagram, respectively, of a first mask process for the transflective thin film transistor substrate according to another embodiment of the present invention;

FIGS. 24A and 24B illustrate a plane view and a sectional diagram, respectively, of a third mask process for the transflective thin film transistor substrate according to another embodiment of the present invention; and FIGS. 25A and 25B illustrate a plane view and a sectional diagram, respectively, of a fourth mask process for the transflective thin film transistor substrate according to another embodiment of the present invention.

DETAILED DESCRIPTION OF THE INVENTION

Reference will now be made in detail to embodiments of the present invention, examples of which are illustrated in the accompanying drawings.

Figure 1:
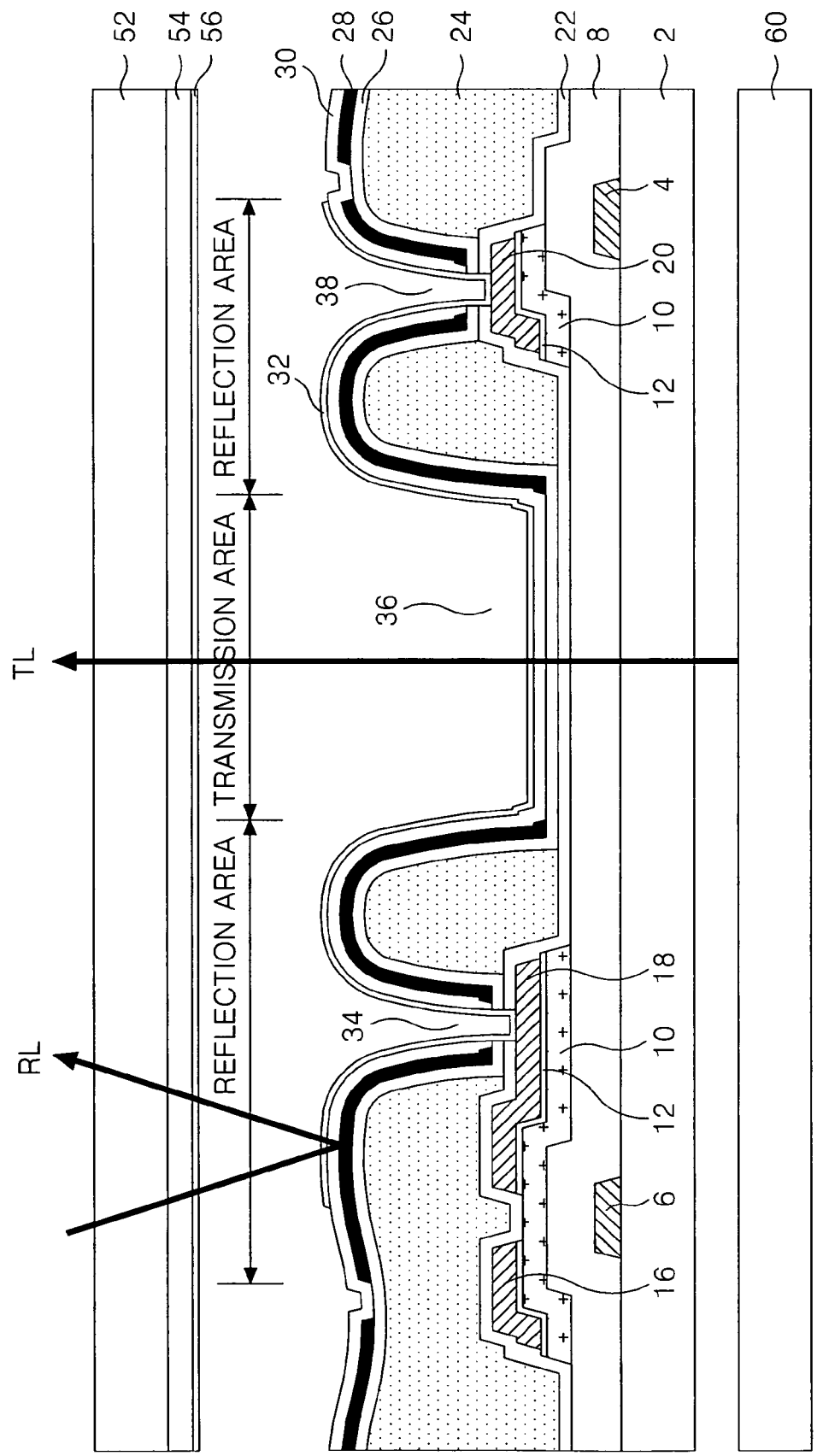
FIG. 1 is a sectional diagram illustrating a part of a related art transflective liquid crystal display panel.
Figure 2A:
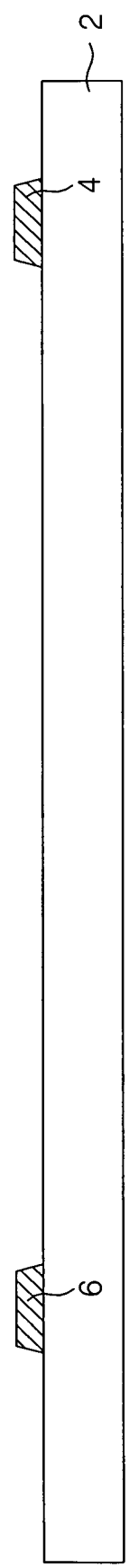
FIGS. 2A to 2F are sectional diagrams illustrating a method of fabricating the transflective thin film transistor substrate illustrated in FIG. 1.
Figure 2B:
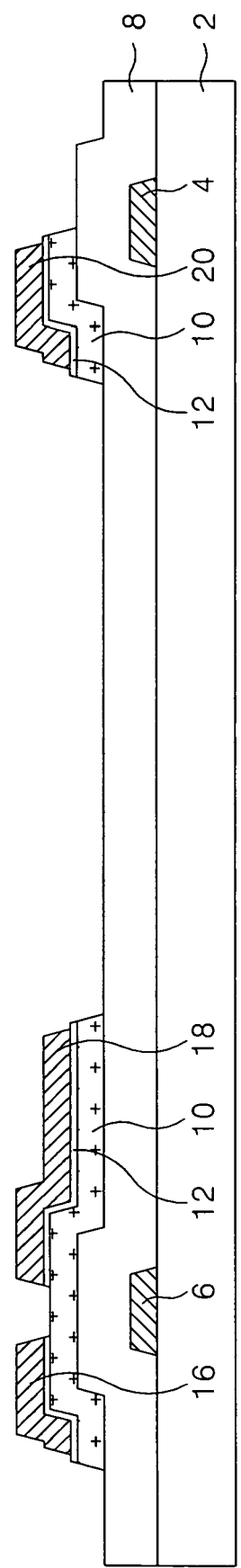
Figure 2C:
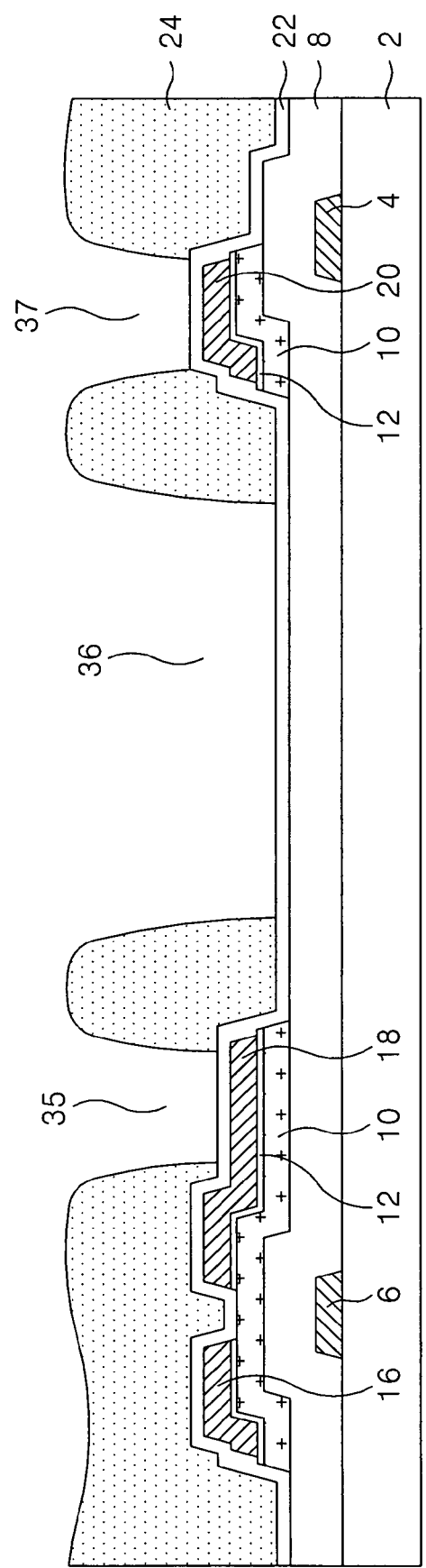
Figure 2D:
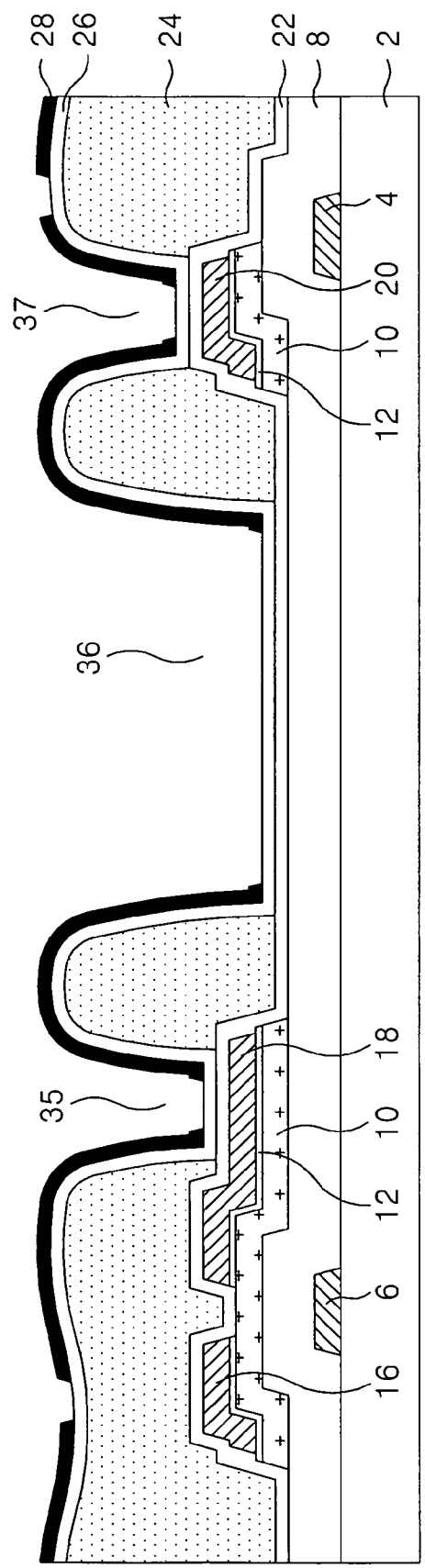
Figure 2E:
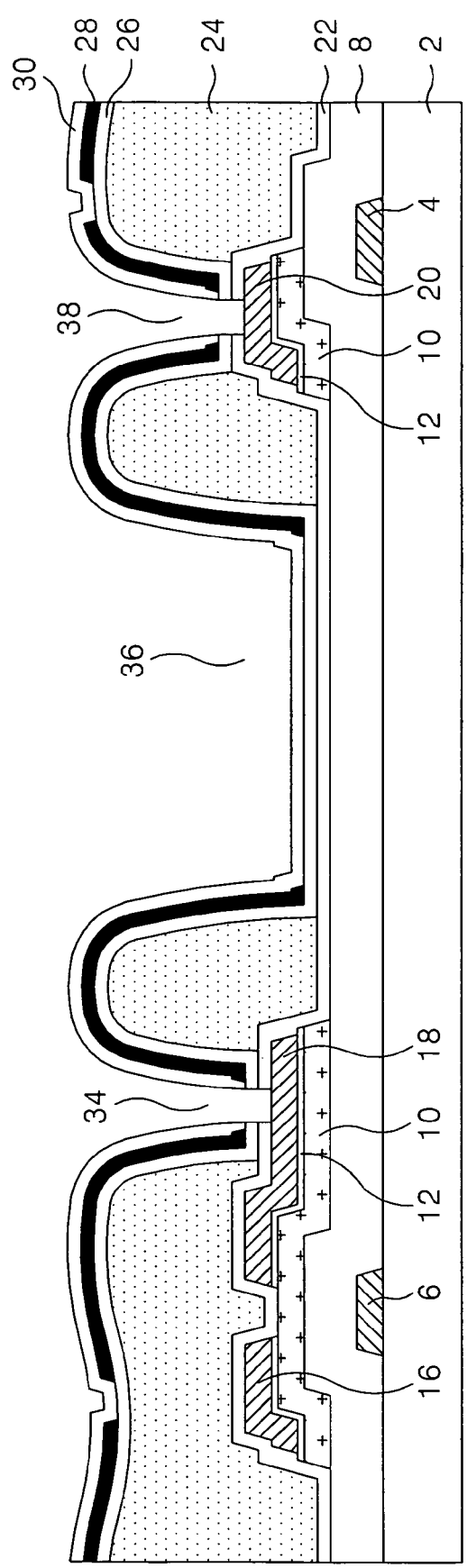
Figure 2F:
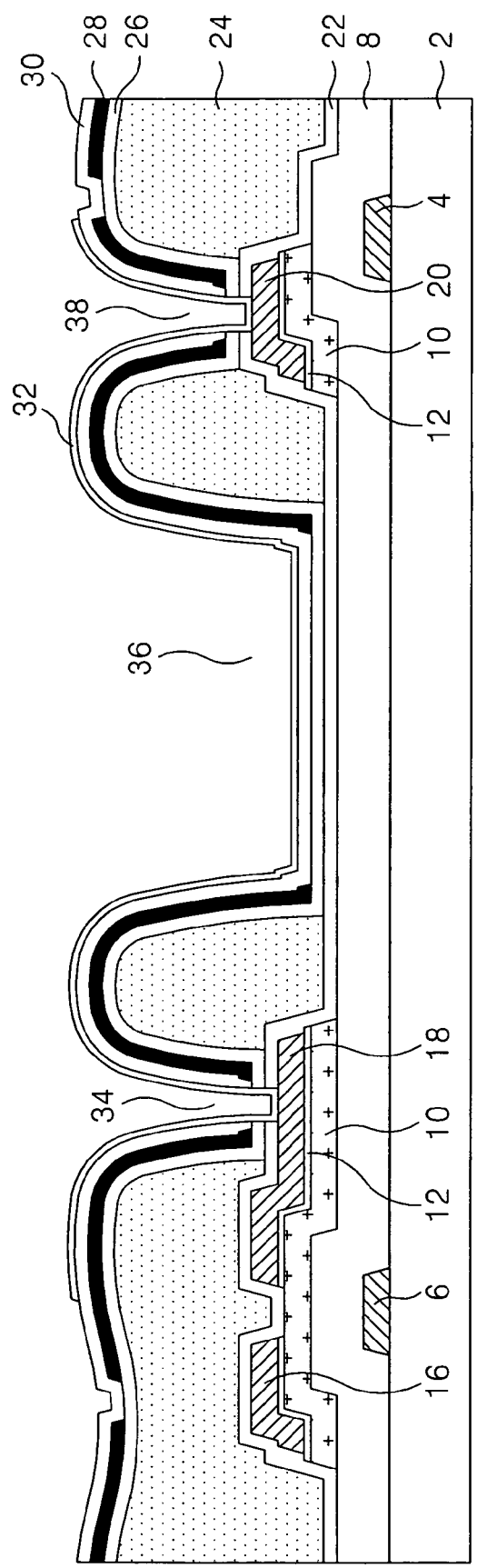
Figure 3:
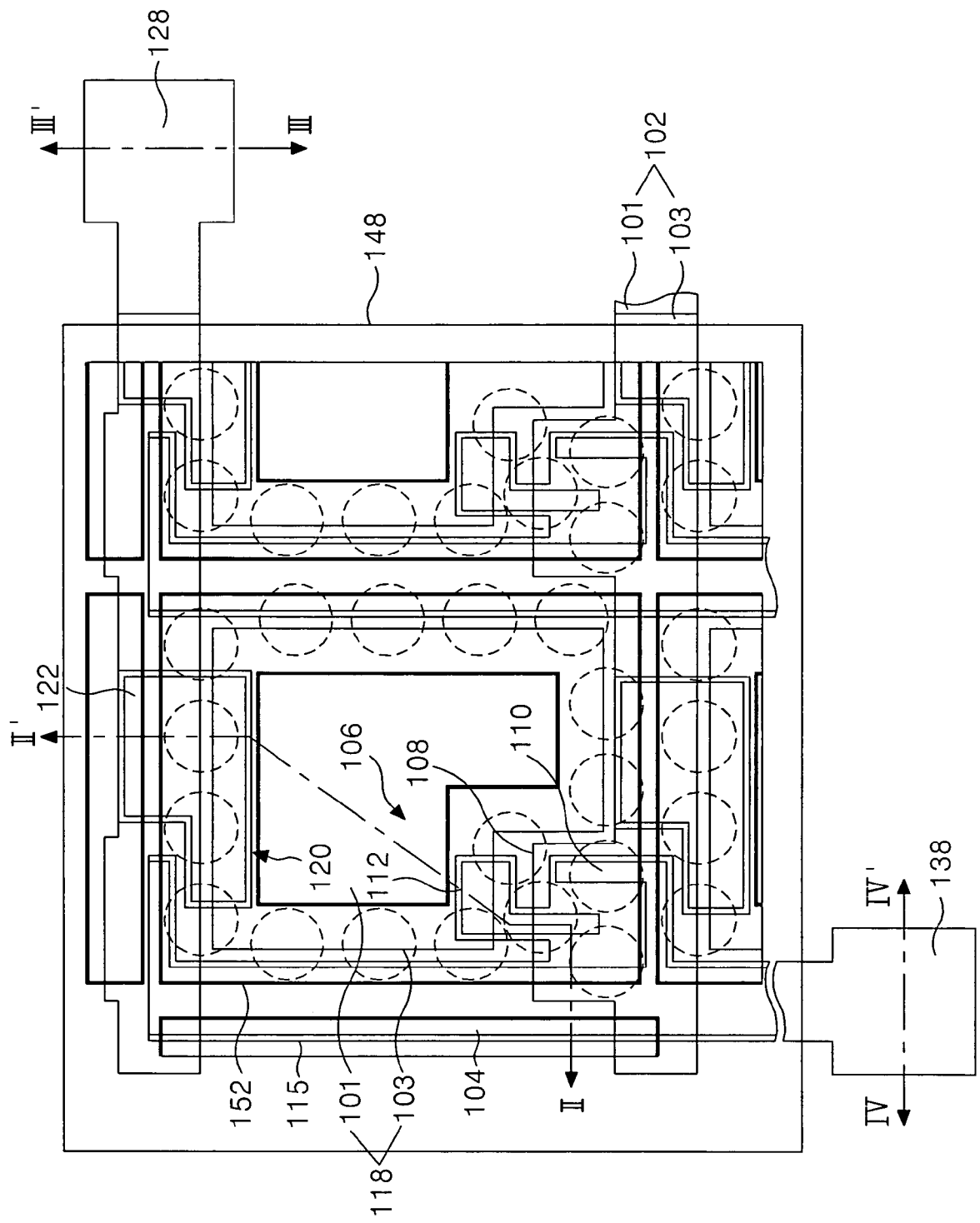
FIG. 3 is a plane view partially illustrating a transflective thin film transistor substrate according to an embodiment of the present invention.

FIG. 3 is a plane view illustrating a transflective thin film transistor substrate according to an embodiment of the present invention, and FIG. 4 is a sectional diagram illustrating the transflective thin film transistor substrate shown in FIG. 3, taken along the line II-II', III-III, IV-IV'.

Referring to FIGS. 3 and 4, the transflective thin film transistor substrate includes a gate line 102 and a data line 104 that define a pixel area on a lower substrate 142 by crossing each other with a gate insulating film 144 there between; a thin film transistor 106 connected to the gate line 102 and the data line 104; a reflective electrode 152 formed in a reflective area of each pixel; and a pixel electrode 118 formed at each pixel area and connected to the thin film transistor 106 through the reflective electrode 152. The transflective thin film transistor substrate also includes a storage capacitor 120 that is formed by the overlapping of the previous stage gate line 102 and a storage upper electrode 122 connected to a pixel electrode 118 through a reflective electrode 152; a gate pad 128 connected to the gate line 102; and a data pad 138 connected to the data line 104. The transflective thin film transistor substrate divides each pixel area into a reflective area where the reflective electrode 152 is formed and a transmissive area where the reflective electrode 152 is not formed.

The thin film transistor 106 include a gate electrode 108 connected to the gate line 102; a source electrode 110 connected to the data line 104; a drain electrode 112 facing the source electrode 110 connected to the pixel electrode 118; an active layer 114 that overlaps the gate electrode 108 with a gate insulating film 144 there between to form a channel between the source electrode 110 and the drain electrodes 112; and an ohmic contact layer 116 formed on the active layer 114 except for the channel part so as it to be in ohmic-contact with the source electrode 110 and the drain electrodes 112. The thin film transistor responds to a scan signal on the gate line 102 to cause a video signal on the data line 104 to be charged and maintained in the pixel electrode 118.

As illustrated in FIG. 4, the gate line 102 and the gate electrode 108 has a double structure including a first transparent conductive layer 101 and a second metal conductive layer 103 deposited on top of the first transparent conductive layer 101. In addition, a semiconductor pattern 115 including the active layer 114 and the ohmic contact layer 116 is formed to overlap the data line 104.

The reflective electrode 152 is formed in the reflective area of each pixel to reflect light from an external source. The reflective electrode 152 has an embossed shape in accordance with the shape of an organic film 148 there under, which increases its reflective efficiency due to its dispersion effect.

The pixel electrode 118 is formed at each pixel area and connected to the drain electrode 112 through the reflective electrode 152 that goes through an edge part of a transmission hole 154. The pixel electrode 118 has the same double structure as the gate line, wherein the second conductive layer 103 is opened in the transmissive area to make the pixel electrode transparent in the transmissive area. Accordingly, the first conductive layer 101 of the pixel electrode 118 is connected to the reflective electrode 152 through the second conductive layer 103. The pixel electrode 118 generates a potential difference with a common electrode of a color filter substrate (not shown) by the pixel signal supplied through the thin film transistor. The potential difference causes a liquid crystal having dielectric anisotropy to rotate, thereby controlling the transmissivity of the light that runs through the liquid crystal layer in each of the reflective area and the transmissive area, thus its brightness is changed in accordance with the video signal.

The transmission hole 154 is formed to penetrate the organic film 148, the passivation film 146, and the gate insulating film 144 over a portion of the pixel electrode 118 in the transmissive area. Accordingly, the length of the light path that runs through the liquid crystal layer is the same in the reflective area and the transmissive area, thus the transmissive efficiency of the reflective mode and the transmissive mode is the same.

The storage upper electrode 122 connected to the pixel electrode 118 overlaps the previous gate line 102 with the gate insulating film 144 there between, thereby forming the storage capacitor 120. The storage upper electrode 122 is connected to the pixel electrode 118 through the reflective electrode 152 that runs through the edge part of the transmission hole 154, and it further overlaps the semiconductor pattern 115 under the storage upper electrode 122.

The gate line 102 is connected to a gate driver (not shown) through the gate pad 128. The first conductive layer 101 of the gate line 102 is extended to form the gate pad 128.

The data line 104 is connected to a data driver (not shown) through the data pad 138. The data pad 138 is formed of the first conductive layer 101 like the gate pad 128. The data pad 138 is connected to the data line 104 through a separate contact electrode (not shown).

The gate insulating film 144, the passivation film 146 and the organic film 148 are removed in the pad area where the gate pad 128 and the data pad 138 are formed.

In this way, the transflective thin film transistor substrate according to the embodiment of the present invention has the pixel electrode 118 connected to the drain electrode 112 and the storage upper electrode 122 through the reflective electrode that runs through the edge part of the transmission hole 154. Accordingly, it is not necessary to have a separate contact hole for connecting the pixel electrode 118 with the drain electrode 112 and the storage upper electrode 122, thus the aperture ratio of the transmissive area is increased.

The reflective electrode 152 is connected to the first conductive layer 101 of the pixel electrode 118 through the second conductive layer 103. Accordingly, AlNd and ITO are connected only through Mo where AlNd is used for the reflective electrode 152, ITO is used for the first conductive layer 101 of the pixel electrode 118 and Mo is used for the second conductive layer 103, thus an increase of the contact resistance of AlNd and ITO caused by the generation of Al2O3 is prevented.

Figure 5A:
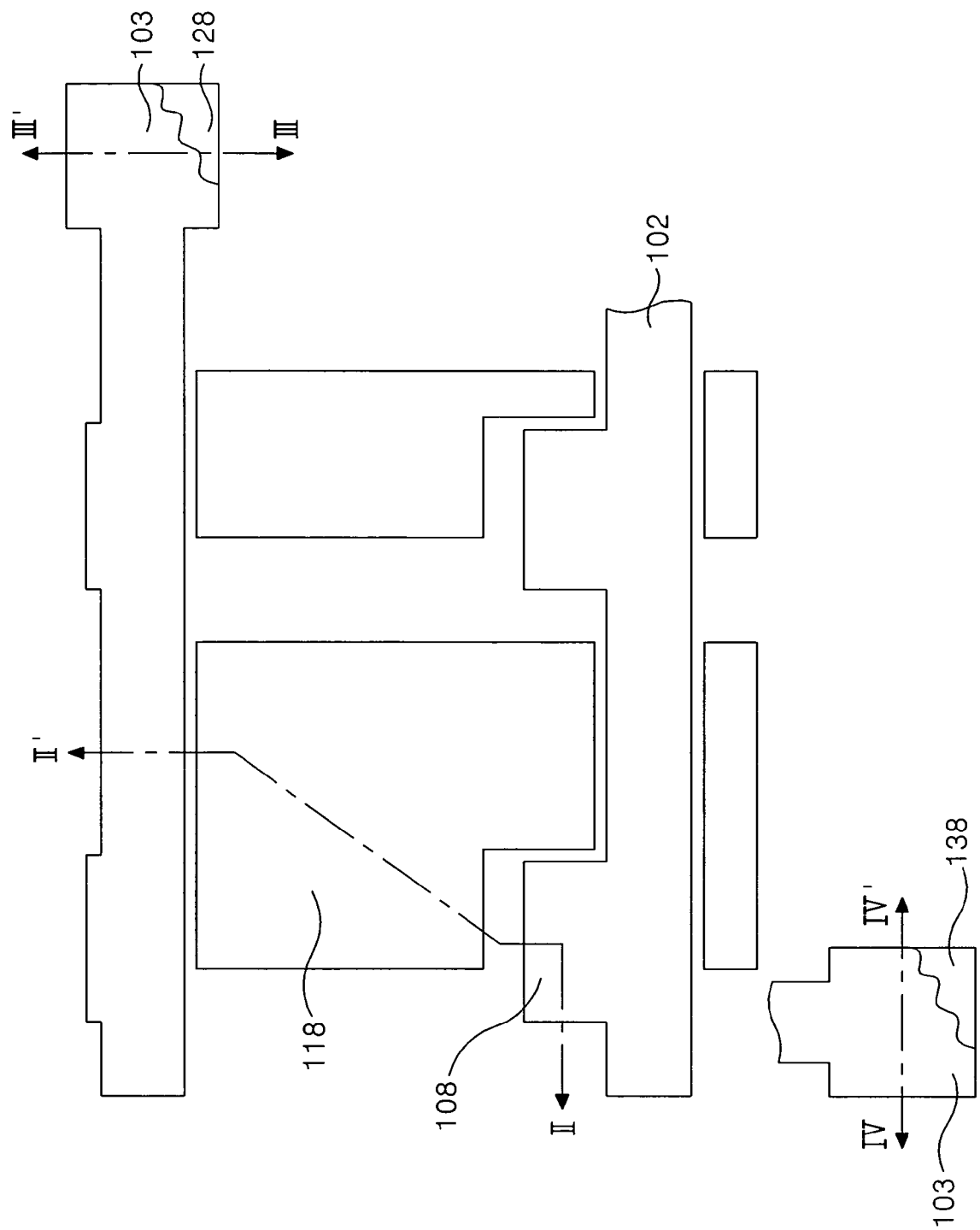
FIGS. 5A and 5B illustrate a plane view and a sectional diagram, respectively, of a first mask process for a transflective thin film transistor substrate according to an embodiment of the present invention.
Figure 5B:
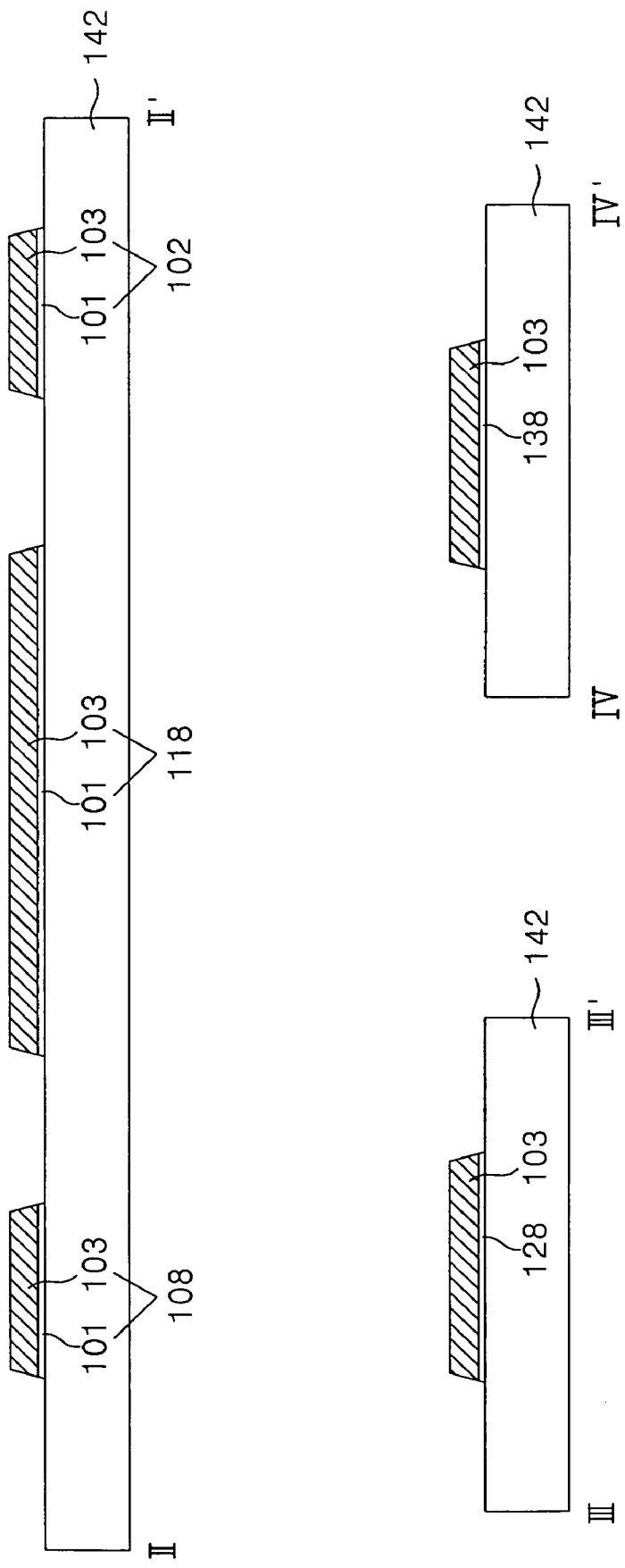

FIGS. 5A and 5B illustrate a plane view and a sectional diagram, respectively, of a first mask process utilized in fabricating a transflective thin film transistor substrate according to an embodiment of the present invention. Referring to FIG. 5B, a gate pattern is formed using a first mask process, wherein the gate pattern includes the pixel electrode 118, the data pad 138, the gate electrode 108 connected to the gate line 102 and the gate line 102 on the lower substrate 142. The gate pattern is formed with a double structure such that first and second conductive layers 101, 103 are formed.

Specifically, the first and second conductive layers 101, 103 are formed on the lower substrate 102 using a deposition method such as sputtering. The deposited first and second conductive layers 101, 103 are then patterned using a photolithography process including a first mask and an etching process, thereby forming the gate pattern that includes the gate line 102, the gate electrode 108, the gate pad 128, the data pad 138 and the pixel electrode 118, as illustrated in FIG. 5A. As illustrated in FIG. 5B, the second conductive layer 103 remains behind on the gate pad 128 and the data pad 138. The first conductive layer 101 is a transparent conductive material such as ITO, TO, IZO, and the second conductive layer 103 is a metal material such as Mo, Cu, Al(Nd), Cr, Ti and the like.

Figure 6B:
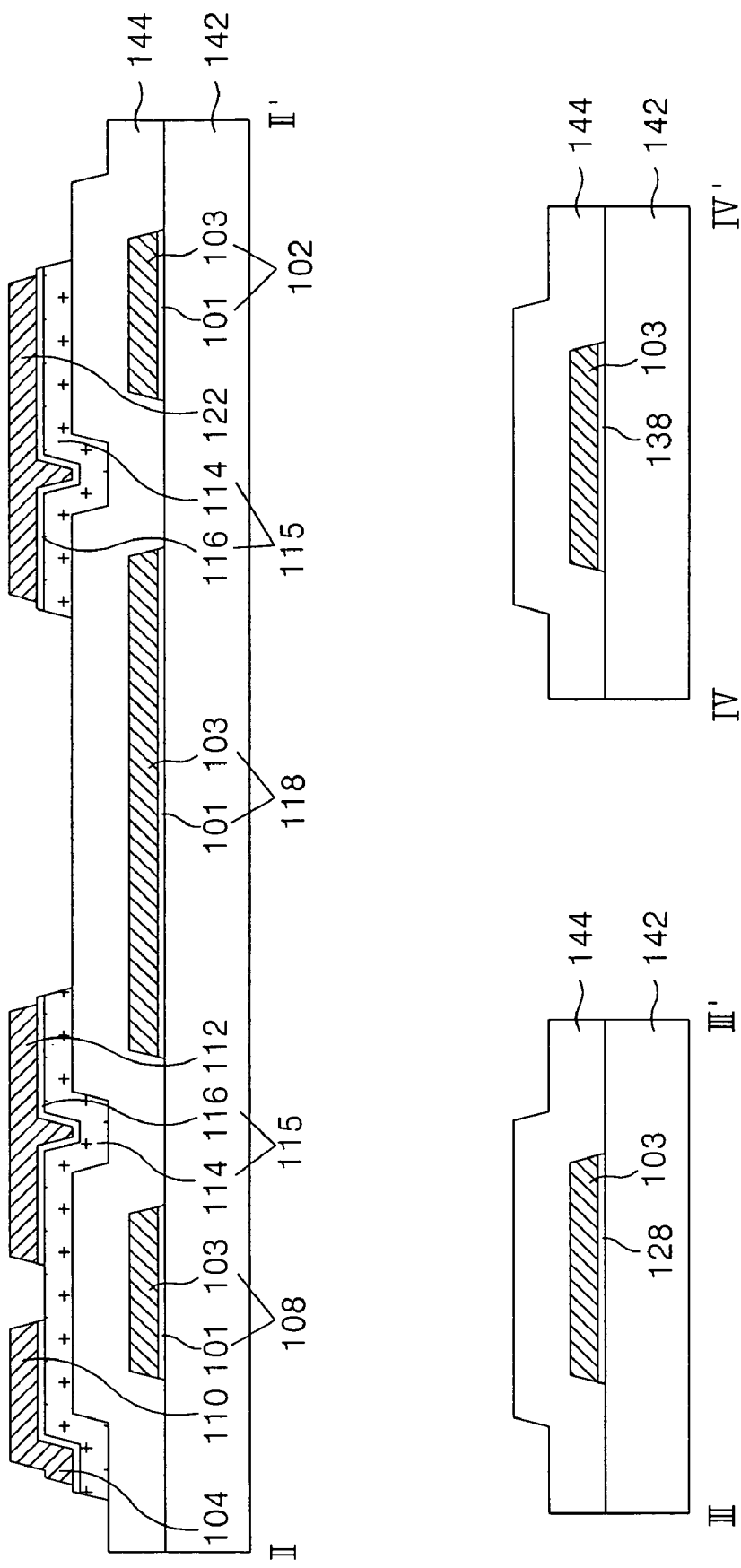

FIGS. 6A and 6B illustrate a plane view and a sectional diagram, respectively, of a second mask process utilized in fabricating a transflective thin film transistor substrate according to the present invention. As illustrated in FIG. 6B, a gate insulating film 144 is formed on the lower substrate 142 including where the gate pattern is formed. In addition, a source/drain pattern is formed on top thereof using a second mask process. The source/drain pattern includes a data line 104, a source electrode 110, a drain electrode 112, a storage upper electrode 122, and a semiconductor pattern 115 including an active layer 114 and an ohmic contact layer 116 overlapping the rear surface of the source/drain pattern. The semiconductor pattern 115 and the source/drain pattern are formed by one mask process using a diffractive exposure mask as illustrated in FIG. 7A-FIG. 7E.

Referring to FIG. 7A, the gate insulating film 144, an amorphous silicon layer 105, an amorphous silicon layer 107 doped with impurities n+ or p+, and a source/drain metal layer 109 are sequentially formed on the lower substrate 142 including the gate pattern. For example, the gate insulating film 144, the amorphous silicon layer 105, the amorphous silicon layer 107 doped with impurities may be formed using PECVD, and the source/drain metal layer 109 may be formed using sputtering. The gate insulating film 144 is an inorganic insulating material such as silicon oxide SiOx, silicon nitride SiNx, and the source/drain metal layer 109 is one of Cr, Mo, MoW, Al/Cr, Cu, Al(Nd), Al/Mo, Al(Nd)/Al, Al(Nd)/Cr, Mo/Al(NdO/Mo, Cu/Mo, Ti/Al(Nd)/Ti and the like. For example, if the double layer is formed Al and Cr, the Al layer is formed after the Cr layer is formed.

A photo resist 219 is spread over the source/drain metal layer 109, and then exposed and developed using a photolithography process including a diffractive exposure mask 210, thereby forming a photo resist pattern 220 having a stepped difference as illustrated in FIG. 7B.

The diffractive exposure mask 210 includes a transparent quartz substrate 212, a shielding layer 214 formed of a metal layer such as Cr on top thereof, and a diffractive exposure slit 216. The shielding layer 214 is located in the area where the semiconductor pattern and the source/drain pattern are to be formed, to intercept ultraviolet ray, thereby leaving a first photo resist pattern 220A after development. The diffractive exposure slit 216 is located in the area where the channel of the thin film transistor is to be formed, to diffract the ultraviolet ray, thereby leaving a second photo resist pattern 220B that is thinner than the first photo resist pattern 220A after development.

Figure 7C:
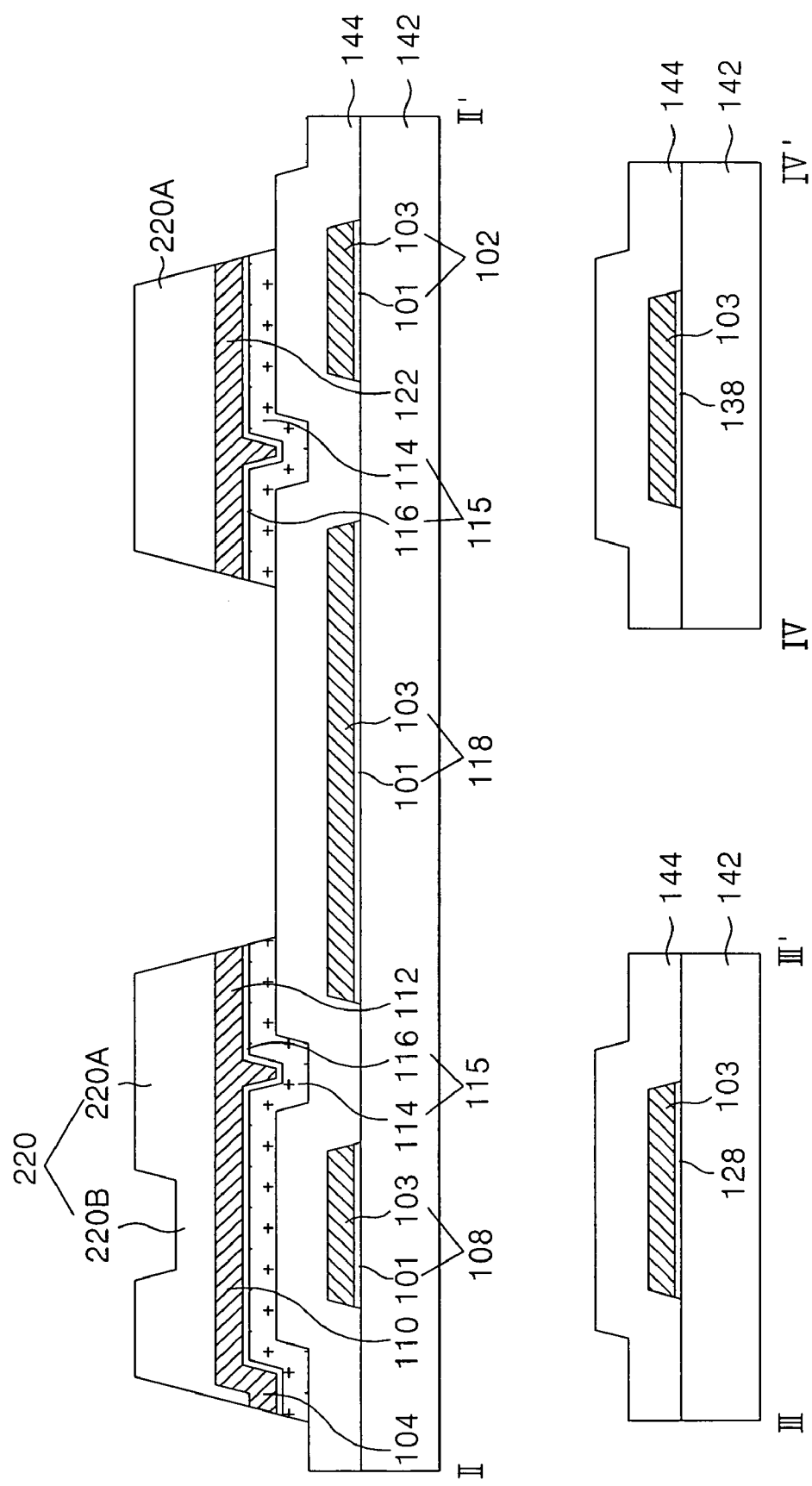

Subsequently, the source/drain metal layer 109 is patterned by etching process the photo resist pattern 220, thereby forming the source/drain pattern and the semiconductor pattern 115 there under illustrated in FIG. 7C. At the point in the process, the source electrode 110 and the drain electrode 112 are integrated with each other.

Figure 7D:
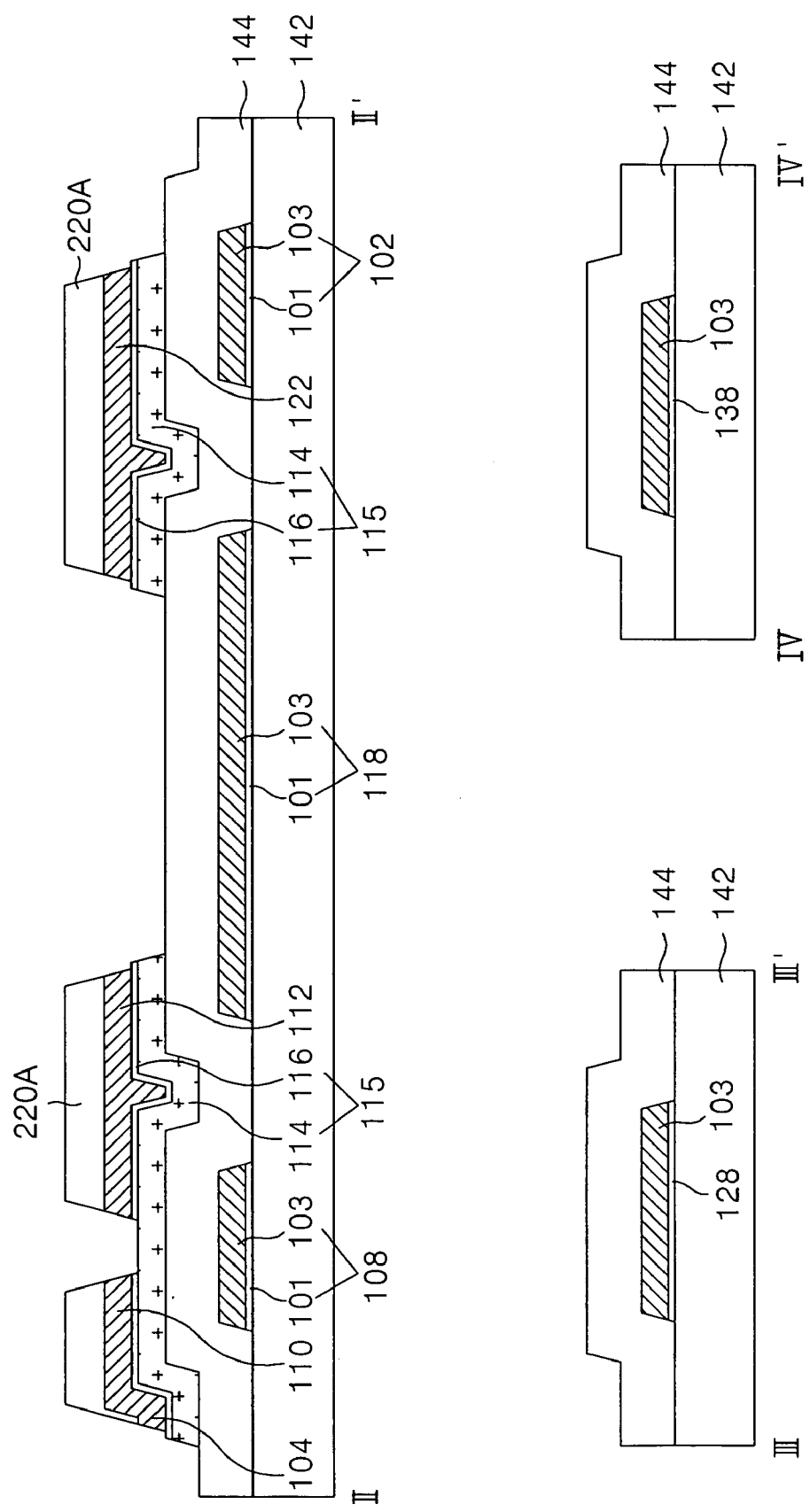
Figure 7E:
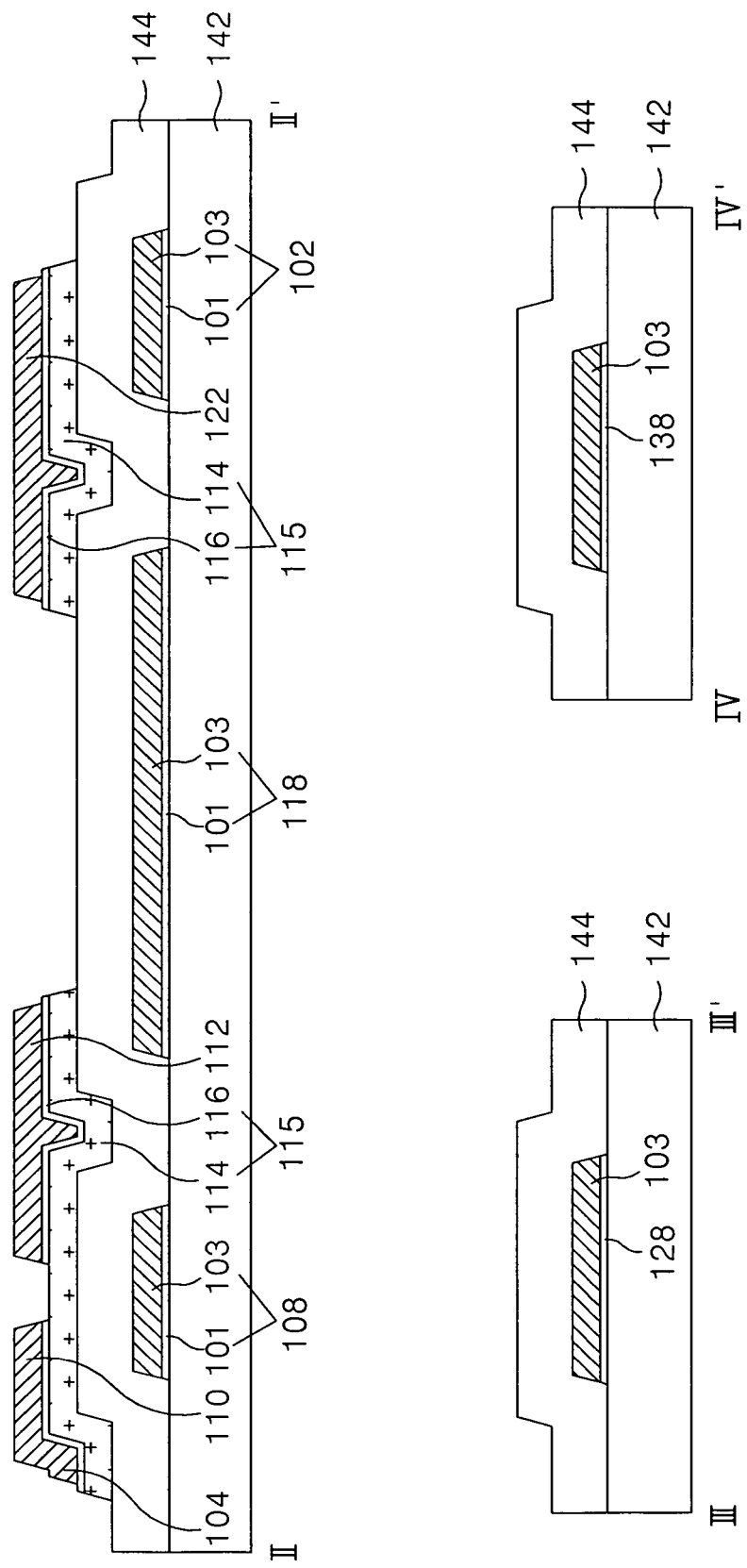

Referring to FIG. 7D, the photo resist pattern 220 is then ashed using ashing process including oxygen O2 plasma, thereby decreasing the thickness of the first photo resist pattern 220A and removing the second photo resist pattern 220B, including the portion of the source/drain pattern underneath the second photo resist pattern 220B and the ohmic contact layer 116. As a result, the source electrode 110 is separated from the drain electrode 112 and the active layer 114 is exposed forming a channel between the source electrode 110 and the drain electrode 112. Both sides of the source/drain pattern are etched once more along the ashed first photo resist pattern 220A, thus the source/drain pattern and the semiconductor pattern 115 have a fixed stepped difference in a step shape. Finally, as illustrated in FIG. 7E, the first photo resist pattern 220A remaining on the source/drain pattern is removed using a strip process.

Figure 8A:
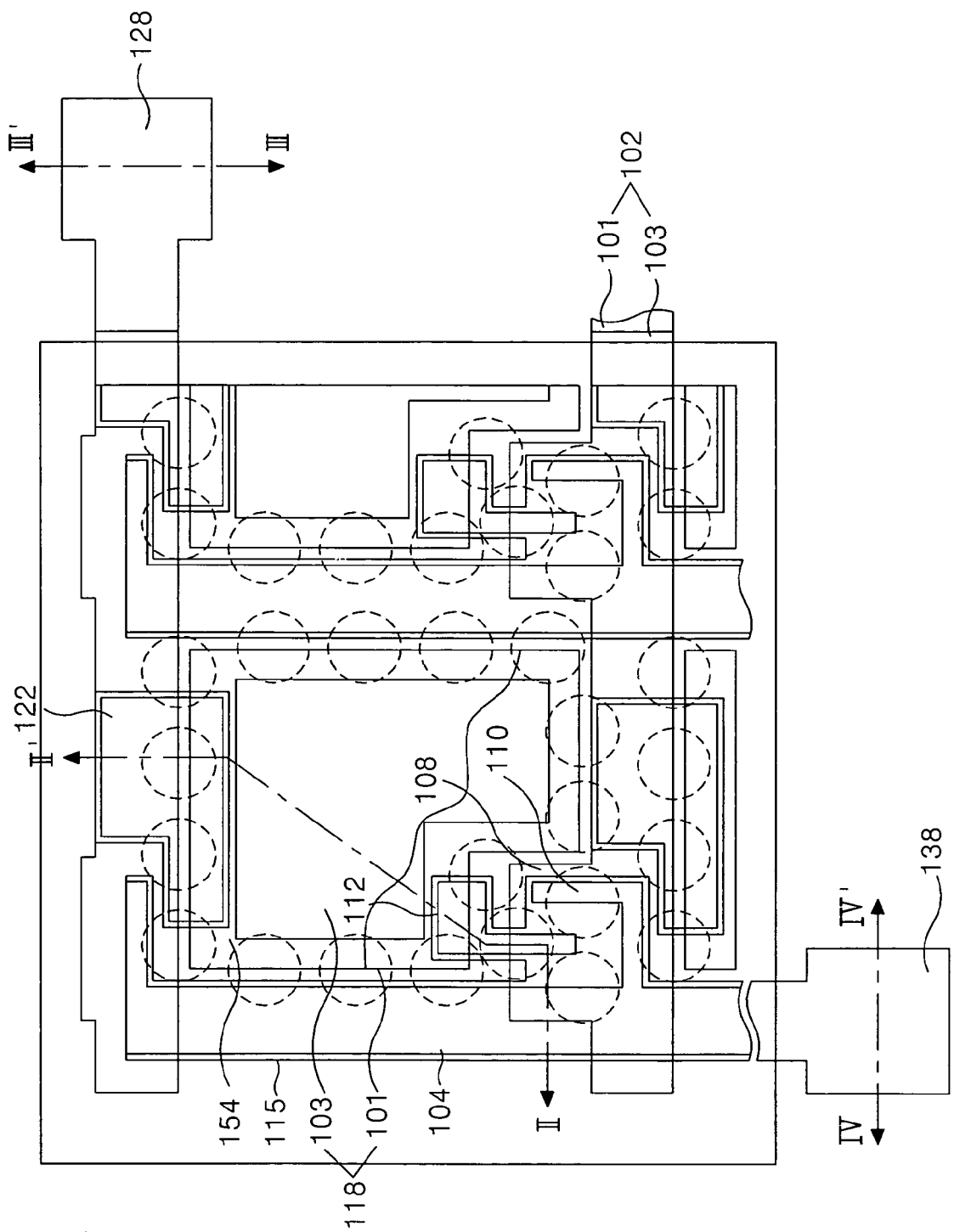
Figure 9A:
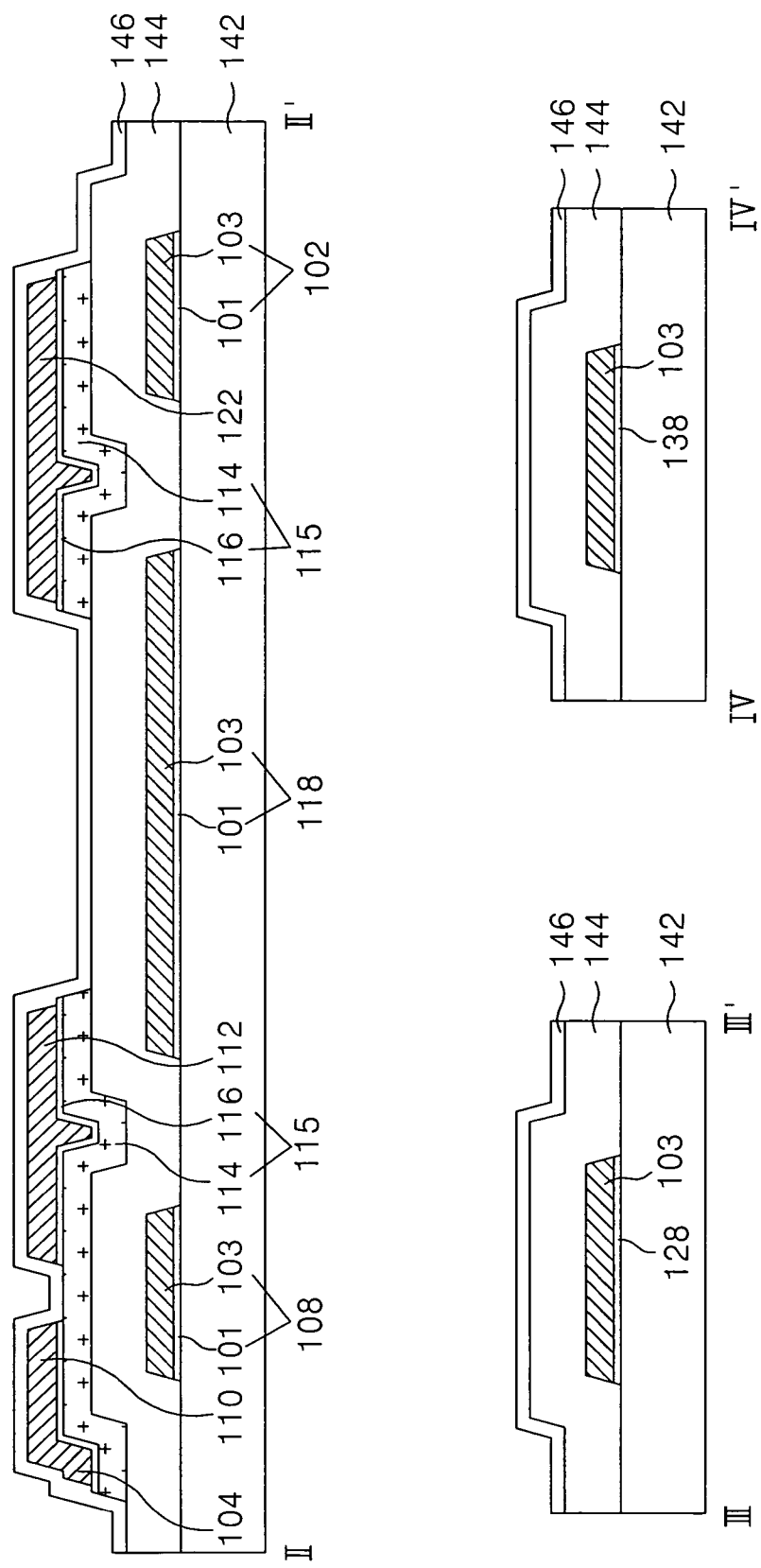

FIGS. 8A and 8B illustrate a plane view and a sectional diagram, respectively, of a third mask process utilized in fabricating a transflective thin film transistor substrate according to the present invention. FIGS. 9A to 9C are sectional diagrams further illustrating the third mask process. As illustrated in FIG. 8B, a passivation film 146 and an organic film 148 having a transmission hole 154 are formed on the gate insulating film 144 including the source/drain pattern using a third mask process.

Referring to FIG. 9A, the passivation film 146 is formed on the gate insulating film 144 including the source/drain pattern using a deposition method such as PECVD. The passivation film 146 is an inorganic insulating material such as the gate insulating film 144.

Then, referring to FIG. 9B, the organic film 148 is formed on the passivation film 146 such that the organic film 148 has an embossed surface in the reflective area and a transmission hole 154 in the transmissive area. Specifically, the organic film 148 is formed by coating the passivation film 146 with a photosensitive organic material such as acrylic resin using, for example, a spin coating method. Then, the organic film 148 is patterned using a photolithography process including a third mask, such that a transmission hole 154 penetrating the organic film 148 is formed in the transmissive area in correspondence with the transmissive part of the third mask, and the organic film 148 of the pad area where the gate pad 128 and the data pad 138 are formed is removed. The third mask has a structure including a shielding part and a diffractive exposure part (or transflective part) that are repeated, except for in a transmissive part of the mask. As a result, the organic film 148 is patterned to have a structure where the shielding area (projected part) and the diffractive exposure area (groove part) having the stepped difference are repeated in the reflective area. Subsequently, the organic film 148 with the repeated projected part and groove part is fired to form the embossed shape on the surface of the organic film 148 in the reflective area. On the other hand, the aperture part of the organic film 148 has its edge part overlap the drain electrode 112 and the storage upper electrode 122, thereby making the edge part of the storage upper electrode 122 and the drain electrode 112 projected toward the aperture part.

Referring to FIG. 9C, the passivation film 146 and the gate insulating film 144 are patterned using the organic film 148 as a mask, the passivation film 146 and the gate insulating film 144 is removed over a portion of the pixel electrode 118 and the pad area 142. In this case, the drain electrode 112 and the storage upper electrode 122 which are exposed through the transmission hole 154, and the semiconductor pattern 115 there under are also etched. Herein, the difference of etching speed causes the edge part of the gate insulating film 144 to have a structure that protrudes a little more than the drain electrode 112 and the storage upper electrode 122, and the semiconductor pattern 115 there under. The transmission hole 154 exposes the second conductive layer 103 of the pixel electrode 118, and the edge part exposes the side surface of the drain electrode 112 and the storage upper electrode 122. In the pad area, the passivation film 146 and the gate insulating film 144 are removed, exposing the second conductive layer 103 over the gate pad 128 and the data pad 138.

Figure 10A:
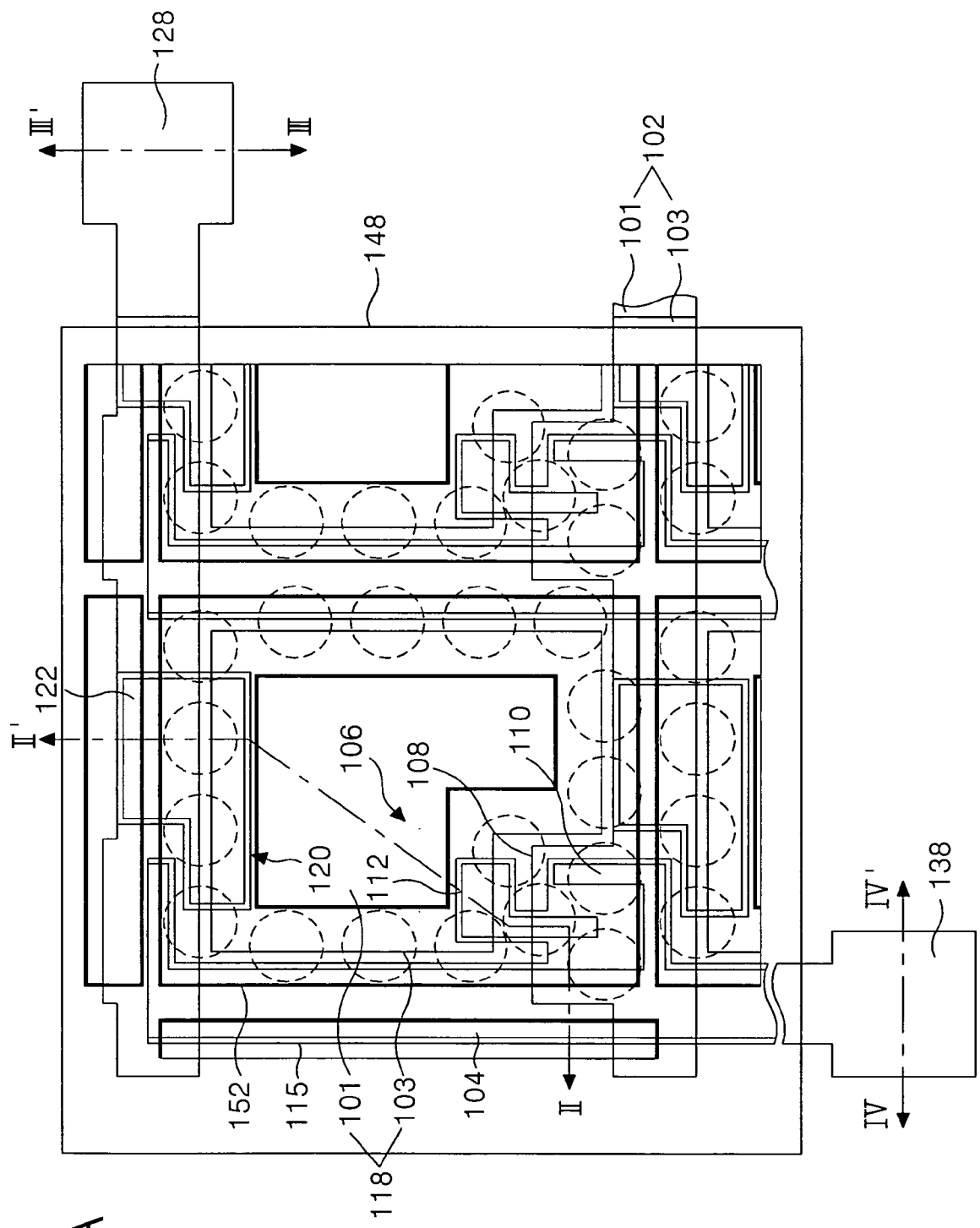
Figure 12A:
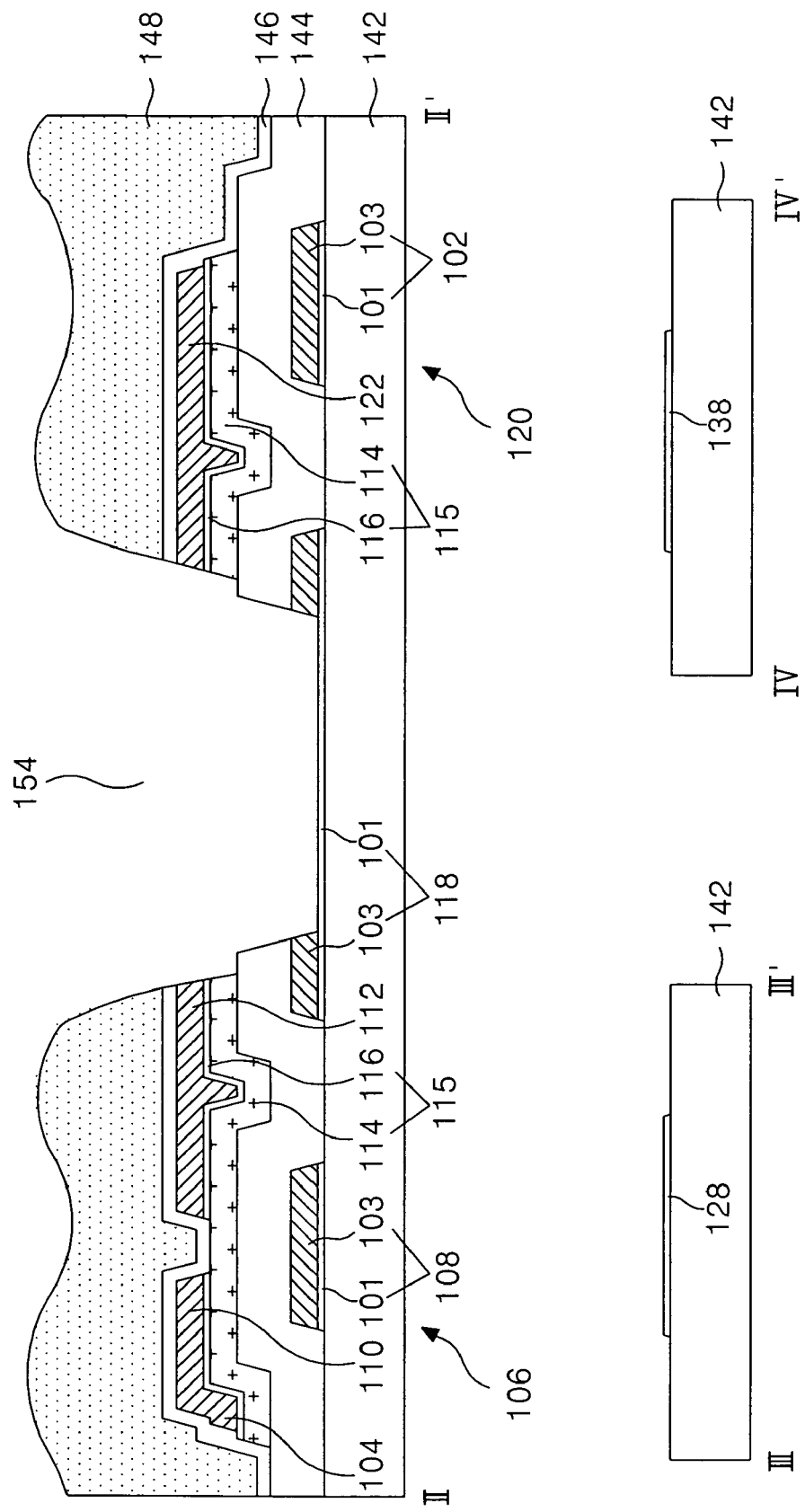
FIGS. 12A and 12B are sectional diagrams illustrating the thin film transistor substrate of FIG. 4 and FIG. 11, respectively, after the third mask process.
Figure 12B:
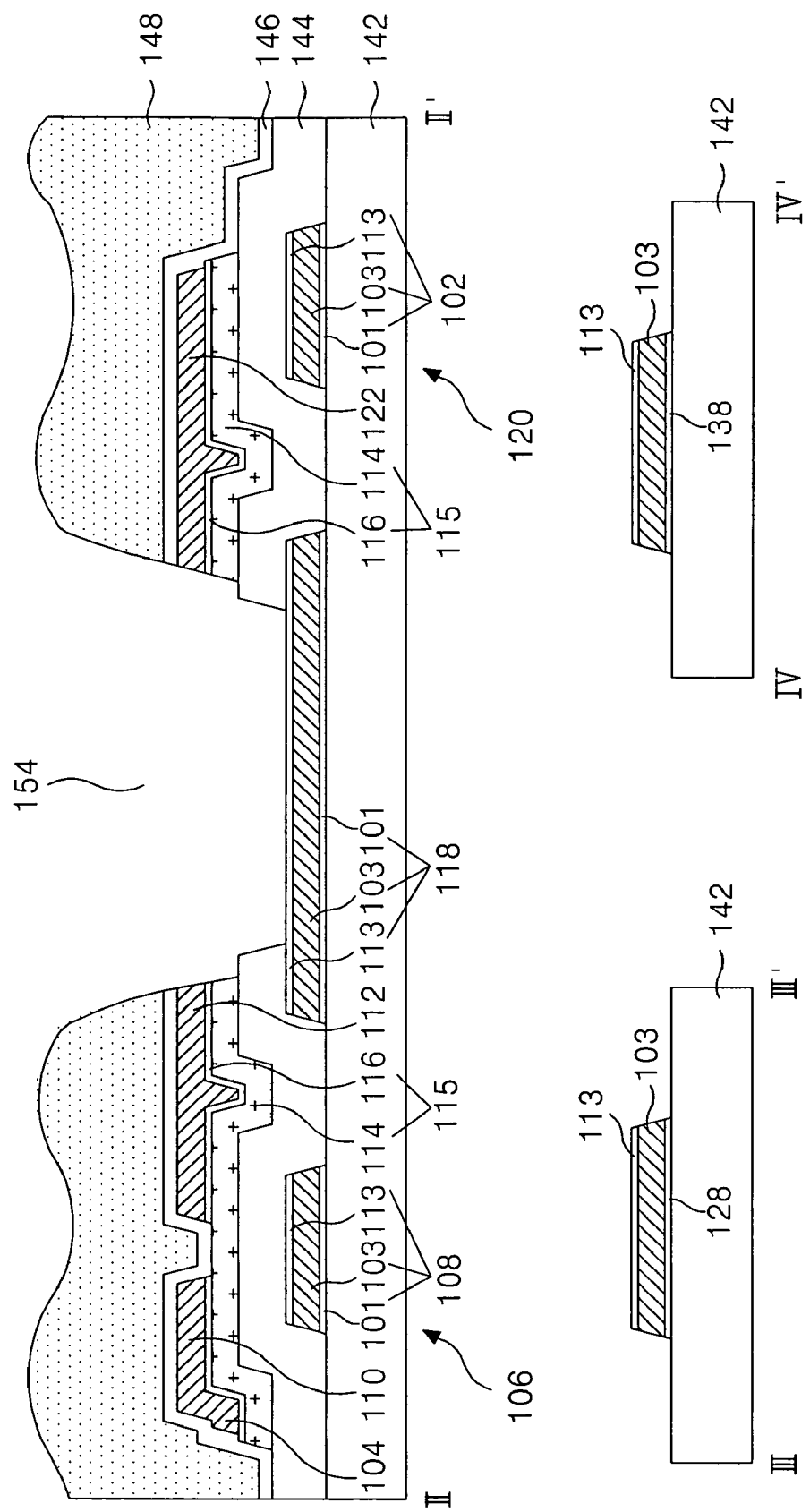

FIGS. 10A and 10B illustrate a plane view and a sectional diagram, respectively, of a fourth mask process utilized in fabricating a thin film transistor substrate according to the present invention. Referring to FIG. 10B, using the fourth mask process, a reflective electrode 152 is formed on the organic film 148 in each pixel reflective area, the first conductive layer 101 of the pixel electrode 118 is exposed through the transmission hole 154, and the gate pad 128 and the data pad 138 are exposed in the pad area.

Specifically, a reflective metal layer is formed on the organic film 148 having the embossed surface such that it maintains the embossed shape. The reflective metal layer is formed of a highly reflective metal, such as AlNd. Then, the reflective metal layer is patterned using a photolithography process including the fourth mask and an etching process, thereby forming the reflective electrode 152in the reflective area. In addition, the second conductive layer 103 of the pixel electrode 118 exposed through the transmission hole 154 is etched together with the reflective metal layer deposited thereon, thus it has a structure that the first conductive layer 101 of the pixel electrode 118 is exposed in the transmissive area. Accordingly, the reflective electrode 152 is connected on the side to the drain electrode 112 and the storage upper electrode 122 which are exposed through the edge part of the transmission hole 154. In addition, the reflective electrode 152 is connected to the surface of the second conductive layer 103 remaining along the boundary of the first transparent conductive layer 101 of the pixel electrode 118. Accordingly, no separate contact hole is required for connecting the pixel electrode 118 with the drain electrode 112 and the storage upper electrode 122, thus the aperture ratio of the transmissive area is increased.

In this way, the fabricating method of the transflective thin film transistor substrate according to a first embodiment of the present invention is formed using four mask processes, compared to the six mask process of the related art. Thereby simplifying the fabrication process.

FIG. 11 is a sectional diagram illustrating a transflective thin film transistor substrate according to another embodiment of the present invention. The transflective thin film transistor substrate illustrated in FIG. 11 has the same components as the transflective thin film transistor substrate illustrated in FIG. 4 except that the gate line 102, the gate electrode 104 and the pixel electrode 118a include a third conductive layer. Accordingly, the explanation for the repeated components will be omitted.

As illustrated in FIG. 11, when the gate pattern, which includes the gate line 102, the gate electrode 104 and the pixel electrode 118, is formed on the substrate a third metal conductive layer 105, for example, Al, is deposited on the second conductive layer 103. The third conductive layer acts as an etch stopper when forming the transmission hole 154 during the third mask process.

As discuss above, the transmission hole 154 is etched during a third mask process, which removes the passivation film 146 and the gate insulating film 144 and exposes the second conductive layer 103 of the pixel electrode. However, the second conductive layer is easily etched using the dry etching process. Furthermore, dry etching of the second conductive layer can cause the first transparent conductive layer to become black.

In order to prevent this, according to the second embodiment of the invention, a third conductive layer 113 which is not easily dry etched is added to the pixel electrode to act as an etch stopper when forming the transmission hole 154, thereby preventing the second conductive layer 103 of the pixel electrode 118 from being etched. Accordingly, it is possible to prevent the first conductive layer 101 from turning black, due to dry etching of the second conductive layer 103.

The third conductive layer 113 and the second conductive layer 103 are removed during the wet etching process form the reflective electrode 152 by the fourth mask process, as described above with respect to the first embodiment.

Figure 13:
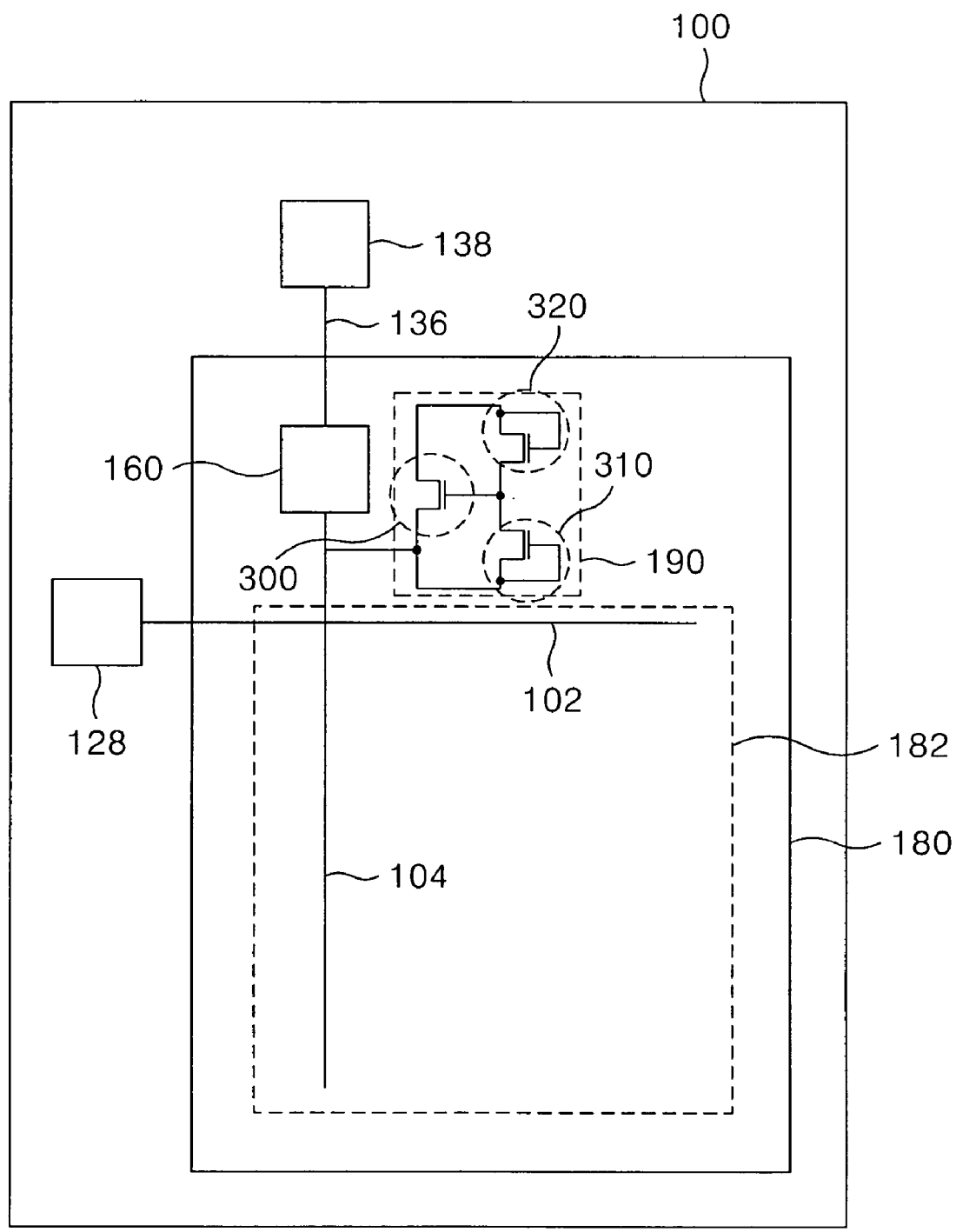
FIG. 13 is a plane view illustrating the surrounding part of a transflective thin film transistor substrate according to the present invention.

FIG. 13 illustrates an ambient part of the transflective thin film transistor substrate according to the present invention. As The transflective thin film transistor substrate 100 illustrated in FIG. 4 includes a contact electrode 160 connecting the data pad 138, formed in the same layer as the gate pad 128, with the data line 104. In other words, the contact electrode 160 connects a data link 136 extending from the data pad 138 with the data line 104. The contact electrode 160 is formed of the same metal layer AlNd, AlNd/Mo as the reflective electrode 152 formed in the active area. To prevent the contact electrode 160 from being corroded due to oxidization when it is exposed to the outside, it is located at an area which is sealed by a sealant 180, i.e., between the sealant 180 and an active area 182.

The thin film transistor substrate 100 further includes a static electricity prevention device 190 that intercepts static electricity before it flows into the active area 182. The static electricity prevention device 190 is connected to the data line 104 or the gate line 102, and is composed of a plurality of thin film transistors 300, 310, 320 having a reciprocal connection relationship. The static electricity prevention device 190 causes an over current to be discharged by having low impedance at a high voltage area by the static electricity, thereby intercepting the static electricity inflow. In addition, it does not affect a drive signal supplied through the gate line 102 or the data line 104 by having high impedance at a normal drive environment. The static electricity prevention device 190 requires a plurality of contact electrodes to reciprocally connect the thin film transistors 300, 310, 320. The contact electrodes are formed of the same metal layer AlNd, AlNd/Mo as the reflective electrode 152. Accordingly, the electrostatic discharging device 190 is also formed in the area sealed by the sealant 180, i.e., between the sealant 180 and the active area 182.

Figure 14:
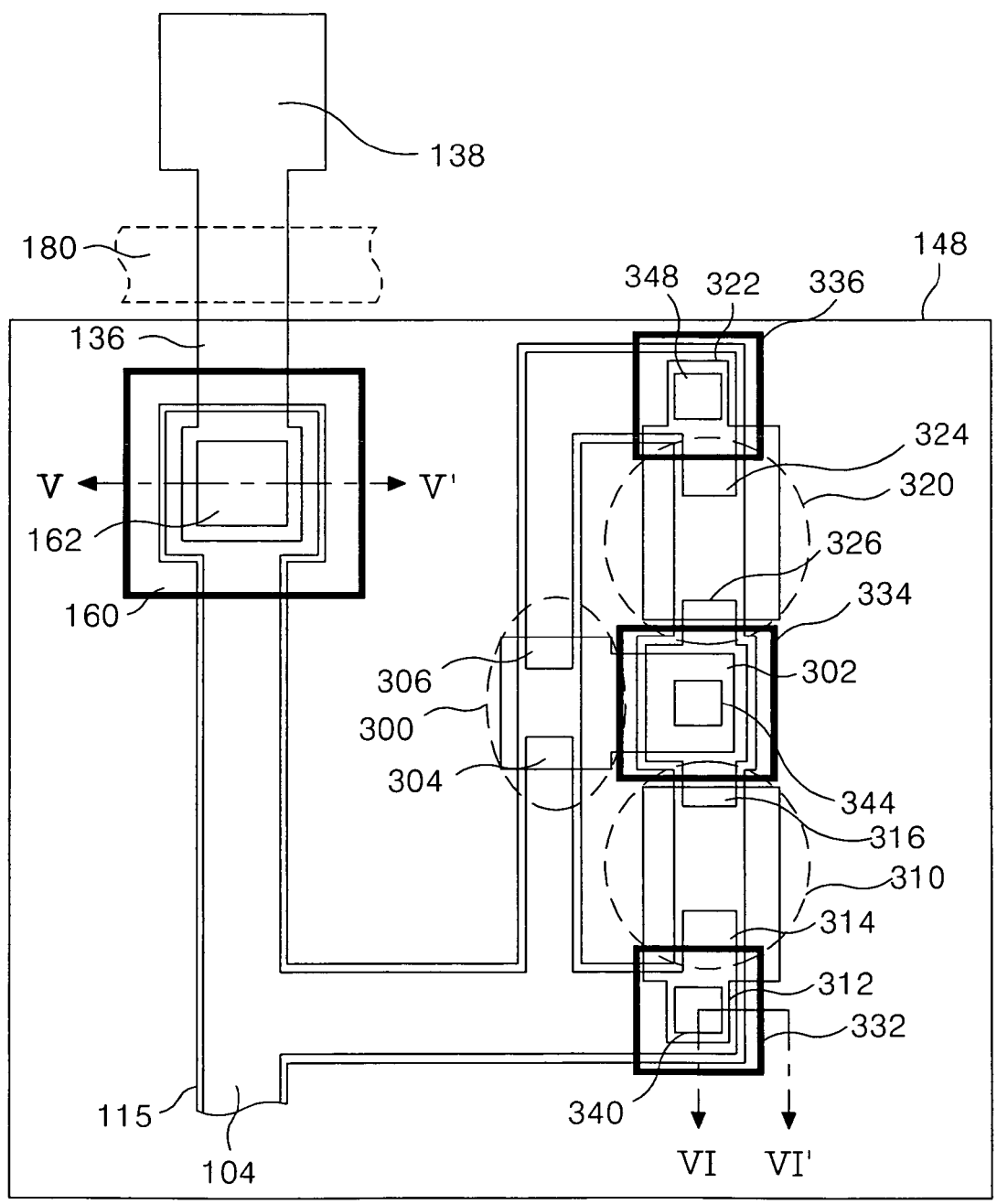
FIG. 14 is a plane view illustrating a static electricity prevention device area and a contact area of a data link and a data line illustrated in FIG. 13.

FIG. 14 is a plane view illustrating the electrostatic discharging device 190 and the contact electrode 160 connected to the data line 104 illustrated in FIG. 13, and FIG. 15 is a sectional diagram illustrating the thin film transistor substrate illustrated in FIG. 14, taken along the line V-V', VI-VI'.

As illustrated in FIG. 14, the data link 136 extends from the data pad 138 until it overlaps an end part of the data line 104 located in an area sealed by the sealant 180. The portion of the data link 136 which does not overlap the organic film 148 is formed only of the first conductive layer 101 like the data pad 138, and the portion which overlaps the organic film 148 has a double structure including the first and second conductive layers 101, 103.

The first contact electrode 160 extends over a first contact hole 162 which is formed where the data link 136 and the data line 104 overlap, thereby connecting the data line 104 with the data link 136 as illustrated in FIG. 15. The first contact hole 162 penetrates the the organic film 148, the passivation film 146, the data line 104, the semiconductor pattern 115 and the gate insulating film 144 exposing the data link 136. Accordingly, the first contact electrode 160 is laterally connected to the data line 104 which is exposed through the first contact hole 162, and it is surface-connected to the second conductive layer 103 of the data link 136.

The electrostatic discharging device connected to the data line 104 includes the second to fourth thin film transistors 300, 310, 320. The second thin film transistor 300 includes a second source electrode 304 connected to the data line 104, a second drain electrode opposite the second source electrode 304, and a second gate electrode 302 overlapping the second source and drain electrodes 304, 306 with the semiconductor pattern 115 and the gate insulating film 144 there between. The second gate electrode 302 has a double structure including first and second conductive layers 101, 103.

The third thin film transistor 310 is connected to the second source electrode 304 and the second gate electrode 302 of the second thin film transistor in a diode form. For this, the third thin film transistor 310 includes a third source electrode 314 connected to the second source electrode 304, a third drain electrode 316 opposite the third source electrode 314, and a third gate electrode 312 overlapping the third source and drain electrodes 314, 316 with the semiconductor pattern 115 and the gate insulating film 144 there between. The third gate electrode 312 has a double structure including first and second conductive layers 101, 103. In addition, the third gate electrode 312 is connected to the third source electrode 314 through the second contact electrode 332 that extends over the second contact hole 340. The second contact hole 340 penetrates the organic film 148, the passivation film 146, the third source electrode 314, the semiconductor pattern 115 and the gate insulating film 144 exposing the second conductive layer 103 of the third gate electrode 312.

The fourth thin film transistor 320 is connected to the second drain electrode 306 and the second gate electrode 302 of the second thin film transistor in a diode form. The fourth thin film transistor 320 includes a fourth source electrode 324 connected to the second drain electrode 306, a fourth drain electrode 326 opposite the fourth source electrode 324, and a fourth gate electrode 322 overlapping the fourth source and drain electrodes 324, 326 with the semiconductor pattern 115 and the gate insulating film 144 there between. The fourth gate electrode 322 has a double structure including first and second conductive layers 101, 103. In addition, the fourth drain electrode 326 is connected to the third drain electrode 316, and it is connected to the second gate electrode 302 through the third contact electrode 334 which extends over the third contact hole 344. Further, the fourth gate electrode 332 is connected to the fourth source electrode 324 through the fourth contact electrode 336 which extends over the fourth contact hole 348. The third contact hole 344 penetrates the organic film 148, the passivation film 146, the fourth drain electrode 326, the semiconductor pattern 115 and the gate insulating film 144, and the fourth contact hole 348 penetrates the organic film 148, the passivation film 146, the fourth source electrode 324, the semiconductor pattern 115 and the gate insulating film 144.

The first to fourth contact electrodes 160, 332, 334, 336 are formed of the same metal layer as the reflective electrode 152 as described above.

The transflective thin film transistor substrate having such a structure is formed by the five mask processes as described above. This will be explained with reference to FIGS. 16A to 19B.

Figure 16A:
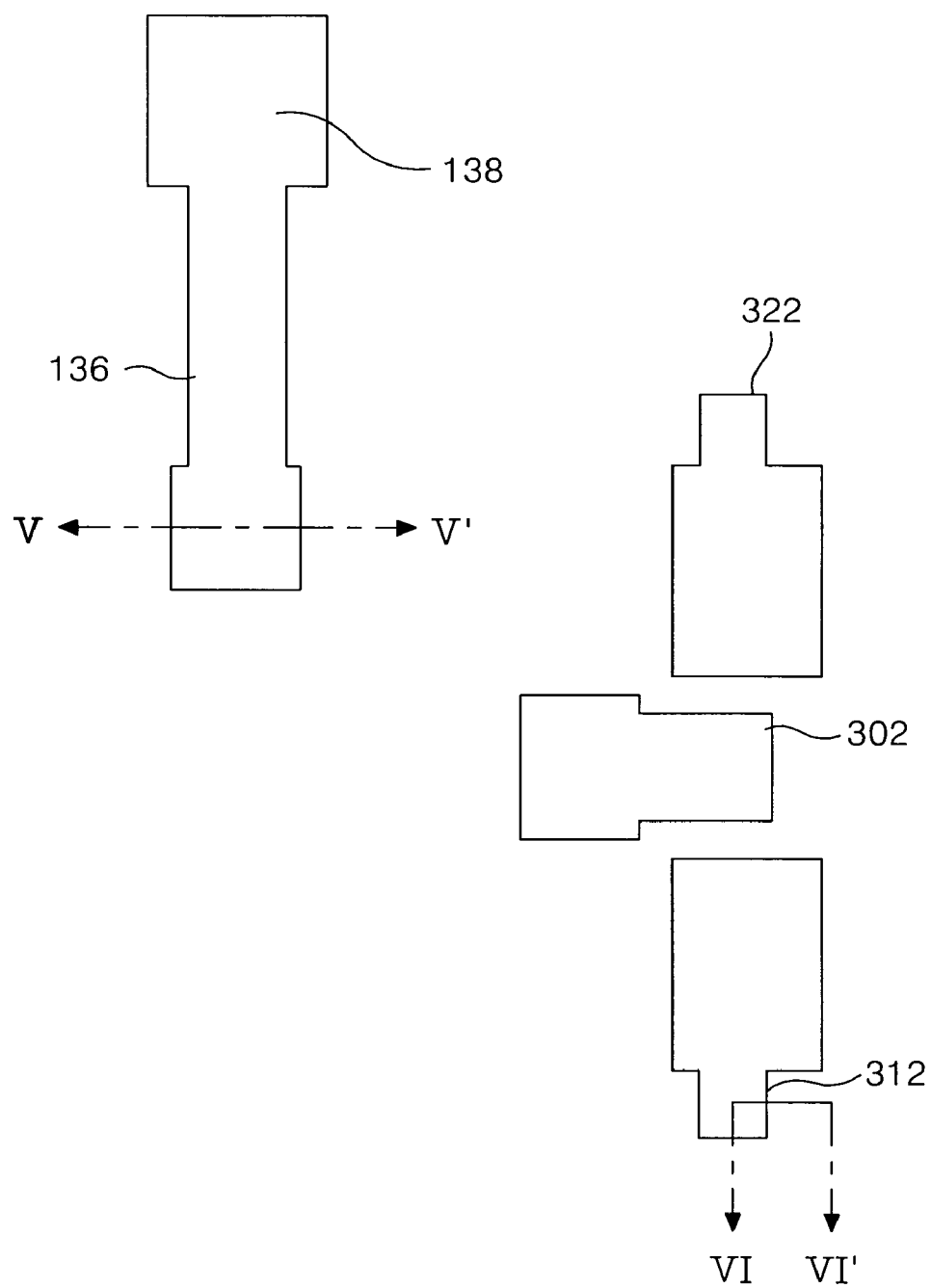

First, as illustrated in FIGS. 16A and 16B, a gate pattern is formed on the lower substrate 142 using a first mask process, wherein the gate pattern includes the data link 136 along with the data pad 138, and the second to fourth gate electrodes 302, 312, 322. The gate pattern has a double structure that the first and second conductive layers 101, 103 are deposited. The first mask process is the same as described above with reference to FIGS. 5A and 5B.

Figure 17A:
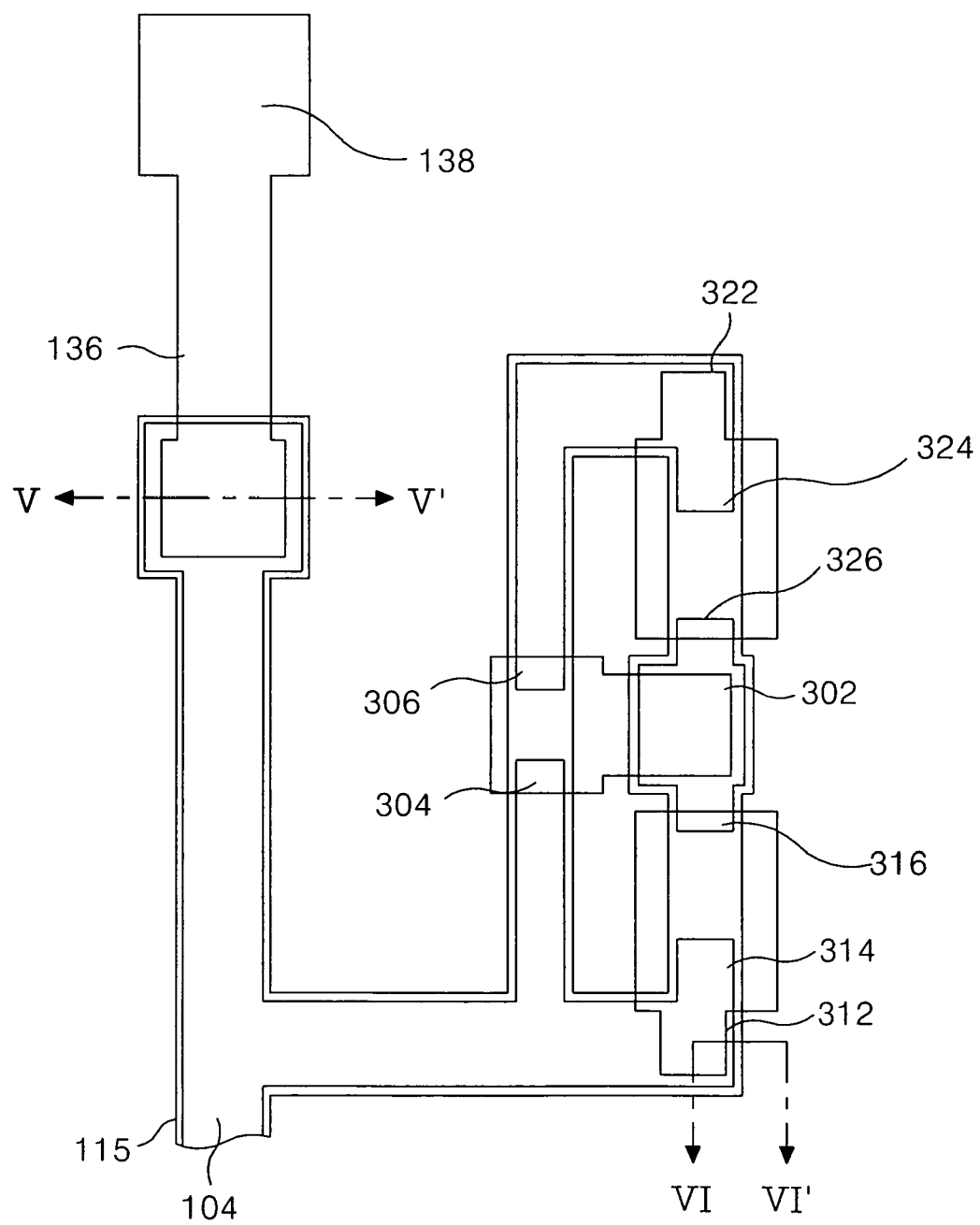

Then a gate insulating film 144, a semiconductor pattern 115 including an active layer 114 and an ohmic contact layer 116, and a source/drain pattern including a data line 104, second to fourth source electrodes 304, 314, 324, second to fourth drain electrodes 306, 316, 326 are formed using a second mask process as illustrated in FIGS. 17A and 17B. The second mask process is the same as described in FIGS. 6A and 7E.

Figure 18A:
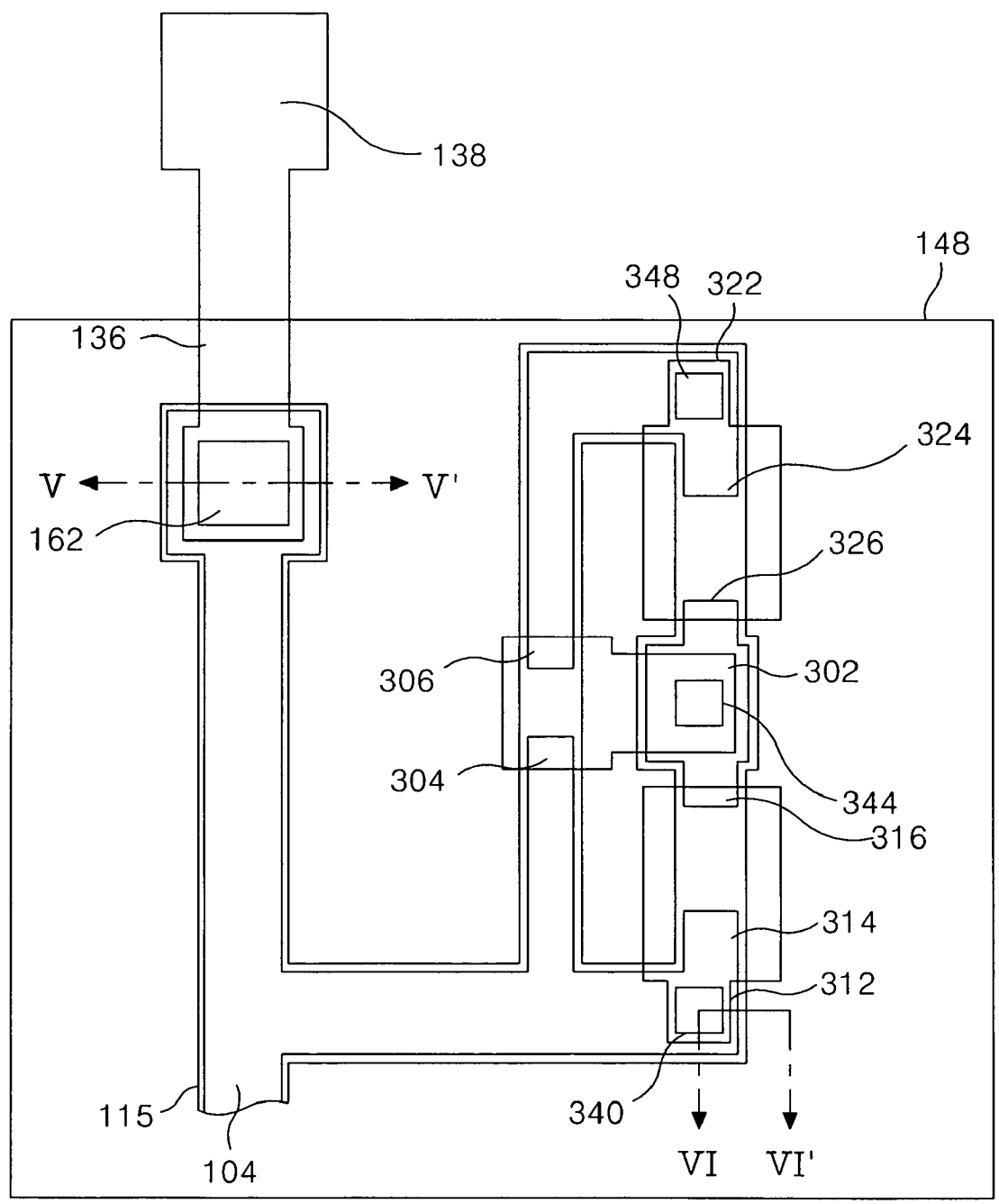

Using a third mask process, as illustrated in FIGS. 18A and 18B, the passivation film 146 and the organic film 148 are formed, and the first to fourth contact holes 162, 340, 344, 348 are formed to penetrate from the organic film 148 to the gate insulating film 144. The third mask process is the same as described in FIGS. 8A and 9C. In this case, the organic film is removed in the pad area and does not have the embossing surface in the area where the reflective electrode 152 is not formed, e.g., the pixel area.

Figure 19A:
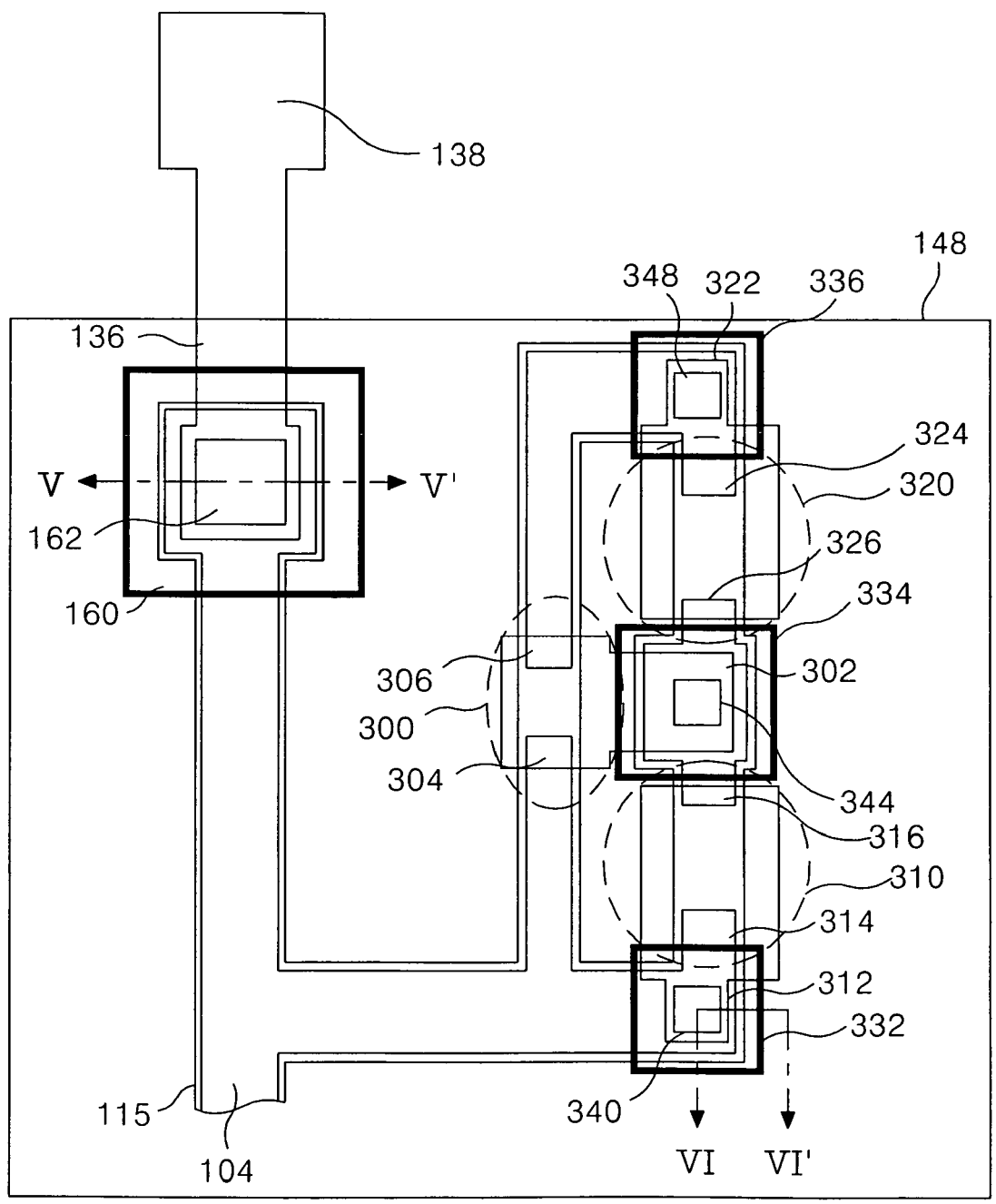

During the fourth mask process illustrated in FIGS. 19A and 19B, the reflective electrode is formed and then patterned, thereby forming the first to fourth contact electrodes 160, 332, 334, 336 of the same metal as the reflective electrode 152. The fourth mask process is the same as described in FIGS. 10A and 10B. At this moment, the second conductive layer 103 of the part of the data link 136 and the data pad 138 at the pad area where the organic film 148 is removed is etched together with the reflective electrode which is spread there over. Accordingly, the part of the data link 136 and the data pad 138 exposed in the pad area is composed only of the first conductive layer 101.

Figure 20:
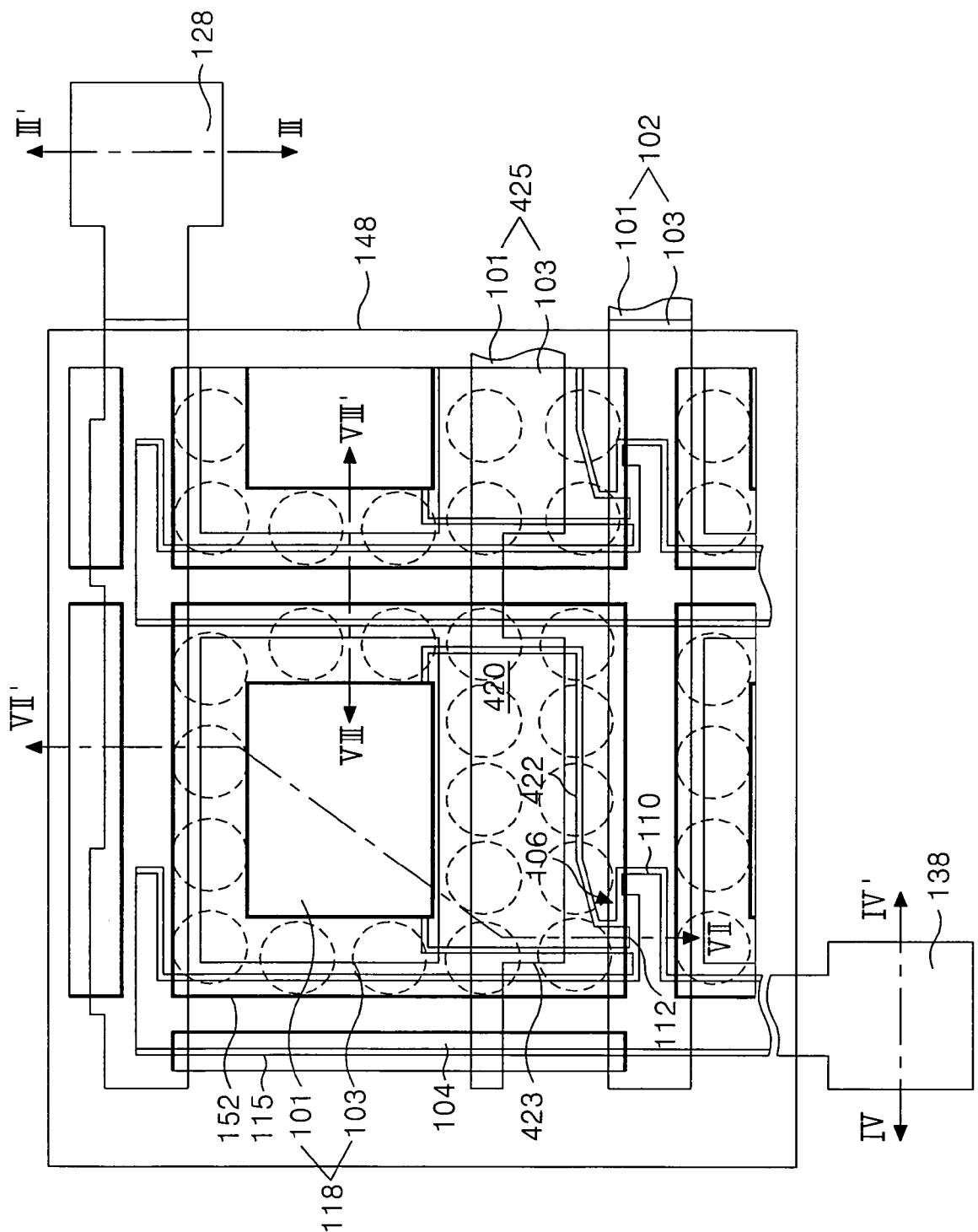
FIG. 20 is a plane view illustrating a thin film transistor substrate according to another embodiment of the present invention.

FIG. 20 is a plane view illustrating a transflective thin film transistor substrate according a third embodiment of the present invention, and FIG. 21 is a sectional diagram illustrating the transflective thin film transistor substrate shown in FIG. 20, taken along the lines VII-VII', VIII-VIII', III-III' and IV-IV'.

The transflective thin film transistor substrate includes in FIGS. 20 and 21 includes the same components as the transflective thin film transistor substrate shown in FIGS. 3 and 4 except that a storage line 425 in parallel to the gate line 102 is added, and a storage capacitor 420 is formed to overlap a storage lower electrode 423 which is integrated with the storage line 425 and a storage upper electrode 422 which is integrated with the drain electrode 112. Accordingly, explanation for the repeated components is to be omitted. The ambient part of the transflective thin film transistor substrate and the fabricating method thereof are as described above in FIGS. 12 to 19B.

The thin film transistor 106 illustrated in FIGS. 20 and 21 overlaps the gate line 102. In addition, the storage capacitor 420 is formed between the gate line and the transmission hole 154, and the pixel electrode 118 is formed between the storage capacitor 420 and the previous gate line 102.

The storage lower electrode 423 and the storage upper electrode 422 overlap each other with the gate insulating film 144 and the semiconductor layer 115 to form the storage capacitor 420.

The storage lower electrode 423 is commonly connected through the storage line 425 that crosses the data line 104. The storage line 425 has a relatively narrow line width in order to reduce the data line and a parasitic capacitor, and the storage lower electrode 423 has a relatively wide line width in order to increase the overlapping area with the storage upper electrode 422, i.e., to increase the storage capacitor 420. The storage lower electrode 423 and the storage line 425 has a double structure including the first conductive layer 101 and the second conductive layer 103, wherein the first conductive layer 101 is formed of the transparent conductive layer like the foregoing gate line 102 and the second conductive layer 103 is formed of a metal layer there over.

The storage upper electrode 422 is formed to be integrated with the drain electrode 112 and to overlap the storage lower electrode 423. And, the storage upper electrode 422 has its side surface exposed through the transmission hole 154 to be connected to the reflective electrode 152, and it is connected to the second conductive layer 103 of the pixel electrode 118 through the reflective electrode 152. Accordingly, the drain electrode 112 is connected to the pixel electrode 118 through the storage upper electrode 422 and the reflective electrode 152. The reflective area where the reflective electrode 152 is formed includes the storage capacitor 420.

The transflective thin film transistor substrate having such a structure is formed using four mask processes as illustrated in FIGS. 22A to 25B. Hereinafter, the detail explanation will be omitted in relation to a part which overlaps the foregoing four mask processes in FIGS. 5A to 10B so that the fabricating method of the transflective thin film transistor substrate according to the third embodiment of the present invention will be briefly explained.

FIGS. 22A and 22B illustrate a plane view and a sectional diagram, respectively, of a first mask process utilized in the fabricating a transflective thin film transistor substrate according to the present invention. As illustrated in FIG. 22B, first, a gate pattern is formed using a first mask process, the gate pattern including a gate line 102, a gate pad 128 connected to the gate line 102, a data pad 138 and a storage lower electrode 423 integrated with a storage line 425, and a pixel electrode 118. The gate pattern is formed of a double structure including first and second conductive layers 101, 103. The first mask process is as above-described in FIGS. 5A and 5B.

Figure 23A:
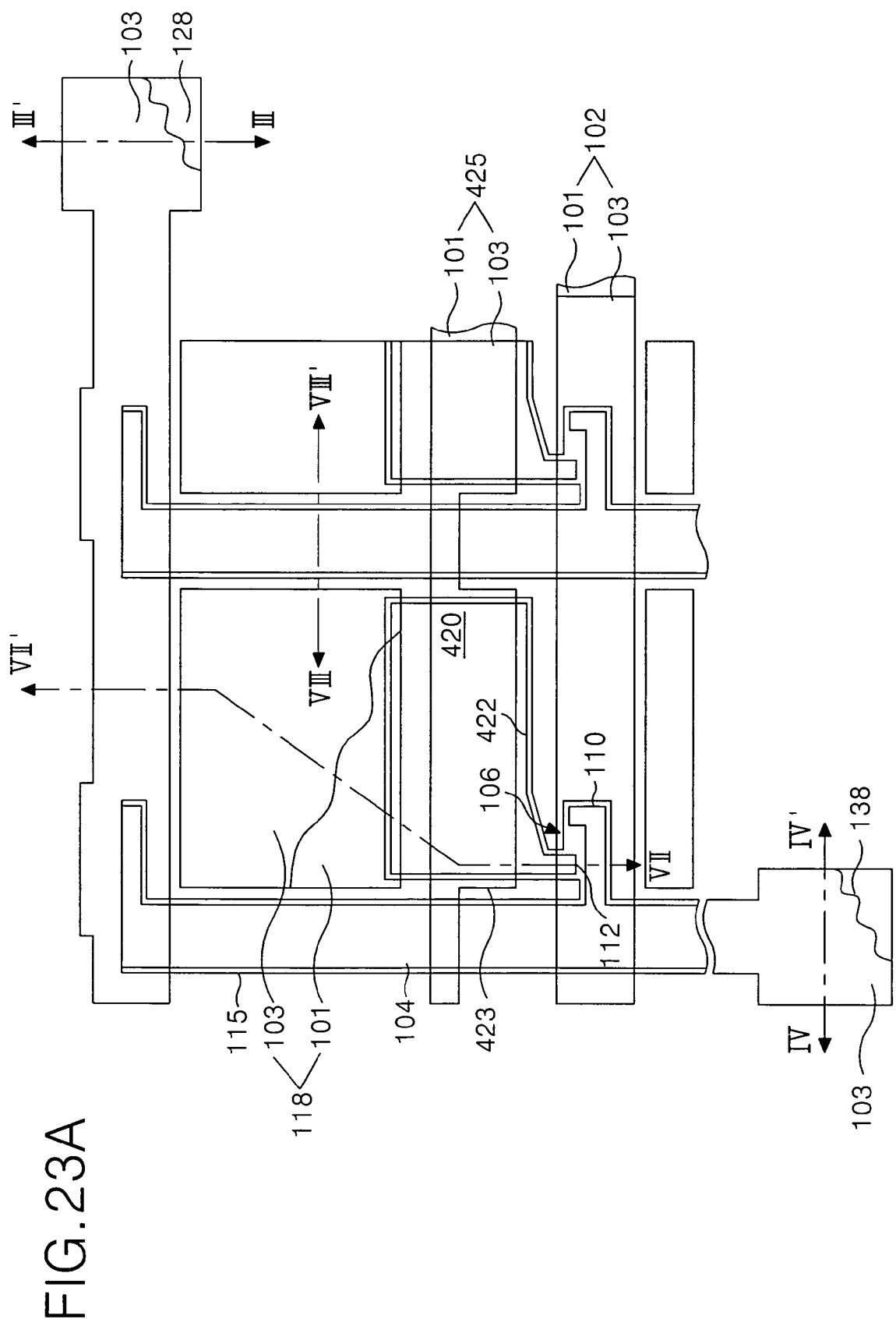
FIGS. 23A and 23B illustrate a plane view and a sectional diagram, respectively, of a second mask process of the transflective thin film transistor substrate according to another embodiment of the present invention.
Figure 23B:
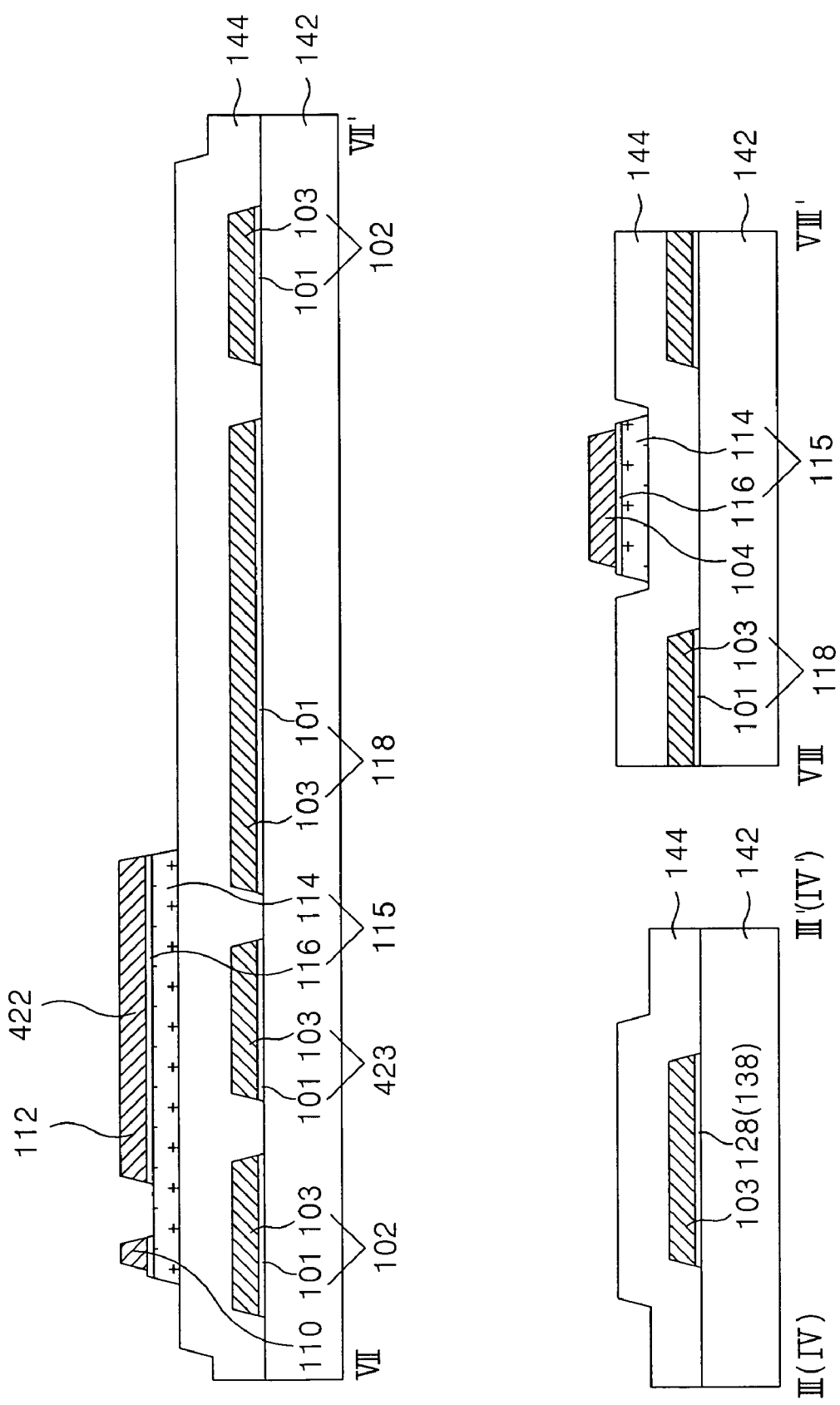

FIGS. 23A and 23B illustrate a plane view and a sectional diagram, respectively, of a second mask process utilized in the fabricating a transflective thin film transistor substrate according to the present invention. As illustrated in FIG. 23B, a gate insulating film 144 is formed on the lower substrate 142 including where the gate pattern was formed. In addition, a source/drain pattern including a data line 104, a source electrode 110 and a storage upper electrode 422 integrated with a drain electrode 112, and a semiconductor pattern 115 including an active layer 114 and an ohmic contract layer 116 which are overlapped along the rear surface of the source/drain pattern, are formed on the gate insulating film 144 using the second mask process. The semiconductor pattern 115 and the source/drain pattern are formed with one mask process using a diffractive exposure mask.

Figure 24A:
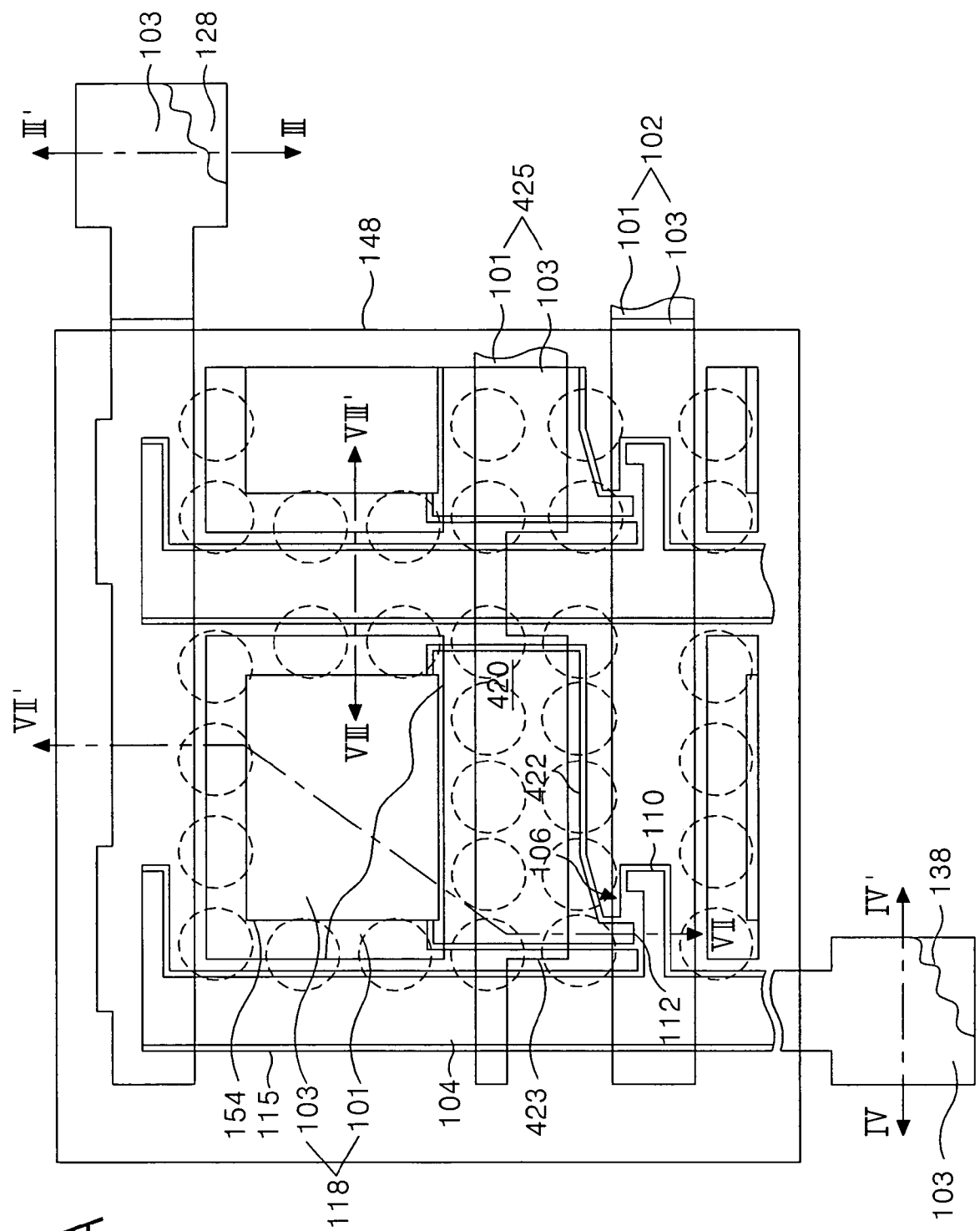

FIGS. 24A and 24B illustrate a plane view and a sectional diagram, respectively, of a third mask process utilized in fabricating a transflective thin film transistor substrate according to the present invention. As illustrated in FIG. 24B, a passivation film 146, an organic film 148, and a transmission hole 154 exposing the surface of the second conductive layer 103 of the pixel electrode 118 and the side surface of the storage upper electrode 422 in a transmissive area are formed using a third mask. In addition, the pad area has a structure that the gate insulating film 144 is removed to expose the second conductive layer 103 on the gate pad 128 and the data pad 138.

FIGS. 25A and 25B illustrate a plane view and a sectional diagram, respectively, of a fourth mask process utilized in fabricating a the transflective thin film transistor substrate according to the present invention. As illustrated in FIG. 25B, a reflective electrode 152 is formed on top of the organic film 148 in each pixel reflective area using the fourth mask process, and the second conductive layer 103 of the gate pattern exposed through the reflective electrode 152 is etched, thus the first conductive layer 101 of the pixel electrode 118 is exposed through the transmission hole 154, and the gate pad 128 and the data pad 138 are exposed in the pad area.

As described above, the transflective thin film transistor substrate and the method of fabricating same according to the present invention forms the pixel electrode in a double or triple structure like the gate line and forms a transmission hole to expose the pixel electrode when patterning the organic film. In addition, it connects the pixel electrode with the drain electrode and the storage upper electrode, or the storage upper electrode integrated with the drain electrode, using the reflective electrode that runs through the edge part of the transmission hole, and it removes the opaque second conductive layer or second and third layer, of the pixel electrode when forming the reflective electrode. Accordingly, the whole process can be simplified to four mask processes thereby reducing two mask processes when compared to the related art. Furthermore, a separate contact hole is not required to connect the pixel electrode with the drain electrode and the storage upper electrode, thus the aperture ratio of the transmissive area is increased.

Further, the transflective thin film transistor substrate and the fabricating method thereof according to the present invention connects the data link and the data line, which are formed in different layers, using a contact electrode of the same metal as the reflective electrode, and it reciprocally connects the thin film transistors of the static electricity prevention device. Accordingly, the whole process can be simplified to four processes.

In addition, the transflective thin film transistor substrate and the fabricating method thereof according to the present invention has the reflective electrode AlNd connected to the first conductive layer ITO through the second conductive layer Mo of the pixel electrode, thus the contact resistance of the reflective electrode and the pixel electrode is reduced.

Further, in the transflective thin film transistor substrate and the fabricating method thereof according to the present invention, the gate pattern further includes the third conductive layer to act as the etch stopper when forming the transmission hole, thereby preventing the first conductive layer from becoming black due to the dry etching of the second conductive layer.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   first and second substrates;
   a gate line having a double layer including a first transparent conductive layer and a second opaque conductive layer on the first substrate;
   a first insulation film on the gate line;
   a data line crossing the gate line to define a pixel region, the pixel region having a transmissive area and a reflective area;
   a thin film transistor connected to the gate and data lines;
   a pixel electrode having the first conductive layer in the pixel region and the second conductive layer along a boundary of the first conductive layer;
   a storage upper electrode forming a storage capacitor by overlapping the gate line with the first insulation film there between;
   a transmission hole formed in the transmissive area and exposing a side of the storage upper electrode and a side of a drain electrode of the thin film transistor by passing through the first insulation film and a second insulation film on the thin film transistor;
   a reflective electrode directly connected to the second conductive layer of the pixel electrode, the drain electrode and the storage upper electrode at an edge portion of the transmission hole, respectively; and
   a liquid crystal layer between the first and second substrates.

2. The device of claim 1, further comprising:
   a gate pad extending from the first conductive layer of the gate line; and
   a data pad formed of the first conductive layer of the gate pad.

3. The device of claim 2, wherein the first and second insulation films are removed in the pad region.

4. The device of claim 2, further comprising:
   a data link extending from the data pad and overlapping an end part of the data line;
   a first contact hole exposing the data link by passing through the first insulating film from the second insulation film via the data line; and
   a contact electrode laterally connected to the data line through the first contact hole and surface-connected to the data link.

5. The device of claim 4, wherein a first portion of the data link is formed of the first and second conductive layers, and a second portion of the data link is formed of the first conductive layer as the data pad.

6. The device of claim 5, wherein the first portion overlaps with the second insulation film.

7. The device of claim 5, wherein the second portion does not overlap the second insulation film.

8. The device of claim 4, wherein the contact electrode is formed of the same metal as the reflective electrode.

9. The device of claim 1, wherein the second insulation film is formed of an organic material.

10. The device of claim 1, further comprising:
    a third insulation film formed between the thin film transistor and the second insulation film.

11. The device of claim 10, wherein the third insulation film is an inorganic material.

12. The device of claim 10, wherein the transmission hole passes through the third insulation film.

13. The device of claim 1, further comprising:
    an electrostatic discharging device connected to one of the data line and the gate line.

14. The device of claim 13, wherein the electrostatic discharging device comprises:
    a second thin film transistor connected to one of the data line and the gate line;
    a third thin film transistor connected between a gate electrode and a source electrode of the second thin film transistor in a diode form;
    a fourth thin film transistor connected between the gate electrode and the drain electrode of the second thin film transistor in a diode form;
    a second contact electrode connecting a source electrode and a gate electrode of the third thin film transistor through a second contact hole;
    a third contact electrode connecting a drain electrode of the third or fourth thin film transistor and the gate electrode of the second thin film transistor through a third contact hole; and
    a fourth contact electrode connecting a source electrode and a gate electrode of the fourth thin film transistor through a fourth contact hole.

15. The device of claim 14, wherein the second, third and fourth contact electrodes are formed of the same metal layer as the reflective electrode.

16. The device of claim 14, wherein the second and third contact holes expose a corresponding gate electrode by passing through the second insulation film to the gate insulating film via a source or drain electrode.

17. The device of claim 14, wherein the first to fourth contact electrodes are formed in a sealant area.

18. The device of claim 1, wherein the reflective electrode has an embossed surface.

19. The device of claim 18, wherein the second insulation film has an embossed surface.

20. The device of claim 1, further comprising a third conductive layer on the second conductive layer of the pixel electrode, a gate electrode of the thin film transistor, and the gate line.

21. A liquid crystal display device, comprising:
    first and second substrates;
    a gate line having a double layer structure including a first transparent conductive layer and a second opaque conductive layer;
    a first insulation film on the gate line;
    a data line crossing the gate line to define a pixel region, the pixel region having a transmissive area and a reflective area;
    a thin film transistor connected to the gate and data lines;
    a pixel electrode having the first conductive layer and the second conductive layer along the boundary of the first conductive layer;

a storage line having a double layer and a storage lower electrode integrated with the storage line;

a storage upper electrode integrated with a drain electrode of the thin film transistor and overlapping the storage lower electrode with the first insulation film there between to form a storage capacitor;

a transmission hole formed in the transmissive area and exposing a side surface of the storage upper electrode by passing through the first insulation film from a second insulation film on the thin film transistor;

a reflective electrode directly connected to the second conductive layer of the pixel electrode, the drain electrode and the storage upper electrode at an edge portion of the transmission hole, respectively; and a liquid crystal layer between the first and second substrates.

22. The device of claim 21, wherein the storage line crosses the data line.

23. The device of claim 21, further comprising:

a gate pad extending from the first conductive layer of the gate line; and a data pad formed of the first conductive layer of the gate pad.

24. The device of claim 23, wherein the first and second insulation films are removed in the pad region.

25. The device of claim 23, further comprising:

a data link extending from the data pad and overlapping an end part of the data line;

a first contact hole exposing the data line by passing through the first insulation film from the second insulation film via the data line; and a contact electrode laterally connected to the data line through the first contact hole and surface-connected to the data link.

26. The device of claim 25, wherein a first portion of the data link is formed of the first and second conductive layers, and a second portion of the data link is formed of the first conductive layer as the data pad.

27. The device of claim 26, wherein the first portion overlaps the second insulation film.

28. The device of claim 26, wherein the second portion does not overlap with the second insulation film.

29. The device of claim 23, wherein the contact electrode is formed of the same metal as the reflective electrode.

30. The device of claim 21, further comprising:

a third insulation film formed between the thin film transistor and the second insulation film.

31. The device of claim 30, wherein the third insulation film is an inorganic material.

32. The device of claim 30, wherein the transmission hole passes through the third insulation film.

33. The device of claim 21, wherein the reflective electrode has an embossed surface.

34. The device of claim 33, wherein the second insulation film has an embossed surface.

35. The device of claim 21, further comprising:

a third conductive layer on the second conductive layer of the pixel electrode, a gate electrode of the thin film transistor and the gate line.

* * * * *